(12) United States Patent
Yamamoto

(10) Patent No.: US 12,487,443 B2
(45) Date of Patent: Dec. 2, 2025

(54) SURFACE ESTIMATION METHOD, SURFACE ESTIMATION DEVICE, AND RECORDING MEDIUM

(71) Applicant: Evident Corporation, Nagano (JP)

(72) Inventor: Naoki Yamamoto, Tokyo (JP)

(73) Assignee: Evident Corporation, Nagano (JP)

( * ) Notice: Subject to any disclaimer, the term of this patent is extended or adjusted under 35 U.S.C. 154(b) by 248 days.

(21) Appl. No.: 17/939,041

(22) Filed: Sep. 7, 2022

(65) Prior Publication Data

US 2023/0003991 A1    Jan. 5, 2023

Related U.S. Application Data

(63) Continuation of application No. PCT/JP2020/009973, filed on Mar. 9, 2020.

(51) Int. Cl.
*G02B 23/00* (2006.01)
*G01B 11/02* (2006.01)
(Continued)

(52) U.S. Cl.
CPC ........ *G02B 23/2415* (2013.01); *G01B 11/026* (2013.01); *G01B 11/03* (2013.01);
(Continued)

(58) Field of Classification Search
None
See application file for complete search history.

(56) References Cited

U.S. PATENT DOCUMENTS 6,459,481 B1 * 10/2002 Schaack ............... A61B 5/1076
356/241.1
6,931,145 B1 * 8/2005 Kroos ..................... G06T 7/207
382/107
(Continued)

FOREIGN PATENT DOCUMENTS

EP    3816938 A1 * 5/2021  ......... G06K 9/00798
JP    2011039918 A    2/2011
(Continued)

OTHER PUBLICATIONS

International Search Report dated Jul. 21, 2020 issued in PCT/JP2020/009973.

*Primary Examiner* — Dave Czekaj
*Assistant Examiner* — Shanika M Brumfield
(74) *Attorney, Agent, or Firm* — Scully, Scott, Murphy & Presser, P.C.

(57) ABSTRACT

A surface estimation method includes a region-setting step and an estimation step. In the region-setting step, a reference region that is one of a three-dimensional region and a two-dimensional region is set. The three-dimensional region includes three or more points and is set in a three-dimensional space. The three-dimensional space includes three-dimensional coordinates of three or more points on a subject calculated on the basis of a two-dimensional image of the subject. The three-dimensional coordinates of the three or more points are included in three-dimensional image data. The two-dimensional region includes three or more points and is set in the two-dimensional image. In the estimation step, a reference surface that approximates a surface of the subject is estimated on the basis of three or more points of the three-dimensional image data corresponding to the three or more points included in the reference region.

23 Claims, 46 Drawing Sheets

(51) Int. Cl.
*G01B 11/03* (2006.01)
*G01B 11/24* (2006.01)
*G02B 23/24* (2006.01)
*G06T 7/00* (2017.01)
*G06T 7/593* (2017.01)

(52) U.S. Cl.
CPC ............ *G01B 11/24* (2013.01); *G06T 7/0012* (2013.01); *G06T 7/593* (2017.01)

(56) References Cited

U.S. PATENT DOCUMENTS

| | | | |
|---|---|---|---|
| 11,170,516 B2 * | 11/2021 | Bendall | ..................... G06T 7/50 |
| 2011/0038510 A1 | 2/2011 | Nakamura | |
| 2016/0292888 A1 | 10/2016 | Arita | |
| 2018/0240246 A1 * | 8/2018 | Bendall | ............... G06F 3/04845 |
| 2019/0206135 A1 | 7/2019 | Jiang | |
| 2020/0401805 A1 * | 12/2020 | Kotoyori | ................... G06T 7/90 |

FOREIGN PATENT DOCUMENTS

| | | | | |
|---|---|---|---|---|
| JP | 2017162452 A | 9/2017 | | |
| JP | 2018533722 A | 11/2018 | | |
| JP | 2019121136 A | 7/2019 | | |
| JP | 6730029 B2 * | 7/2020 | | |
| JP | 2021071885 A * | 5/2021 | ......... | G06K 9/00798 |
| WO | 2014084181 A1 | 6/2014 | | |
| WO | 2017053505 A2 | 3/2017 | | |
| WO | WO-2017043258 A1 * | 3/2017 | ........... | G01B 11/002 |
| WO | WO-2017199285 A1 * | 11/2017 | ............ | G06K 9/6202 |
| WO | WO-2017199696 A1 * | 11/2017 | ............. | G01B 11/00 |

* cited by examiner

SURFACE ESTIMATION METHOD, SURFACE ESTIMATION DEVICE, AND RECORDING MEDIUM

The present application is a continuation application based on International Patent Application No. PCT/JP2020/009973 filed on Mar. 9, 2020, the content of which is incorporated herein by reference.

BACKGROUND OF THE INVENTION

Field of the Invention

The present invention relates to a surface estimation method, a surface estimation device, and a recording medium.

Description of Related Art

Industrial endoscope devices have been used for observation and inspection of internal damage, corrosion, and the like of boilers, pipes, aircraft engines, and the like. In such an endoscope device, multiple types of optical adapters for observing and inspecting various objects to be observed are prepared. Optical adapters are attached to the distal ends of endoscopes and are exchangeable. In an inspection using such an endoscope device, there is a desire to quantitatively measure the size of a defect, damage, or the like of a subject. To meet such a desire, there is an endoscope device provided with a three-dimensional measurement function.

For example, an endoscope device has a function of measuring geometric sizes of a subject on the basis of information of a point designated on an image by a user. For example, in a surface-based measurement, a reference surface is estimated on the basis of three or more points designated by a user, and the three-dimensional distance between a measurement point designated by a user and the reference surface is measured. The reference surface approximates the surface of a subject.

The device disclosed in Japanese Unexamined Patent Application, First Publication No. 2017-162452 uses a plane or a curved surface as a reference surface and executes the surface-based measurement. FIG. 67 and FIG. 68 show an example in which three or more points used for estimating a reference surface in Japanese Unexamined Patent Application, First Publication No. 2017-162452 are set in an image G301 of a subject.

In FIG. 67, a point P301, a point P302, a point P303, and a point P304 are set in the image G301. Each of the four points is disposed at the vertex of a square. In FIG. 68, two or more points P311 on a line L311 and two or more points P312 on a line L312 are set in the image G301.

SUMMARY OF THE INVENTION

According to a first aspect of the present invention, a surface estimation method executed by a processor includes a region-setting step and an estimation step. In the region-setting step, a reference region that is one of a three-dimensional region and a two-dimensional region is set. The three-dimensional region includes three or more points and is set in a three-dimensional space. The three-dimensional space includes three-dimensional coordinates of three or more points on a subject calculated on the basis of a two-dimensional image of the subject. The three-dimensional coordinates of the three or more points are included in three-dimensional image data. The two-dimensional region includes three or more points and is set in the two-dimensional image. The three or more points of the reference region include one or more combinations, each of which is constituted by three points that form a triangle. In the estimation step, a reference surface that approximates a surface of the subject is estimated on the basis of three or more points of the three-dimensional image data corresponding to the three or more points included in the reference region.

According to a second aspect of the present invention, in the first aspect, the reference region that is the three-dimensional region may be set in the three-dimensional space in the region-setting step.

According to a third aspect of the present invention, in the first aspect, the reference region that is the two-dimensional region may be set in the two-dimensional image in the region-setting step.

According to a fourth aspect of the present invention, in the second aspect, continuity of the three or more points corresponding to the three-dimensional coordinates included in the three-dimensional image data may be determined in the region-setting step. The reference region may include only the three or more points determined to be continuous.

According to a fifth aspect of the present invention, in the first aspect, the reference region may include a region that is not a convex set.

According to a sixth aspect of the present invention, in the first aspect, the reference region may include two or more regions.

According to a seventh aspect of the present invention, in the first aspect, the surface estimation method may further include an image display step, a position input step, and a state determination step. In the image display step, one of an image of the three-dimensional image data and the two-dimensional image may be displayed on a display. In the position input step, position information input through an input device may be accepted. The position information may indicate a position on the image of the three-dimensional image data or the two-dimensional image displayed on the display. In the state determination step, a state of the subject may be determined. In the region-setting step, a boundary of the reference region may be determined on the basis of both the position indicated by the position information and the state.

According to an eighth aspect of the present invention, in the fifth aspect, a boundary of the reference region may include a first boundary and a second boundary that is on an inner side of the first boundary.

According to a ninth aspect of the present invention, in the first aspect, the three or more points corresponding to the three-dimensional coordinates included in the three-dimensional image data may be divided into two or more regions in the region-setting step. A boundary of the reference region may include a boundary of one or more regions included in the two or more regions.

According to a tenth aspect of the present invention, in the sixth aspect, region information indicating at least one of a size of the reference region and a position of the reference region may be recorded on a recording medium in advance. At least one of the size of the reference region and the position of the reference region may be set on the basis of the region information in the region-setting step.

According to an eleventh aspect of the present invention, in the sixth aspect, the surface estimation method may further include an image display step of displaying one of an image of the three-dimensional image data and the two-dimensional image on a display. In the region-setting step, three or more points on the image of the three-dimensional image data or the two-dimensional image may be input through an input device. In the region-setting step, the reference region including the input three or more points may be set.

According to a twelfth aspect of the present invention, in the eleventh aspect, the reference region may be set on the basis of line segments connecting the input three or more points together in the region-setting step.

According to a thirteenth aspect of the present invention, in the sixth aspect, the surface estimation method may further include an image display step of displaying one of an image of the three-dimensional image data and the two-dimensional image on a display. In the region-setting step, three or more points on a line designated in the image of the three-dimensional image data or the two-dimensional image by a user may be input through an input device. In the region-setting step, the reference region including the three or more points on the line may be set.

According to a fourteenth aspect of the present invention, in the sixth aspect, the three or more points may be selected from four or more points included in the reference region in the estimation step. In the estimation step, the reference surface may be estimated on the basis of three or more points of the three-dimensional image data corresponding to the three or more selected points.

According to a fifteenth aspect of the present invention, in the sixth aspect, the surface estimation method may further include an image display step of displaying one of an image of the three-dimensional image data and the two-dimensional image on a display and displaying the reference region on the image of the three-dimensional image data or the two-dimensional image.

According to a sixteenth aspect of the present invention, in the sixth aspect, the surface estimation method may further include an image display step of displaying an image of the three-dimensional image data on a display and displaying, on the image of the three-dimensional image data, the three or more points of the three-dimensional image data used for estimating the reference surface.

According to a seventeenth aspect of the present invention, in the sixth aspect, the surface estimation method may further include an image display step of displaying the two-dimensional image on a display and displaying, on the two-dimensional image, three or more points corresponding to the three or more points of the three-dimensional image data used for estimating the reference surface.

According to an eighteenth aspect of the present invention, in the first aspect, the surface estimation method may further include a division step and an image display step. In the division step, three or more points corresponding to the three-dimensional coordinates included in the three-dimensional image data may be divided into two or more regions. In the image display step, one of an image of the three-dimensional image data and the two-dimensional image may be displayed on a display and an image of the two or more regions may be displayed on the display.

According to a nineteenth aspect of the present invention, in the sixth aspect, the surface estimation method may further include a map generation step and an image display step. In the map generation step, a curvature map indicating distribution of curvatures in a three-dimensional shape of the subject indicated by the three-dimensional image data may be generated. In the image display step, one of an image of the three-dimensional image data and the two-dimensional image may be displayed on a display and an image of the curvature map may be displayed on the display.

According to a twentieth aspect of the present invention, in the sixth aspect, the surface estimation method may further include an image display step of displaying one of an image of the three-dimensional image data and the two-dimensional image on a display and displaying a region corresponding to the reference surface on the image of the three-dimensional image data or the two-dimensional image.

According to a twenty-first aspect of the present invention, in the sixth aspect, the surface estimation method may further include an abnormality detection step of detecting an abnormal region on the surface of the subject on the basis of one of an image of the three-dimensional image data and the two-dimensional image. In the region-setting step, the reference region excluding a region corresponding to the abnormal region may be set.

According to a twenty-second aspect of the present invention, in the sixth aspect, the surface estimation method may further include a measurement step of measuring a size of the subject on the basis of the reference surface.

According to a twenty-third aspect of the present invention, in the twenty-second aspect, a three-dimensional distance between the reference surface and a point on the surface of the subject may be measured in the measurement step.

According to a twenty-fourth aspect of the present invention, in the sixth aspect, a geometric feature of the reference surface may be estimated in the estimation step.

According to a twenty-fifth aspect of the present invention, a surface estimation device includes a processor. The processor is configured to set a reference region that is one of a three-dimensional region and a two-dimensional region. The three-dimensional region includes three or more points and is set in a three-dimensional space. The three-dimensional space includes three-dimensional coordinates of three or more points on a subject calculated on the basis of a two-dimensional image of the subject. The three-dimensional coordinates of the three or more points are included in three-dimensional image data. The two-dimensional region includes three or more points and is set in the two-dimensional image. The three or more points of the reference region include one or more combinations, each of which is constituted by three points that form a triangle. The processor is configured to estimate a reference surface that approximates a surface of the subject on the basis of three or more points of the three-dimensional image data corresponding to the three or more points included in the reference region.

According to a twenty-sixth aspect of the present invention, a non-transitory computer-readable recording medium saves a program causing a computer to execute a region-setting step and an estimation step. In the region-setting step, a reference region that is one of a three-dimensional region and a two-dimensional region is set. The three-dimensional region includes three or more points and is set in a three-dimensional space. The three-dimensional space includes three-dimensional coordinates of three or more points on a subject calculated on the basis of a two-dimensional image of the subject. The three-dimensional coordinates of the three or more points are included in three-dimensional image data. The two-dimensional region includes three or more points and is set in the two-dimensional image. The three or more points of the reference region include one or more combinations, each of which is constituted by three points that form a triangle. In the estimation step, a reference surface that approximates a surface of the subject is estimated on the basis of three or more points of the three-dimensional image data corresponding to the three or more points included in the reference region.

DETAILED DESCRIPTION OF THE INVENTION

Figure 69:
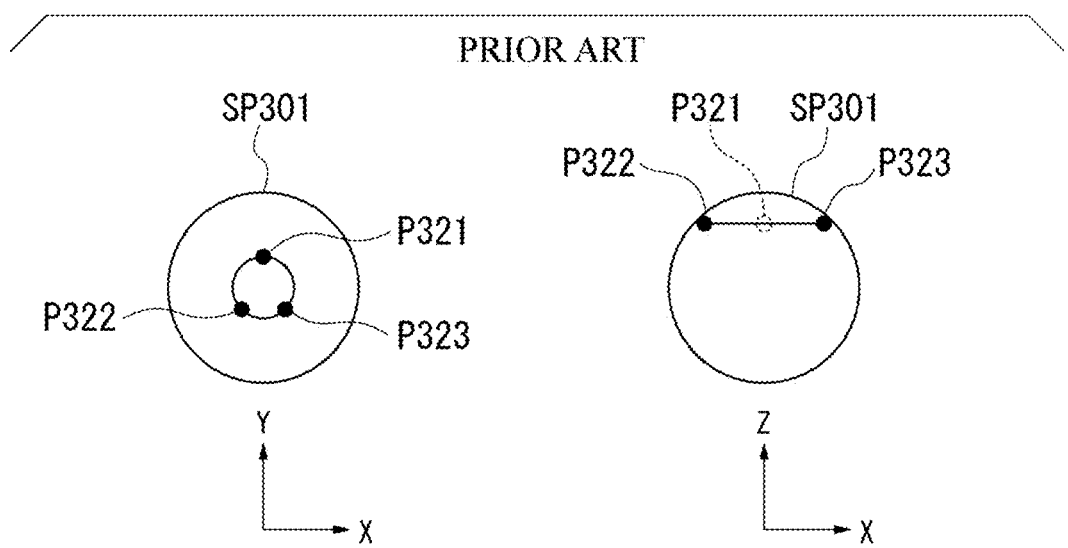
FIG. 69 is a diagram showing an example in which a point used for estimating the reference surface is set in the prior art.
Figure 70:
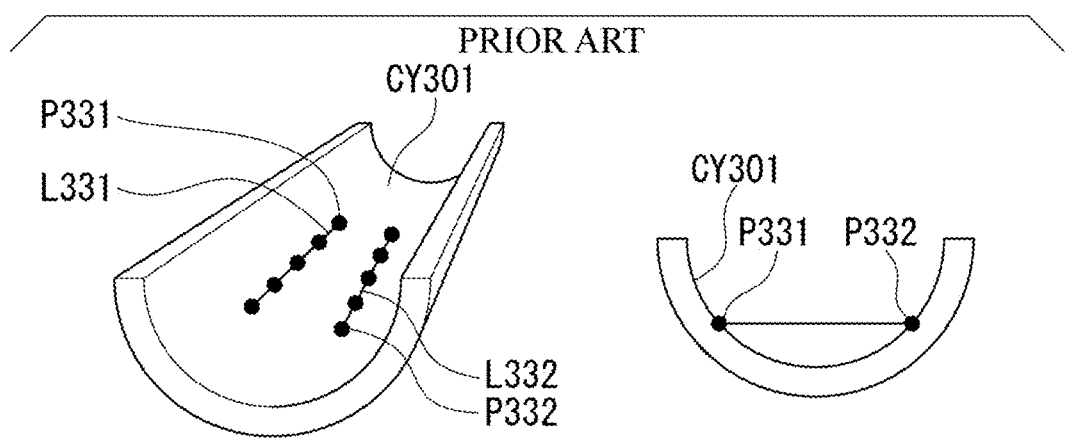
FIG. 70 is a diagram showing an example in which a point used for estimating the reference surface is set in the prior art.

In a case in which the surface of a subject is a curved surface, there is a possibility that the device disclosed in Japanese Unexamined Patent Application, First Publication No. 2017-162452 cannot accurately estimate a reference surface. FIG. 69 and FIG. 70 show an example in which an erroneous reference surface is estimated.

In FIG. 69, a point P321, a point P322, and a point P323 are set on the surface of a sphere SP301. When the sphere SP301 is seen in a parallel direction to the Z-axis, each of the three points is disposed at the vertex of a triangle. In a case in which the heights of the three points in the Z-direction are the same, the three points are on a plane. Therefore, the plane is erroneously estimated as a reference surface.

In FIG. 70, a line L331 and a line L332 are set on the surface of a cylinder CY301, and two or more points P331 on the line L331 and two or more points P332 on the line L332 are set. In a case in which the line L331 and the line L332 are parallel to the center axis of the cylinder CY301, the two or more points P331 and the two or more points P332 are on a plane. Therefore, the plane is erroneously estimated as a reference surface.

Hereinafter, embodiments of the present invention will be described with reference to the drawings.

First Embodiment

Figure 1:
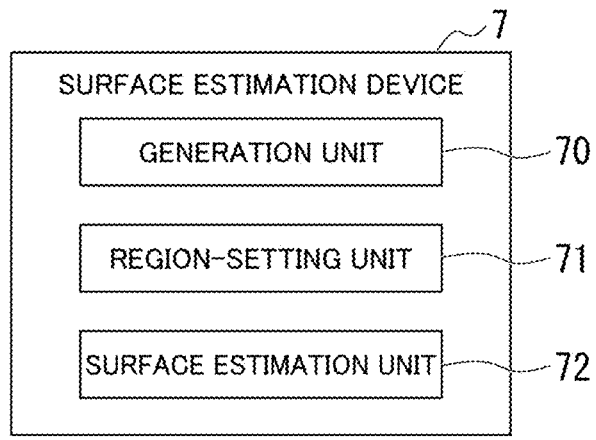
FIG. 1 is a block diagram showing a configuration of a surface estimation device according to a first embodiment of the present invention.

FIG. 1 shows a configuration of a surface estimation device 7 according to a first embodiment of the present invention. The surface estimation device 7 shown in FIG. 1 includes a generation unit 70, a region-setting unit 71, and a surface estimation unit 72.

The generation unit 70 calculates three-dimensional coordinates of three or more points on a subject on the basis of a two-dimensional image of the subject and generates point-cloud data (three-dimensional image data) including the three-dimensional coordinates of the three or more points (generation step). The region-setting unit 71 sets a reference region that is one of a three-dimensional region and a two-dimensional region (region-setting step). The three-dimensional region includes three or more points and is set in a three-dimensional space. The three-dimensional space includes the three-dimensional coordinates included in the point-cloud data. The two-dimensional region includes three or more points and is set in the two-dimensional image of the subject. The three or more points of the reference region include one or more combinations, each of which is constituted by three points that form a triangle. The surface estimation unit 72 estimates a reference surface that approximates the surface of the subject on the basis of three or more points of the point-cloud data corresponding to the three or more points included in the reference region (estimation step).

Each unit shown in FIG. 1 may be constituted by at least one of a processor and a logic circuit. For example, the processor is at least one of a central processing unit (CPU), a digital signal processor (DSP), and a graphics-processing unit (GPU). For example, the logic circuit is at least one of an application-specific integrated circuit (ASIC) and a field-programmable gate array (FPGA). Each unit shown in FIG. 1 may include one or a plurality of processors. Each unit shown in FIG. 1 may include one or a plurality of logic circuits.

A computer of the surface estimation device 7 may read a program and execute the read program. The program includes commands defining the operations of the generation unit 70, the region-setting unit 71, and the surface estimation unit 72. In other words, the functions of the generation unit 70, the region-setting unit 71, and the surface estimation unit 72 may be realized by software.

The program described above may be recorded on a computer-readable recording medium. The program may be transmitted from a computer storing the program to the surface estimation device 7 through a transmission medium or transmission waves in a transmission medium. The "transmission medium" transmitting the program is a medium having a function of transmitting information. The medium having the function of transmitting information includes a network (communication network) such as the Internet and a communication circuit line (communication line) such as a telephone line. The program described above may realize some of the functions described above. In addition, the program described above may be a differential file (differential program). The functions described above may be realized by a combination of a program that has already been recorded in a computer and a differential program.

Figure 2:
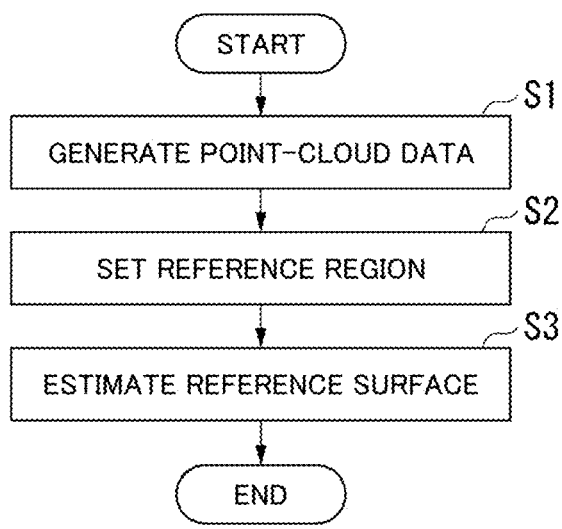
FIG. 2 is a flow chart showing a procedure of surface estimation processing in the first embodiment of the present invention.

Surface estimation processing in the first embodiment will be described by using FIG. 2. FIG. 2 shows a procedure of the surface estimation processing.

The generation unit 70 calculates three-dimensional coordinates (3D coordinates) of three or more points on a subject on the basis of a two-dimensional image (2D image) of the subject and generates point-cloud data including the 3D coordinates of the three or more points (Step S1). Step S1 corresponds to the generation step.

In a case in which the 2D image of the subject is a stereo image, one 2D image includes an image of the subject seen from a first viewpoint and an image of the subject seen from a second viewpoint different from the first viewpoint. The generation unit 70 calculates 3D coordinates corresponding to each pixel of the 2D image. The generation unit 70 generates the point-cloud data including the 3D coordinates of the three or more points on the subject. The 3D coordinates of each of the three or more points in the point-cloud data are associated with a point on the 2D image. Specifically, the 3D coordinates in the point-cloud data are associated with a pixel on the 2D image. For example, the point-cloud data include the 3D coordinates and position information of the pixel on the 2D image.

The generation unit 70 may calculate 3D coordinates of three or more points on a subject by using two or more images and by applying structure-from-motion (SfM). The generation unit 70 may calculate 3D coordinates of three or more points on a subject by using two or more 2D images of the subject on which two or more stripe patterns having different spatial phases are projected and by applying a phase-shift method. The generation unit 70 may calculate 3D coordinates of three or more points on a subject by using one 2D image of the subject on which patterned light having randomly disposed bright and dark parts is emitted. A method of generating the point-cloud data is not limited to the above-described methods.

The generation unit 70 may generate a three-dimensional image (3D image) for displaying the point-cloud data on a display. The 3D image is an image of a three-dimensional shape (3D shape) indicated by the point-cloud data. The 3D image includes color data of each pixel. Each pixel of the 3D image is associated with the 3D coordinates. The generation unit 70 may generate a 3D image corresponding to each of two or more different viewpoints.

After Step S1, the region-setting unit 71 sets a reference region that is one of a three-dimensional region and a two-dimensional region (Step S2). Step S2 corresponds to the region-setting step.

Figure 3:
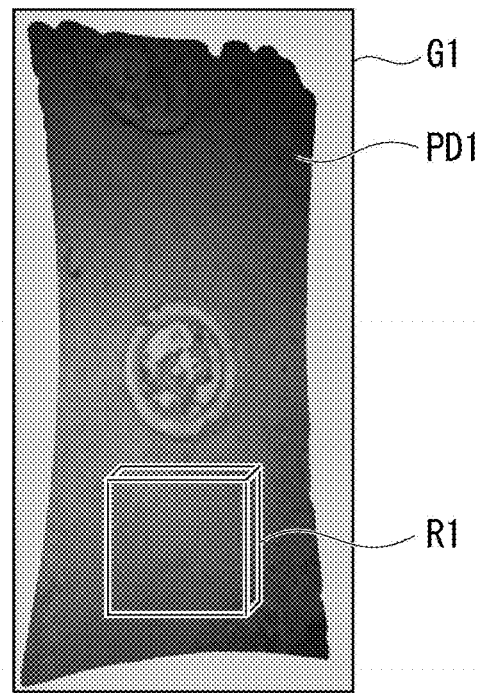
FIG. 3 is a diagram showing an example of a three-dimensional image of point-cloud data in the first embodiment of the present invention.

FIG. 3 shows an example of a 3D image of the point-cloud data. The generation unit 70 converts the point-cloud data into mesh data and adds texture to the mesh data. The generation unit 70 generates a 3D image G1 by executing this processing. The generation unit 70 may generate a 3D image without converting the point-cloud data into the mesh data.

In the 3D image G1, point-cloud data PD1 to which texture is added are shown. In the example shown in FIG. 3, the region-setting unit 71 sets a three-dimensional reference region R1. The reference region R1 is a cube and has volume. The reference region R1 may be a cuboid, a sphere, a cylinder, or the like. The shape of the reference region R1 is not limited to these examples.

The generation unit 70 sets at least one of the position of the reference region R1 and the size of the reference region R1 on the basis of information input through an input device. Alternatively, the generation unit 70 automatically sets at least one of the position of the reference region R1 and the size of the reference region R1. In the example shown in FIG. 3, the 3D image G1 is used to show the reference region R1. The generation unit 70 does not need to generate the 3D image G1.

Figure 4:
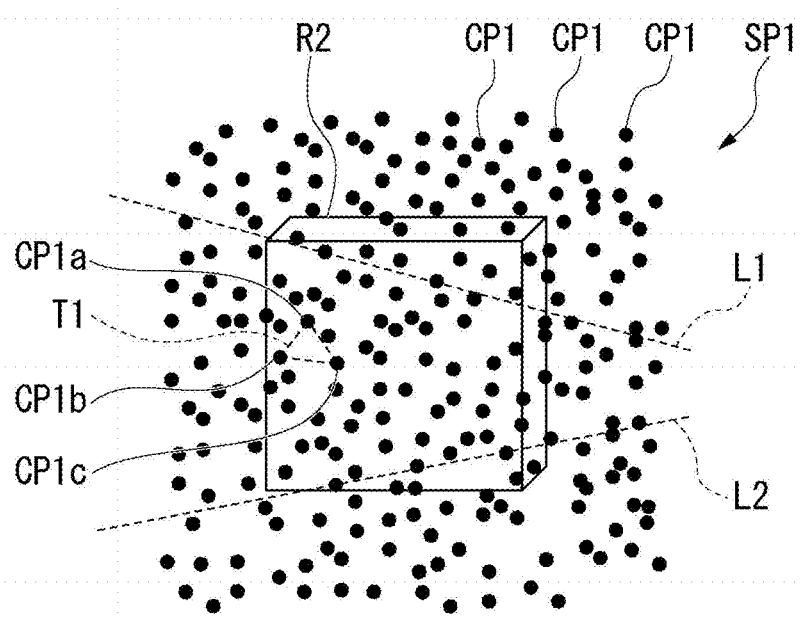
FIG. 4 is a diagram schematically showing the point-cloud data in the first embodiment of the present invention.

FIG. 4 schematically shows the point-cloud data in a three-dimensional space (3D space). The 3D coordinates in the point-cloud data are defined in a 3D space SP1 and include an X-coordinate, a Y-coordinate, and a Z-coordinate. Two or more points CP1 in the point-cloud data are shown in FIG. 4. In the example shown in FIG. 4, the region-setting unit 71 sets a three-dimensional reference region R2 in the 3D space SP1. The reference region R2 includes three or more points CP1 in the point-cloud data. The three or more points CP1 in the reference region R2 three-dimensionally expand.

The three or more points CP1 in the reference region R2 include one or more combinations, each of which is constituted by three points that form a triangle. For example, a point CP1a, a point CP1b, and a point CP1c in the reference region R2 form a triangle T1. In the reference region R2, there are many combinations, each of which is constituted by three points that form a triangle.

Even when an arbitrary virtual straight line in the 3D space SP1 passes through one or more points CP1 in the reference region R2, there are always one or more points CP1 that the virtual straight line does not pass through in the reference region R2. In FIG. 4, a virtual straight line L1 and a virtual straight line L2 are shown. Each of the virtual straight line L1 and the virtual straight line L2 passes through only some of the three or more points CP1 in the reference region R2. An arbitrary virtual straight line passing through the reference region R2 passes through only some of the three or more points CP1 in the reference region R2.

Figure 5:
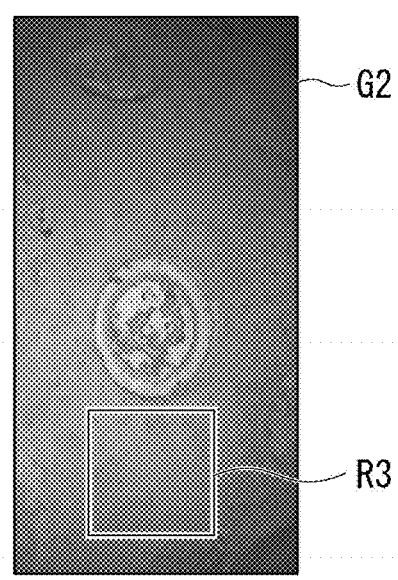
FIG. 5 is a diagram showing an example of a 2D image in the first embodiment of the present invention.

FIG. 5 shows an example of a 2D image of a subject. In the example shown in FIG. 5, the region-setting unit 71 sets a two-dimensional reference region R3 in a 2D image G2 of a subject. The reference region R3 is a square and has area. The reference region R3 may be a polygon having three or more vertices. The reference region R3 may be a circle, an ellipse, or the like. The shape of the reference region R3 is not limited to these examples.

The generation unit 70 sets at least one of the position of the reference region R3 and the size of the reference region R3 on the basis of information input through an input device. Alternatively, the generation unit 70 automatically sets at least one of the position of the reference region R3 and the size of the reference region R3.

The reference region R3 includes three or more points on the surface of a subject. A point on a 2D image of a subject is associated with the 3D coordinates of a point in the point-cloud data. Therefore, each of the three or more points in the reference region R3 is associated with the 3D coordinates in the point-cloud data. The three or more points in the reference region R3 two-dimensionally expand. Therefore, three or more points of the point-cloud data corresponding to the three or more points in the reference region R3 three-dimensionally expand.

After Step S2, the surface estimation unit 72 estimates a reference surface that approximates the surface of the subject on the basis of three or more points of the point-cloud data corresponding to the three or more points included in the reference region (Step S3). Step S3 corresponds to the estimation step. When Step S3 is executed, the surface estimation processing is completed.

In a case in which a reference region is a three-dimensional region, the reference region includes three or more points in the point-cloud data. The surface estimation unit 72 acquires 3D coordinates of each of the three or more points from the point-cloud data. The surface estimation unit 72 estimates a reference surface on the basis of the 3D coordinates of the three or more points in the reference region.

In a case in which a reference region is a two-dimensional region, the reference region includes three or more points on a 2D image of a subject. A point on a 2D image of a subject is associated with the 3D coordinates of a point in the point-cloud data. The surface estimation unit 72 acquires 3D coordinates associated with each of the three or more points in the reference region from the point-cloud data. The surface estimation unit 72 estimates a reference surface on the basis of the 3D coordinates of the three or more points of the point-cloud data corresponding to the three or more points in the reference region.

For example, the surface estimation unit 72 estimates a reference surface that is a plane by using a least-squares method. The surface estimation unit 72 may estimate a reference surface by using an algorithm of robust estimation such as random sample consensus (RANSAC). The surface estimation unit 72 may estimate a reference surface by using machine learning such as deep learning. A reference surface may be a spherical surface, a cylindrical surface, a quadric surface, or the like. In a case in which the surface estimation unit 72 estimates a plane, the reference region includes three or more points. In a case in which the surface estimation unit 72 estimates a spherical surface, the reference region includes four or more points. In a case in which the surface estimation unit 72 estimates a cylindrical surface, the reference region includes five or more points. The shape of a reference surface is not limited to the above-described examples.

The surface estimation device 7 may include a reading unit that reads point-cloud data including three-dimensional coordinates of three or more points on a subject calculated on the basis of a two-dimensional image of the subject instead of the generation unit 70. The reading unit may read the point-cloud data from a recording medium without executing Step S1 shown in FIG. 2 (reading step). A processing unit having a similar function to that of the generation unit 70 generates the point-cloud data and records the point-cloud data on the recording medium. A different device from the surface estimation device 7 may include the processing unit.

In the first embodiment, the surface estimation device 7 sets a three-dimensional or two-dimensional reference region. The reference region includes three or more points that three-dimensionally or two-dimensionally expand. Therefore, three or more points of the point-cloud data used for estimating a reference surface are less likely to be biased on a plane or a straight line. Accordingly, the surface estimation device 7 can improve the accuracy of a reference surface.

Second Embodiment

A second embodiment of the present invention will be described. Hereinafter, an example in which the surface estimation device is an endoscope device will be described. The surface estimation device has only to be a device having a surface estimation function and is not limited to an endoscope device. The surface estimation device may be built-in equipment mounted on a specific device or a system. The surface estimation device may operate in a cloud environment. A subject is an industrial product.

Figure 6:
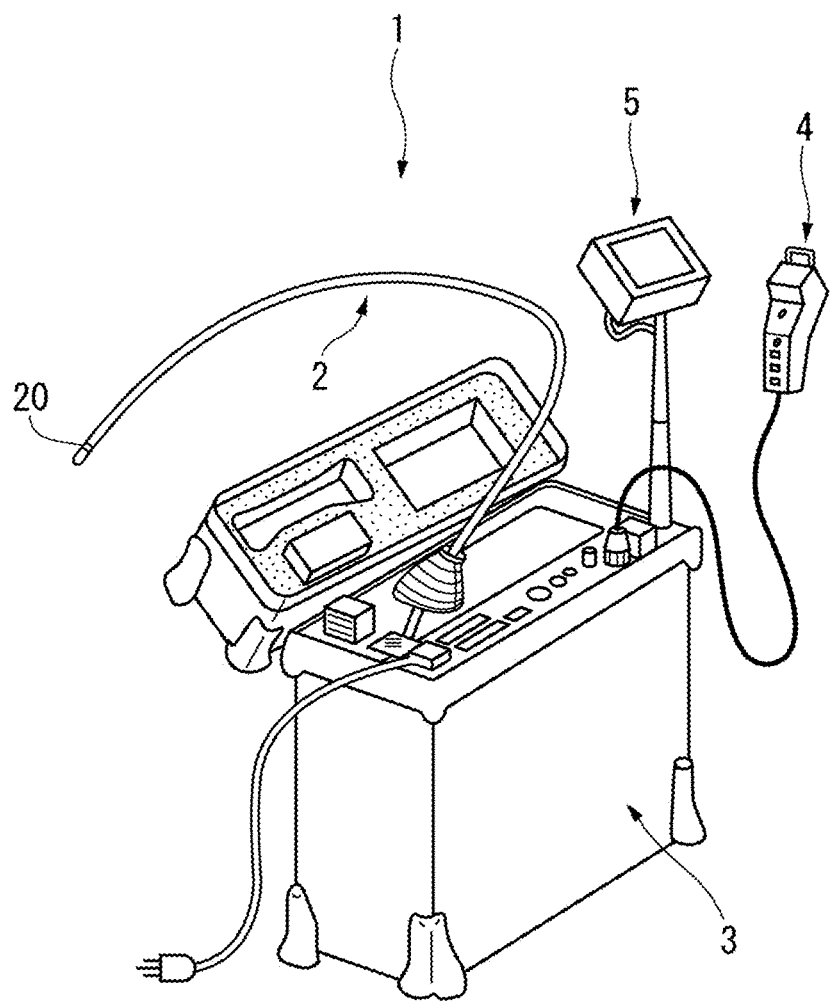
FIG. 6 is a perspective view showing an entire configuration of an endoscope device according to a second embodiment of the present invention.
Figure 7:
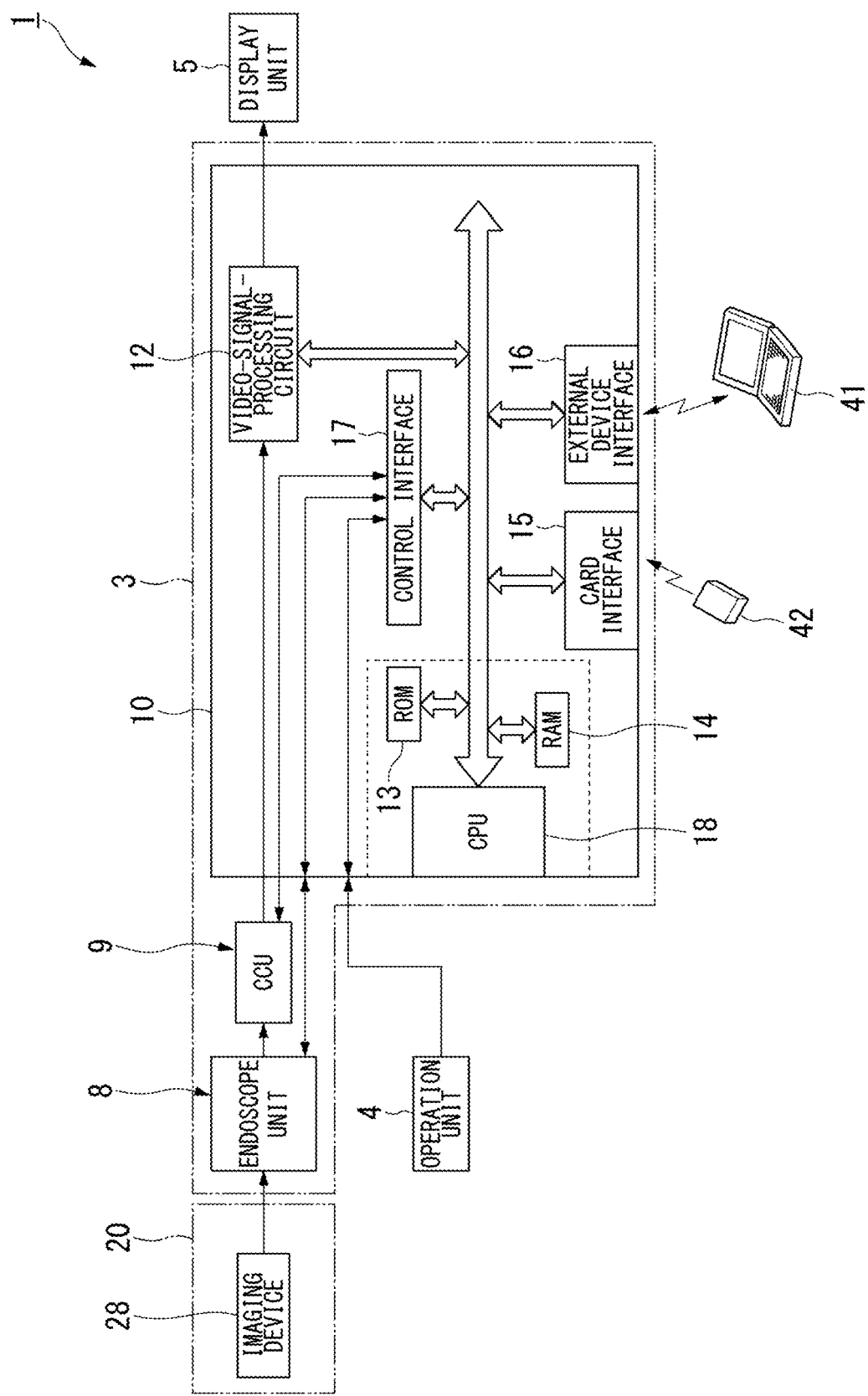
FIG. 7 is a block diagram showing an internal configuration of the endoscope device according to the second embodiment of the present invention.

FIG. 6 shows an external appearance of an endoscope device 1 according to the second embodiment. FIG. 7 shows an internal configuration of the endoscope device 1. The endoscope device 1 images a subject and generates an image. In order to observe various subjects, an inspector can perform replacement of an optical adaptor mounted at a distal end of an insertion unit 2, selection of a built-in video-processing program, and addition of a video-processing program.

The endoscope device 1 shown in FIG. 6 includes the insertion unit 2, a main body unit 3, an operation unit 4, and a display unit 5.

The insertion unit 2 is inserted into the inside of a subject. The insertion unit 2 has a long and thin bendable tube shape from a distal end 20 to a base end portion. The insertion unit 2 images a subject and outputs an imaging signal to the main body unit 3. An optical adapter is mounted on the distal end 20 of the insertion unit 2. For example, a single-eye optical adapter is mounted on the distal end 20 of the insertion unit 2. The main body unit 3 is a control device including a housing unit that houses the insertion unit 2. The operation unit 4 accepts an operation for the endoscope device 1 from a user. The display unit 5 includes a display screen and displays an image of a subject acquired by the insertion unit 2, an operation menu, and the like on the display screen.

The operation unit 4 is a user interface (input device). For example, the operation unit 4 is at least one of a button, a switch, a key, a mouse, a joystick, a touch pad, a track ball, and a touch panel. The display unit 5 is a monitor (display) such as a liquid crystal display (LCD). The display unit 5 may be a touch panel. In such a case, the operation unit 4 and the display unit 5 are integrated. A user touches the screen of the display unit 5 by using a part (for example, a finger) of the body or a tool.

The main body unit 3 shown in FIG. 7 includes an endoscope unit 8, a camera control unit (CCU) 9, and a control device 10. The endoscope unit 8 includes a light source device and a bending device not shown in the drawing. The light source device supplies illumination light that is necessary for observation. The bending device bends a bending mechanism built in the insertion unit 2. An imaging device 28 is built in the distal end 20 of the insertion unit 2. The imaging device 28 is an image sensor. The imaging device 28 photo-electrically converts an optical image of a subject formed by an optical adaptor and generates an imaging signal. The CCU 9 drives the imaging device 28. The imaging signal output from the imaging device 28 is input into the CCU 9. The CCU 9 performs preprocessing including amplification, noise elimination, and the like for the imaging signal acquired by the imaging device 28. The CCU 9 converts the imaging signal on which the preprocessing is performed into a video signal such as an NTSC signal.

The control device 10 includes a video-signal-processing circuit 12, a read-only memory (ROM) 13, a random-access memory (RAM) 14, a card interface 15, an external device interface 16, a control interface 17, and a central processing unit (CPU) 18. The video-signal-processing circuit 12 performs predetermined video processing on the video signal output from the CCU 9. For example, the video-signal-processing circuit 12 performs video processing related to improvement of visibility. For example, the video processing is color reproduction, gray scale correction, noise suppression, contour enhancement, and the like. The video-signal-processing circuit 12 combines the video signal output from the CCU 9 and a graphic image signal generated by the CPU 18. The graphic image signal includes an image of the operation screen, measurement information, and the like. The measurement information includes a 3D image of the point-cloud data, a measurement result, or the like. The video-signal-processing circuit 12 outputs a combined video signal to the display unit 5. In addition, the video-signal-processing circuit 12 outputs image data on the basis of the video signal output from the CCU 9 to the CPU 18.

The ROM 13 is a nonvolatile recording medium on which a program for the CPU 18 to control the operation of the endoscope device 1 is recorded. The RAM 14 is a volatile recording medium that temporarily stores information used by the CPU 18 for controlling the endoscope device 1. The CPU 18 controls the operation of the endoscope device 1 on the basis of the program recorded on the ROM 13.

A memory card 42, which is a removable recording medium, is connected to the card interface 15. The card interface 15 inputs control-processing information, image information, and the like stored on the memory card 42 into the control device 10. In addition, the card interface 15 records control-processing information, image information, and the like generated by the endoscope device 1 on the memory card 42.

An external device such as a USB device is connected to the external device interface 16. For example, a personal computer (PC) 41 is connected to the external device interface 16. The external device interface 16 transmits information to the PC 41 and receives information from the PC 41. In this way, the monitor of the PC 41 can display information. In addition, by inputting an instruction into the PC 41, a user can perform an operation related to control of the endoscope device 1.

The control interface 17 performs communication with the operation unit 4, the endoscope unit 8, and the CCU 9 for operation control. The control interface 17 notifies the CPU 18 of an instruction input into the operation unit 4 by a user. The control interface 17 outputs control signals used for controlling the light source device and the bending device to the endoscope unit 8. The control interface 17 outputs a control signal used for controlling the imaging device 28 to the CCU 9.

A program executed by the CPU 18 may be recorded on a computer-readable recording medium. The program recorded on this recording medium may be read and executed by a computer other than the endoscope device 1. For example, the program may be read and executed by the PC 41. The PC 41 may control the endoscope device 1 by transmitting control information used for controlling the endoscope device 1 to the endoscope device 1 in accordance with the program. Alternatively, the PC 41 may acquire a video signal from the endoscope device 1 and may process the acquired video signal.

As described above, the endoscope device 1 includes the imaging device 28 and the CPU 18. The imaging device 28 images a subject and generates an imaging signal. The imaging signal includes an image of the subject. Accordingly, the imaging device 28 acquires the image of the subject generated by imaging the subject. The image acquired by the imaging device 28 is input into the CPU 18 via the video-signal-processing circuit 12.

The imaging device 28 has a function of an image acquisition unit that acquires an image of a subject. The image acquisition unit may be an image input device. For example, in a case in which the PC 41 operates as a surface estimation device, the image acquisition unit is a communication interface (communicator) that performs communication with the endoscope device 1. The image acquisition unit may be a wireless communicator. The image acquisition unit may be a reading circuit that reads an image from a recording medium on which the image is recorded.

Figure 8:
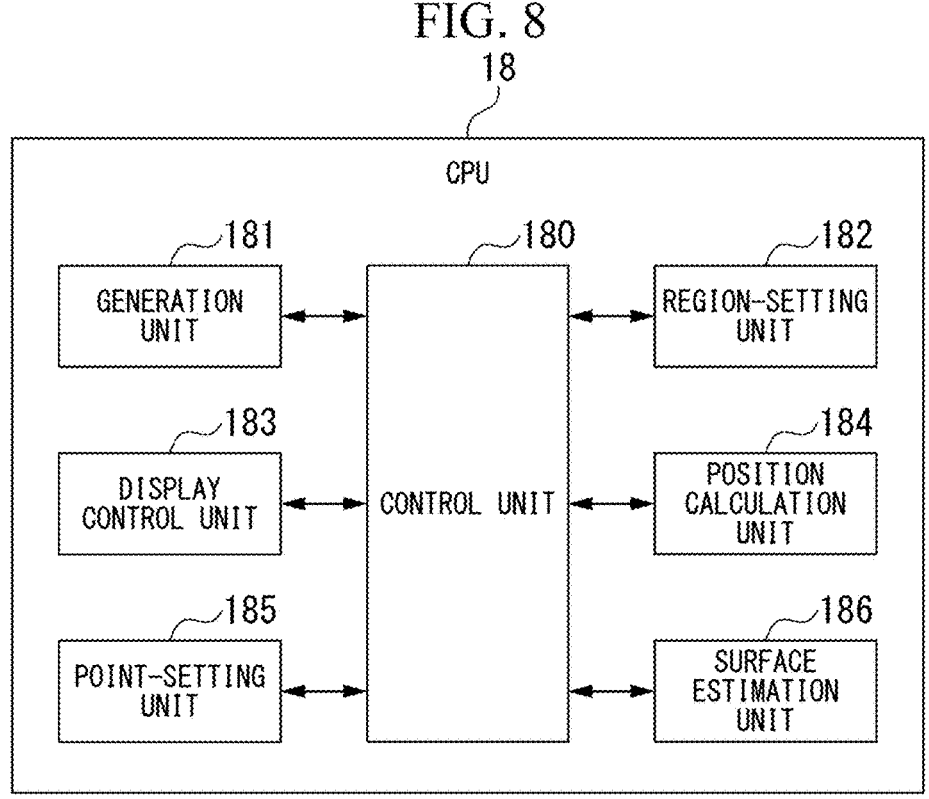
FIG. 8 is a block diagram showing a functional configuration of a CPU included in the endoscope device according to the second embodiment of the present invention.

FIG. 8 shows a functional configuration of the CPU 18. The CPU 18 has functional units including a control unit 180, a generation unit 181, a region-setting unit 182, a display control unit 183, a position calculation unit 184, a point-setting unit 185, and a surface estimation unit 186. At least one of the blocks shown in FIG. 8 may be constituted by a different circuit from the CPU 18.

Each unit shown in FIG. 8 may be constituted by at least one of a processor and a logic circuit. Each unit shown in FIG. 8 may include one or a plurality of processors. Each unit shown in FIG. 8 may include one or a plurality of logic circuits.

The control unit 180 acquires a 2D image (image data) of a subject from the video-signal-processing circuit 12 and controls processing executed by each unit shown in FIG. 8.

The generation unit 181 has the same function as that of the generation unit 70 shown in FIG. 1. The generation unit 181 calculates 3D coordinates of three or more points on a subject on the basis of a 2D image of the subject and generates point-cloud data including the 3D coordinates of the three or more points (generation step). The generation unit 181 can generate the point-cloud data by using the same method as that shown in the first embodiment. In addition, the generation unit 181 generates a 3D image for displaying the point-cloud data on the display unit 5.

The region-setting unit 182 has the same function as that of the region-setting unit 71 shown in FIG. 1. The region-setting unit 182 sets a reference region that is one of a three-dimensional region and a two-dimensional region (region-setting step). The region-setting unit 182 can set a reference region by using the same method as that shown in the first embodiment.

The display control unit 183 displays the 2D image of the subject acquired by the imaging device 28 and the 3D image of the point-cloud data generated by the generation unit 181 on the display unit 5. For example, the display control unit 183 controls processing executed by the video-signal-processing circuit 12. The display control unit 183 causes the video signal processed by the video-signal-processing circuit 12 to be output from the video-signal-processing circuit 12 to the display unit 5. The video signal includes color data of each pixel of the 2D image of the subject. The display unit 5 displays the 2D image of the subject on the basis of the video signal output from the video-signal-processing circuit 12.

Alternatively, the display control unit 183 outputs a 3D video signal to the display unit 5 via the video-signal-processing circuit 12. The 3D video signal includes color data of each pixel of the 3D image of the point-cloud data. The display unit 5 displays the 3D image of the point-cloud data on the basis of the 3D video signal output from the video-signal-processing circuit 12. Specifically, the display control unit 183 generates a graphic image signal for displaying the 3D image of the point-cloud data. The display control unit 183 outputs the generated graphic image signal to the video-signal-processing circuit 12. The video-signal-processing circuit 12 combines the video signal output from the CCU 9 and the graphic image signal output from the CPU 18. The video-signal-processing circuit 12 outputs the combined video signal to the display unit 5. The display unit 5 displays the 2D image of the subject and the 3D image of the point-cloud data.

The display control unit 183 displays various kinds of information on the display unit 5. In other words, the display control unit 183 displays various kinds of information on an image. The various kinds of information include a measurement result or the like. The various kinds of information may include a cursor. The cursor is a mark used by a user to designate a specific point on an image.

For example, the display control unit 183 generates a graphic image signal of the various kinds of information. The display control unit 183 outputs the generated graphic image signal to the video-signal-processing circuit 12. The video-signal-processing circuit 12 combines the video signal output from the CCU 9 and the graphic image signal output from the CPU 18. In this way, the various kinds of information are superimposed on an image. The video-signal-processing circuit 12 outputs the combined video signal to the display unit 5. The display unit 5 displays an image on which the various kinds of information are superimposed.

A user inputs position information indicating a position on an image into the operation unit 4 by operating the operation unit 4. The operation unit 4 outputs the position information input into the operation unit 4 by a user. The position information input into the operation unit 4 is input into the control interface 17, which is an input unit. The position information is output from the control interface 17 to the CPU 18. The position calculation unit 184 calculates a position on an image on the basis of the position information input into the operation unit 4.

For example, in a case in which the cursor is displayed on an image, the position information indicates a position at which the cursor is displayed. The display control unit 183 displays a cursor at the position calculated by the position calculation unit 184.

In a case in which the display unit 5 and the operation unit 4 are constituted as a touch panel, a user may input a position on an image into the operation unit 4 by touching the screen of the display unit 5. In such a case, the operation unit 4 outputs position information indicating the position.

The point-setting unit 185 accepts a point on a subject through the operation unit 4. For example, a user moves a cursor to an intended position on an image and performs a predetermined operation. At this time, the point-setting unit 185 accepts a point corresponding to the position. In a case in which the display unit 5 and the operation unit 4 are constituted as a touch panel, a user inputs a point on the image into the operation unit 4 by touching the screen of the display unit 5. The point-setting unit 185 accepts the point. The point-setting unit 185 generates point information indicating the accepted point.

In a case in which the point-setting unit 185 accepts a point on the 2D image of the subject, the point information includes coordinates of a pixel corresponding to the point. The coordinates of the pixel are associated with the 3D coordinates in the point-cloud data. In a case in which the point-setting unit 185 accepts a point on the 3D image of the point-cloud data, the point information includes the 3D coordinates of the point.

The point-setting unit 185 accepts a reference point. The reference point indicates a reference position for setting a reference region.

In a case in which the point-setting unit 185 accepts a point on the 2D image of the subject, the point-setting unit 185 sets the accepted point in the 2D image. In a case in which the point-setting unit 185 accepts a point on the 3D image of the point-cloud data, the point-setting unit 185 sets the accepted point in the 3D image. The position information of the point set by the point-setting unit 185 is held on the RAM 14. The point is set by associating the point with a specific image.

The surface estimation unit 186 estimates a reference surface that approximates the surface of the subject on the basis of three or more points of the point-cloud data corresponding to the three or more points included in the reference region (estimation step). The surface estimation unit 186 can estimate a reference surface by using the same method as that shown in the first embodiment.

Figure 9:
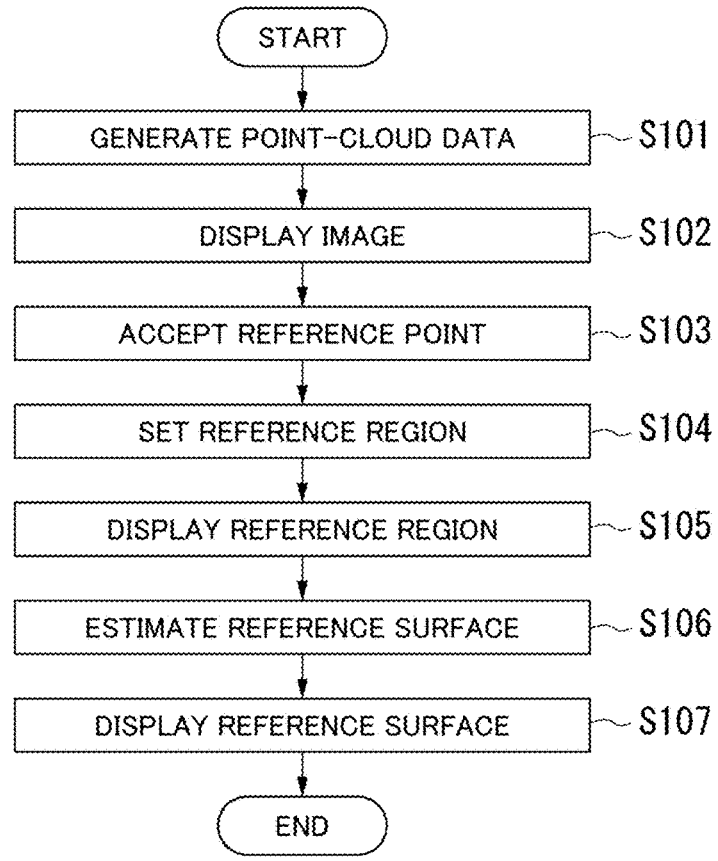
FIG. 9 is a flow chart showing a procedure of surface estimation processing in the second embodiment of the present invention.

Surface estimation processing in the second embodiment will be described by using FIG. 9. FIG. 9 shows a procedure of the surface estimation processing.

The generation unit 181 calculates 3D coordinates of three or more points on a subject on the basis of the 2D image of the subject and generates point-cloud data including the 3D coordinates of the three or more points. In addition, the generation unit 181 generates a 3D image of the point-cloud data (Step S101). Step S101 corresponds to the generation step.

After Step S101, the display control unit 183 displays the 2D image of the subject and the 3D image of the point-cloud data on the display unit 5 (Step S102). The display control unit 183 may display only the 2D image of the subject on the display unit 5.

Figure 10:
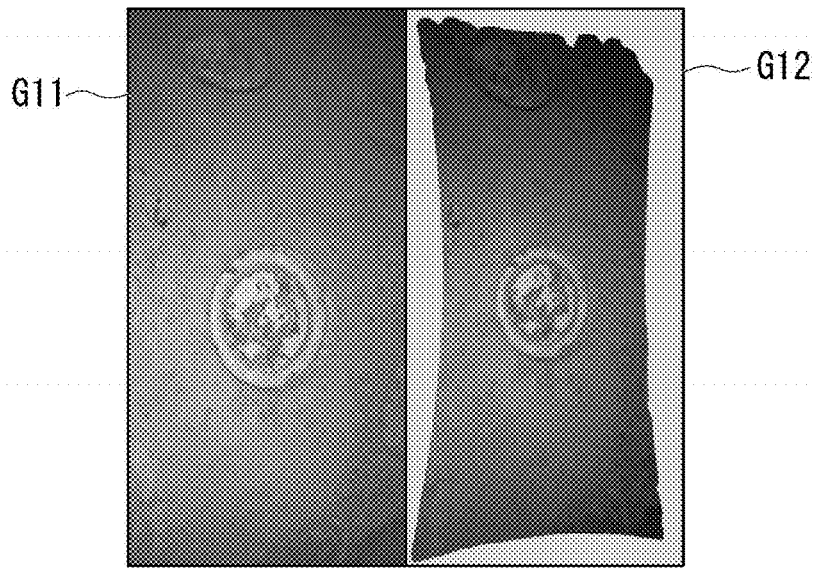
FIG. 10 is a diagram showing an example of an image displayed on a display unit in the second embodiment of the present invention.

FIG. 10 shows an example of an image displayed on the display unit 5 in Step S102. A 2D image G11 of a subject and a 3D image G12 of the point-cloud data are displayed on the display unit 5. When an instruction to change the viewpoint of the 3D image G12 is input through the operation unit 4, the generation unit 181 may generate a new 3D image of the point-cloud data corresponding to the subject seen from the changed viewpoint. The display control unit 183 may display the new 3D image on the display unit 5 instead of the 3D image G12.

In the example shown in FIG. 10, the 2D image G11 and the 3D image G12 are arranged in the horizontal direction of the screen of the display unit 5. The disposition of the 2D image G11 and the 3D image G12 is not limited to this example. For example, the 2D image G11 and the 3D image G12 may be arranged in the vertical direction of the screen of the display unit 5. At this time, the 2D image G11 and the 3D image G12 may rotate by 90 degrees. Part of the 2D image G11 and part of the 3D image G12 may overlap each other.

In a case in which the 2D image of the subject is a stereo image, the 2D image includes a first image of the subject seen from a first viewpoint and a second image of the subject seen from a second viewpoint different from the first viewpoint. The display control unit 183 may display the first image and the second image on the display unit 5. Alternatively, the display control unit 183 may display only one of the first image and the second image on the display unit 5.

After Step S102, the point-setting unit 185 accepts two reference points on the 2D image of the subject through the operation unit 4 and generates point information indicating each of the two accepted reference points (Step S103).

Figure 11:
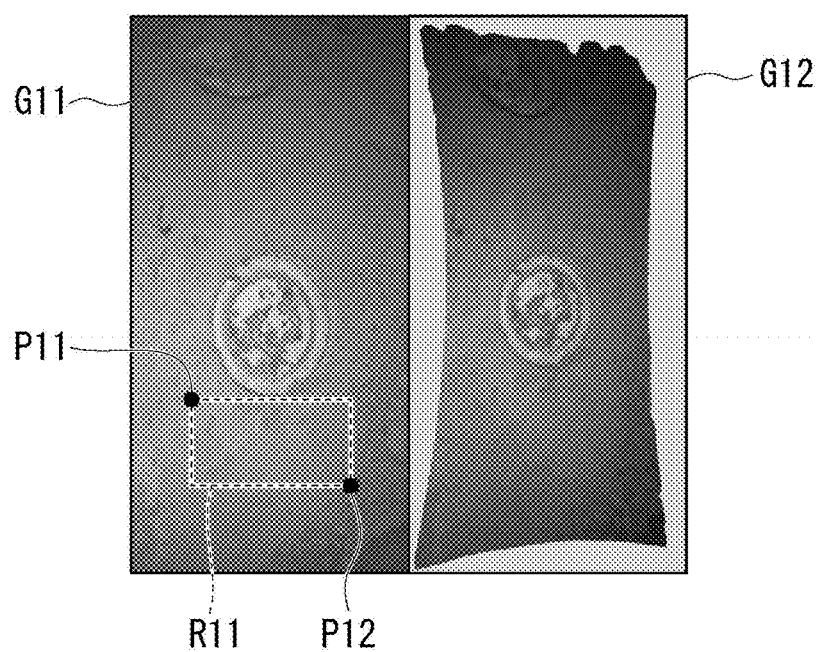
FIG. 11 is a diagram showing an example of an image displayed on the display unit in the second embodiment of the present invention.

FIG. 11 shows an example of an image displayed on the display unit 5 in Step S103. The same 2D image G11 as that shown in FIG. 10 and the same 3D image G12 as that shown in FIG. 10 are displayed on the display unit 5.

In an example in which a cursor is displayed on the 2D image G11, a user moves the cursor to an intended position on the 2D image G11 and performs a predetermined operation. At this time, the point-setting unit 185 accepts a point corresponding to the position. In an example in which the display unit 5 and the operation unit 4 are constituted as a touch panel, a user touches the screen of the display unit 5. At this time, the point-setting unit 185 accepts a point corresponding to the touched position.

In the example shown in FIG. 11, the point-setting unit 185 accepts a reference point P11 and a reference point P12. A mark indicating the reference point P11 and a mark indicating the reference point P12 may be displayed on the 2D image G11.

After Step S103, the region-setting unit 182 sets a reference region on the basis of the two reference points indicated by the point information (Step S104). Step S104 corresponds to the region-setting step.

The region-setting unit 182 sets a two-dimensional reference region on the 2D image of the subject. For example, the region-setting unit 182 sets a reference region R11 on the 2D image G11 on the basis of the reference point P11 and the reference point P12 shown in FIG. 11. In the example shown in FIG. 11, the shape of the reference region R11 is a rectangle. The reference point P11 and the reference point P12 are vertices on the diagonal line of the reference region R11.

Information of the reference region set by the region-setting unit 182 is held on the RAM 14. The information includes the position of the reference region and the size of the reference region. The reference region is set by associating the reference region with the 2D image of the subject.

After Step S104, the display control unit 183 displays the reference region on the 2D image of the subject (Step S105).

Specifically, the display control unit 183 generates a graphic image signal for displaying the reference region. The display control unit 183 outputs the generated graphic image signal to the video-signal-processing circuit 12. The video-signal-processing circuit 12 combines the video signal output from the CCU 9 and the graphic image signal output from the CPU 18. The video-signal-processing circuit 12 outputs the combined video signal to the display unit 5. The display unit 5 displays the 2D image of the subject on which the reference region is superimposed.

Figure 12:
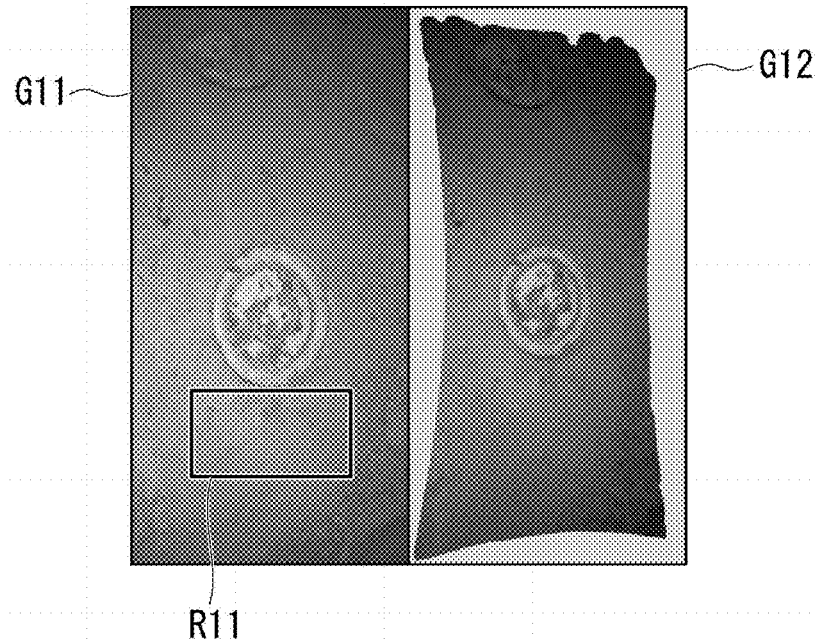
FIG. 12 is a diagram showing an example of an image displayed on the display unit in the second embodiment of the present invention.

FIG. 12 shows an example of an image displayed on the display unit 5 in Step S105. The same 2D image G11 as that shown in FIG. 10 and the same 3D image G12 as that shown in FIG. 10 are displayed on the display unit 5. A reference region R11 is displayed on the 2D image G11.

In the example shown in FIG. 12, a line (frame) indicating the outline of the reference region R11 is displayed on the 2D image G11. In the example shown in FIG. 12, the surface of the subject in the reference region R11 is visible. The inside of the reference region R11 may be displayed in a predetermined color or pattern. At this time, the surface of the subject in the reference region R11 is not necessarily visible. As long as a user can check the position and the size of the reference region R11, a method of displaying the reference region R11 is not limited to the above-described methods.

The display control unit 183 displays the 2D image of the subject on the display unit 5 in Step S102 and displays the reference region on the 2D image in Step S105 (image display step). A user can check whether or not the reference region is set at a position intended by the user.

After Step S105, the surface estimation unit 186 estimates a reference surface that approximates the surface of the subject on the basis of three or more points of the point-cloud data corresponding to the three or more points included in the reference region (Step S106). Step S106 corresponds to the estimation step.

The surface estimation unit 186 extracts all the pixels in the reference region of the 2D image of the subject. The pixels in the 2D image of the subject are associated with the 3D coordinates in the point-cloud data. The surface estimation unit 186 acquires 3D coordinates of each of the extracted pixels from the point-cloud data. The surface estimation unit 186 estimates a reference surface by using the acquired 3D coordinates.

The surface estimation unit 186 may select three or more points from four or more points included in the reference region in the estimation step. The surface estimation unit 186 may estimate a reference surface that approximates the surface of the subject on the basis of three or more points of the point-cloud data corresponding to the three or more selected points in the estimation step.

In other words, the surface estimation unit 186 may extract some of all the pixels in the reference region of the 2D image of the subject. For example, the surface estimation unit 186 may extract greater than or equal to a predetermined rate (for example, 50%) of all the pixels in the reference region of the 2D image. The extracted pixels include one or more combinations, each of which is constituted by three pixels that form a triangle.

After Step S106, the display control unit 183 displays the reference surface on the 2D image of the subject (Step S107). When Step S107 is executed, the surface estimation processing is completed.

Specifically, the display control unit 183 generates a graphic image signal for displaying the reference surface. The display control unit 183 outputs the generated graphic image signal to the video-signal-processing circuit 12. The video-signal-processing circuit 12 combines the video signal output from the CCU 9 and the graphic image signal output from the CPU 18. The video-signal-processing circuit 12 outputs the combined video signal to the display unit 5. The display unit 5 displays the 2D image of the subject on which the reference surface is superimposed.

Figure 13:
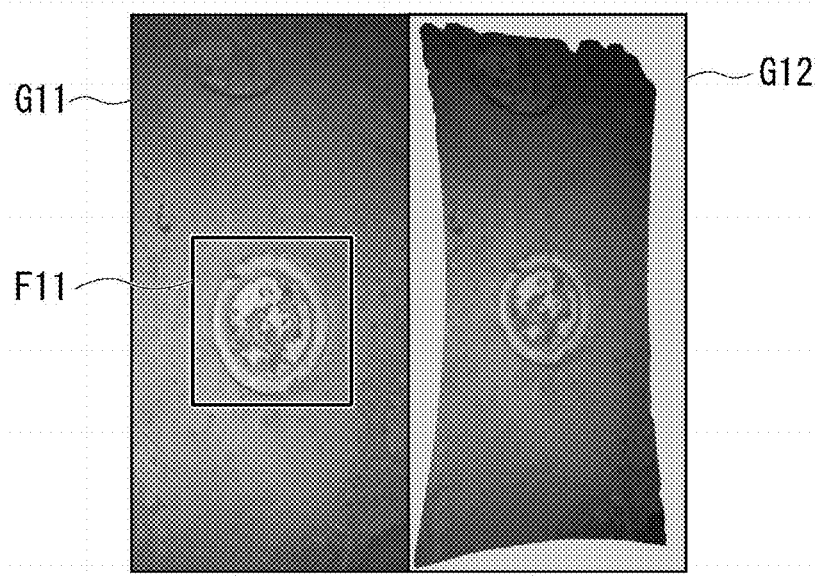
FIG. 13 is a diagram showing an example of an image displayed on the display unit in the second embodiment of the present invention.

FIG. 13 shows an example of an image displayed on the display unit 5 in Step S107. The same 2D image G11 as that shown in FIG. 10 and the same 3D image G12 as that shown in FIG. 10 are displayed on the display unit 5. A reference surface F11 displayed on the 2D image G11.

For example, the display control unit 183 acquires 3D coordinates associated with each pixel in the 2D image G11 from the point-cloud data. The display control unit 183 calculates the three-dimensional distance (3D distance) between the point having the 3D coordinates and the reference surface. When the 3D distance is less than a predetermined distance, the display control unit 183 extracts a pixel on the 2D image G11 corresponding to the point. The display control unit 183 repeats the above-described processing by using all or some of the pixels of the 2D image G11. The display control unit 183 generates a graphic image signal for displaying a region including the extracted pixels as a reference surface.

In the example shown in FIG. 13, a line (frame) indicating the outline of the region including the extracted pixels is displayed as the reference surface F11 on the 2D image G11. In the example shown in FIG. 13, the surface of the subject within the line indicating the reference surface F11 is visible. The inside of the line may be displayed in a predetermined color or pattern. At this time, the surface of the subject within the line is not necessarily visible. As long as a user can check the position of the reference surface F11, a method of displaying the reference surface F11 is not limited to the above-described methods. A user can check whether or not the reference surface F11 accurately approximates the surface of the subject.

In the example shown in FIG. 13, the reference region R11 shown in FIG. 12 is not displayed. The reference region R11 and the reference surface F11 may be displayed on the 2D image G11.

The display control unit 183 displays the 2D image of the subject on the display unit 5 in Step S102 and displays the region corresponding to the reference surface on the 2D image in Step S107 (image display step). A user can check whether or not the reference surface accurately approximates the surface of the subject.

After the point-setting unit 185 accepts the reference point in Step S103, a user may change the reference point. For example, a user inputs position information indicating a new position of the reference point into the operation unit 4. The position information is output to the CPU 18 through the control interface 17. The region-setting unit 182 changes the reference point on the basis of the position information.

Region information indicating at least one of the size of the reference region and the position of the reference region may be recorded on a recording medium in advance. The region-setting unit 182 may set at least one of the size of the reference region and the position of the reference region on the basis of the region information in Step S104.

For example, the memory card 42 stores the region information. The region information is transferred from the memory card 42 to the RAM 14 via the card interface 15. The region-setting unit 182 reads the region information from the RAM 14.

An example in which the region-setting unit 182 sets the size of the reference region will be described. A user designates a reference point on the 2D image of the subject, and the point-setting unit 185 accepts the reference point. The region-setting unit 182 sets a rectangle of which the center is at the reference point accepted by the point-setting unit 185 in the 2D image. The region information indicates the number of pixels of the reference region in the horizontal direction and the number of pixels of the reference region in the vertical direction. The region-setting unit 182 sets the number of pixels of the rectangle in the horizontal direction and the number of pixels of the rectangle in the vertical direction on the basis of the region information. Each time a user designates the size of the reference region, region information indicating the size may be recorded on a recording medium.

An example in which the region-setting unit 182 sets the position of the reference region will be described. The region information indicates a predetermined position on the 2D image of the subject. For example, the predetermined position is the center of the 2D image. The region-setting unit 182 sets the reference region at the position indicated by the region information. At this time, the region-setting unit 182 sets the size of the reference region to that designated by a user. Each time a user designates a position (reference point) of the reference region, region information indicating the position may be recorded on a recording medium. The region-setting unit 182 may set the size of the reference region and the position of the reference region on the basis of the region information.

Two or more pieces of the region information may be recorded on a recording medium in advance. The region-setting unit 182 may select one of the two or more pieces of the region information on the basis of information input through the operation unit 4 in Step S104. The region-setting unit 182 may set one of the size of the reference region and the position of the reference region on the basis of the selected region information in Step S104.

The two or more pieces of the region information indicate different sizes. For example, first region information indicates a first size, and second region information indicates a second size different from the first size. Alternatively, the two or more pieces of the region information indicate different positions. For example, first region information indicates a first position, and second region information indicates a second position different from the first position. A user selects one of the first region information and the second region information and inputs a selection result into the operation unit 4. The selection result is output to the CPU 18 via the control interface 17. The region-setting unit 182 sets the size of the reference region or the position of the reference region on the basis of the region information selected by a user.

After the region-setting unit 182 sets the reference region in Step S104, a user may change at least one of the size of the reference region and the position of the reference region at any timing. The timing may come after the reference region is displayed in Step S105 or after the reference surface is displayed in Step S107. For example, a user inputs information indicating at least one of the size and the position into the operation unit 4. The information is output to the CPU 18 via the control interface 17. The region-setting unit 182 changes at least one of the size of the reference region and the position of the reference region on the basis of the information.

In the surface estimation processing shown in FIG. 9, the region-setting unit 182 sets the reference region on the basis of the two reference points. The number of reference points is not limited to two. As described above, the region-setting unit 182 may set a reference region of which the center is at one reference point.

The region-setting unit 182 may set a reference region without using a reference point. Accordingly, Step S103 does not need to be executed. The CPU 18 does not need to have the functions of the position calculation unit 184 and the point-setting unit 185. A method of setting a reference region without using a reference point will be described in the tenth embodiment.

The display control unit 183 may display the 3D image of the point-cloud data on the display unit 5 and may display the three or more points of the point-cloud data used for estimating the reference surface on the 3D image (image display step). Three or more points included in the three-dimensional reference region are used for estimating the reference surface. The display control unit 183 extracts the three or more points from the point-cloud data and displays the three or more points on the 3D image. For example, pixels corresponding to the points are displayed in a predetermined color.

The display control unit 183 may display the 2D image of the subject on the display unit 5 and may display three or more points corresponding to the three or more points of the point-cloud data used for estimating the reference surface on the 2D image (image display step). The three or more points of the point-cloud data corresponding to the three or more points included in the two-dimensional reference region are used for estimating the reference surface. The display control unit 183 extracts the three or more points from the point-cloud data. The display control unit 183 extracts, from the reference region, points corresponding to the respective three or more points extracted from the point-cloud data and displays the points on the 2D image. For example, pixels corresponding to the points are displayed in a predetermined color.

The reference region does not need to be displayed. Accordingly, Step S105 does not need to be executed. The reference surface does not need to be displayed. Accordingly, Step S107 does not need to be executed.

In a case in which setting the reference point, displaying the reference region, and displaying the reference surface are unnecessary, an image does not need to be displayed. Accordingly, Step S102 does not need to be executed. The CPU 18 does not need to have the function of the display control unit 183.

The surface estimation unit 186 may estimate geometric features of the reference surface in Step S106. For example, in a case in which the reference surface is a cylindrical surface, the surface estimation unit 186 may estimate the diameter of the cylinder. In a case in which the reference surface is a spherical surface, the surface estimation unit 186 may estimate the diameter of the sphere.

The surface estimation unit 186 may estimate the gradient of the reference surface. The gradient is expressed as an angle between a predetermined plane and the reference surface. For example, the predetermined plane is vertical to the visual line of the endoscope.

The surface estimation unit 186 may estimate the type of the reference surface. The type indicates one of a plane, a cylindrical surface, a spherical surface, and the like. The surface estimation unit 186 estimates a reference surface by assuming that the reference surface is a plane. At this time the surface estimation unit 186 calculates an estimation error on the basis of the distance between the reference surface and the surface of the subject or the like. Similarly, the surface estimation unit 186 estimates a reference surface by assuming that the reference surface is a cylindrical surface, a spherical surface, or the like and calculates an estimation error. The surface estimation unit 186 obtains a reference surface having the smallest estimation error as a final reference surface. At this time, the surface estimation unit 186 obtains the type of the reference surface.

The estimation result of the reference surface may include a parameter of an expression of the reference surface.

The display control unit 183 may display an estimation result of geographic features of the reference surface on the display unit 5. The estimation result is included in the graphic image signal generated by the display control unit 183.

The order of processing in the surface estimation processing is not limited to that shown in FIG. 9. For example, the 2D image of the subject may be displayed on the display unit 5 before Step S101 is executed.

In the second embodiment, the endoscope device 1 sets a two-dimensional reference region on the 2D image of the subject. The reference region includes three or more points that two-dimensionally expand. Therefore, three or more points of the point-cloud data used for estimating a reference surface are less likely to be biased on a plane or a straight line. Accordingly, the endoscope device 1 can improve the accuracy of a reference surface.

First Modified Example of Second Embodiment

A first modified example of the second embodiment of the present invention will be described. In the examples shown in FIGS. 10 to 13, the 2D image of the subject and the 3D image of the point-cloud data are displayed on the display unit 5, and the 2D image is used for setting a two-dimensional reference region. A combination of an image displayed on the display unit 5 and an image used for setting a reference region is not limited to these examples. In the first modified example of the second embodiment, the 3D image of the point-cloud data is displayed on the display unit 5 and is used for setting a three-dimensional reference region.

Surface estimation processing in the first modified example of the second embodiment will be described. The surface estimation processing in the first modified example of the second embodiment is executed in accordance with FIG. 9. Hereinafter, the same processing as the surface estimation processing in the second embodiment will not be described.

The display control unit 183 displays the 3D image of the point-cloud data on the display unit 5 in Step S102 (image display step). In Step S102, the 2D image of the subject is not displayed. The point-setting unit 185 accepts three reference points on the 3D image of the point-cloud data through the operation unit 4 and generates point information indicating each of the three accepted reference points in Step S103.

Figure 14:
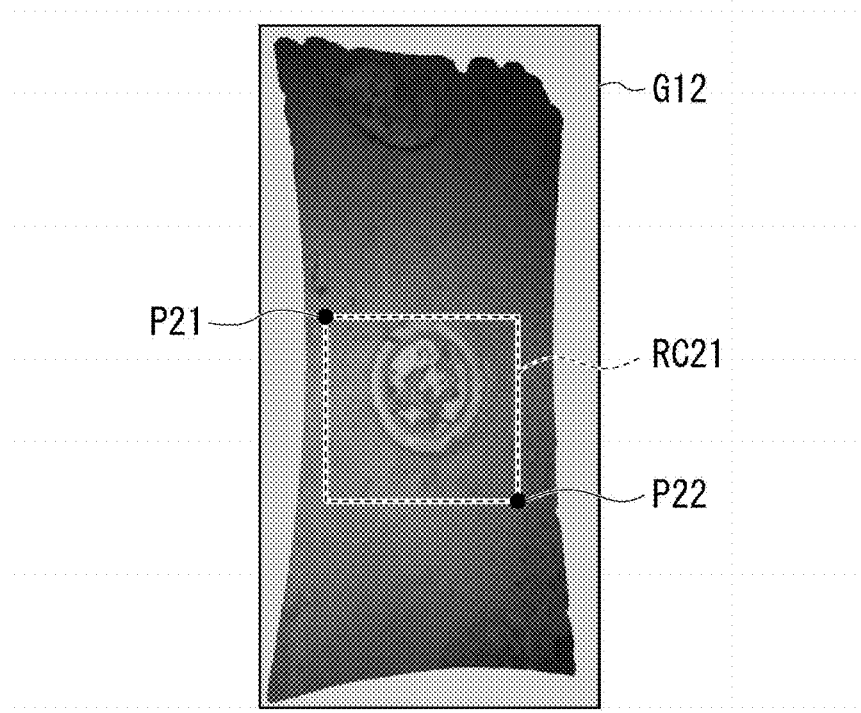
FIG. 14 is a diagram showing an example of an image displayed on a display unit in a first modified example of the second embodiment of the present invention.

FIG. 14 shows an example of an image displayed on the display unit 5 in Step S103. The same 3D image G12 as that shown in FIG. 10 is displayed on the display unit 5.

In an example in which a cursor is displayed on the 3D image G12, a user moves the cursor to an intended position on the 3D image G12 and performs a predetermined operation. At this time, the point-setting unit 185 accepts a point corresponding to the position. In an example in which the display unit 5 and the operation unit 4 are constituted as a touch panel, a user touches the screen of the display unit 5. At this time, the point-setting unit 185 accepts a point corresponding to the touched position.

In the example shown in FIG. 14, the point-setting unit 185 accepts a reference point P21 and a reference point P22. A mark indicating the reference point P21 and a mark indicating the reference point P22 may be displayed on the 3D image G12.

The region-setting unit 182 sets a three-dimensional reference region in the 3D space defining the 3D coordinates of the point-cloud data in Step S104. In the example shown in FIG. 14, the region-setting unit 182 calculates a rectangle RC21 on the basis of the reference point P21 and the reference point P22. The reference point P21 and the reference point P22 are vertices on the diagonal line of the rectangle RC21.

Figure 15:
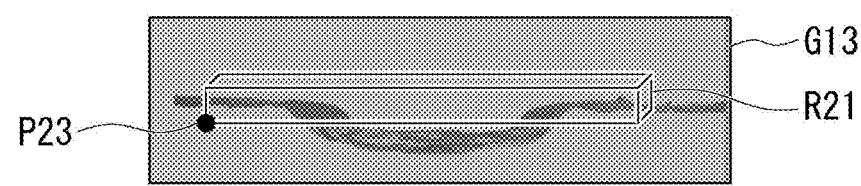
FIG. 15 is a diagram showing an example of an image displayed on the display unit in the first modified example of the second embodiment of the present invention.

After two reference points are set, a user designates a third reference point. FIG. 15 shows an example of an image displayed on the display unit 5 when the third reference point is designated. A 3D image G13 of the point-cloud data is displayed on the display unit 5. In an example in which the display unit 5 and the operation unit 4 are constituted as a touch panel, a user performs a swipe operation on the 3D image G12 shown in FIG. 14 and changes the viewpoint of the 3D image G12. The 3D image G13 shows a cross-section of the subject seen in the 3D image G12 shown in FIG. 14.

A user designates a reference point P23 by using a cursor displayed on the 3D image G13 or by touching the screen of the display unit 5. The point-setting unit 185 accepts the reference point P23. A mark indicating the reference point P23 may be displayed on the 3D image G13. In an example in which the display unit 5 and the operation unit 4 are constituted as a touch panel, a user may magnify or reduce the 3D image G13 by performing a pinch operation.

In the examples shown in FIG. 14 and FIG. 15, the region-setting unit 182 calculates a reference region R21 on the basis of the reference point P21, the reference point P22, and the reference point P23. The region-setting unit 182 sets the reference region R21 in the 3D space defining the 3D coordinates of the point-cloud data. In the example shown in FIG. 15, the shape of the reference region R21 is a cuboid. One of the surfaces of the cuboid is defined by the rectangle RC21 shown in FIG. 14. The height of the cuboid is the same as the 3D distance between the rectangle RC21 and the reference point P23.

Information of the reference region set by the region-setting unit 182 is held on the RAM 14. The information includes the position of the reference region and the size of the reference region. The reference region is set by associating the reference region with the point-cloud data.

The display control unit 183 displays the reference region on the 3D image of the point-cloud data in Step S105 (image display step). The display unit 5 displays the 3D image on which the reference region is superimposed. A user can check whether or not the reference region is set at a position intended by the user.

The surface estimation unit 186 estimates a reference surface on the basis of three or more points of the point-cloud data corresponding to three or more points included in the reference region in Step S106. For example, the surface estimation unit 186 extracts all the points in the reference region. The surface estimation unit 186 estimates a reference surface by using the 3D coordinates of each of the extracted points. The surface estimation unit 186 may extract some of the points in the reference region. For example, the surface estimation unit 186 may extract greater than or equal to a predetermined rate (for example, 50%) of all the points in the reference region. The extracted points include one or more combinations, each of which is constituted by three points that form a triangle. There is no straight line passing through all the extracted points.

The display control unit 183 displays the reference surface on the 3D image of the point-cloud data in Step S107. The display unit 5 displays the 3D image on which the reference surface is superimposed. A user can check whether or not the reference surface accurately approximates the surface of the subject.

Figure 16:
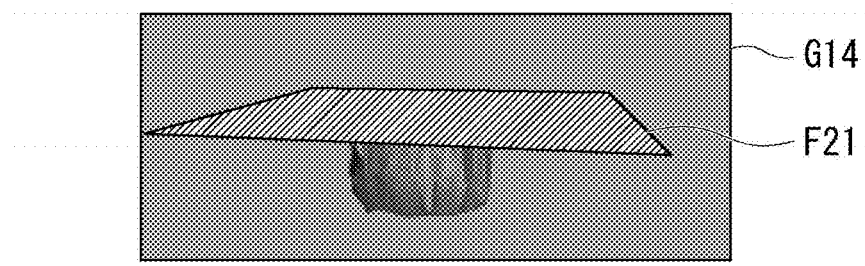
FIG. 16 is a diagram showing an example of an image displayed on the display unit in the first modified example of the second embodiment of the present invention.

FIG. 16 shows an example of an image displayed on the display unit 5 in Step S107. A 3D image G14 of the point-cloud data is displayed on the display unit 5.

For example, the display control unit 183 calculates the 3D distance between each point in the point-cloud data and the reference surface. When the 3D distance between the point and the reference surface is less than a predetermined distance, the display control unit 183 extracts the point. The display control unit 183 repeats the above-described processing by using points in all or part of the point-cloud data. The display control unit 183 generates a graphic image signal for displaying a region including the extracted points as the reference surface.

In the example shown in FIG. 16, a region including the extracted points is displayed as a reference surface F21 on the 3D image G14. For example, the reference surface F21 is displayed in a different color from that of the surface of the subject. As long as a user can check the position of the reference surface F21, a method of displaying the reference surface F21 is not limited to the above-described example. A user can check whether or not the reference surface F21 accurately approximates the surface of the subject.

In the examples shown in FIGS. 14 to 16, the 3D image of the point-cloud data is displayed on the display unit 5 and is used for setting a reference region. The 2D image of the subject and the 3D image of the point-cloud data may be displayed on the display unit 5, and the 3D image may be used for setting a reference region.

There is a case in which a recessed portion or a projection portion is formed on the surface of a subject and a reference surface approximating a part excluding the recessed portion or the projection portion is required. In a case in which a reference region is set in the 2D image of the subject, the reference region may include a pixel of the recessed portion or the projection portion. Therefore, the accuracy of a reference surface may deteriorate. Even when a step is formed on the surface of a subject and a reference region includes a pixel of the step, the accuracy of a reference surface may deteriorate.

In the first modified example of the second embodiment, the region-setting unit 182 sets a three-dimensional reference region. In the example shown in FIG. 15, the region-setting unit 182 sets the reference region R21 that does not include many points corresponding to the recessed portion of the subject. Therefore, the endoscope device 1 can improve the accuracy of a reference surface.

Second Modified Example of Second Embodiment

A second modified example of the second embodiment of the present invention will be described. In the second modified example of the second embodiment, a three-dimensional reference region is set. The reference region is a set of three or more points having continuity.

Surface estimation processing in the second modified example of the second embodiment will be described. The surface estimation processing in the second modified example of the second embodiment is executed in accordance with FIG. 9. Hereinafter, the same processing as the surface estimation processing in the first modified example of the second embodiment will not be described.

The region-setting unit 182 determines continuity of three or more points corresponding to the three-dimensional coordinates included in the point-cloud data in Step S104. The region-setting unit 182 sets a reference region including only three or more points determined to be continuous.

Specifically, the region-setting unit 182 sets a three-dimensional determination region. A method of setting a determination region is the same as the method of setting a reference region shown in the first modified example of the second embodiment. The region-setting unit 182 determines continuity of points in the determination region. For example, the region-setting unit 182 uses the 3D distance between two adjacent points. The region-setting unit 182 classifies each point in the determination region on the basis of the 3D distance.

Segmentation is known as a simple method of classifying each point corresponding to the point-cloud data. For example, the region-setting unit 182 can use Euclidean cluster extraction in segmentation. This is a function installed in a point cloud library (PCL), which is open source software.

The region-setting unit 182 determines a point within a predetermined distance of each point as a near-point by using this function. One point and a near-point thereof are on the same object. For example, in a case in which the subject includes a first object and a second object apart from each other, each point corresponding to the point-cloud data is classified into any one of a point on the first object and a point on the second object. The region-setting unit 182 assigns each of the three or more points corresponding to the three-dimensional coordinates included in the point-cloud data to one of two or more objects. In this way, the region-setting unit 182 divides (classifies) the three or more points in the point-cloud data into two or more regions. In the above-described example, the three or more points in the point-cloud data are divided into a first region constituted by points on a first object and a second region constituted by points on a second object. In a case in which the subject is constituted by only one object, the region-setting unit 182 assigns all the points in the point-cloud data to the object.

The region-setting unit 182 executes the above-described segmentation in the determination region. In this way, the region-setting unit 182 assigns each point in the determination region to any one of one or more objects. The region-setting unit 182 determines whether or not a point in the determination region constitutes a continuous surface on the basis of the result of the segmentation. Two or more points assigned to one object constitute a continuous surface of the subject. In other words, the two or more points have continuity. The surface of the subject is discontinuous between two objects. In other words, points lack continuity between the two objects. The region-setting unit 182 selects one object and extracts three or more points included in the selected object from the determination region. The region-setting unit 182 sets a reference region including the three or more extracted points. The reference region includes all or some of the points in the determination region.

Figure 17:
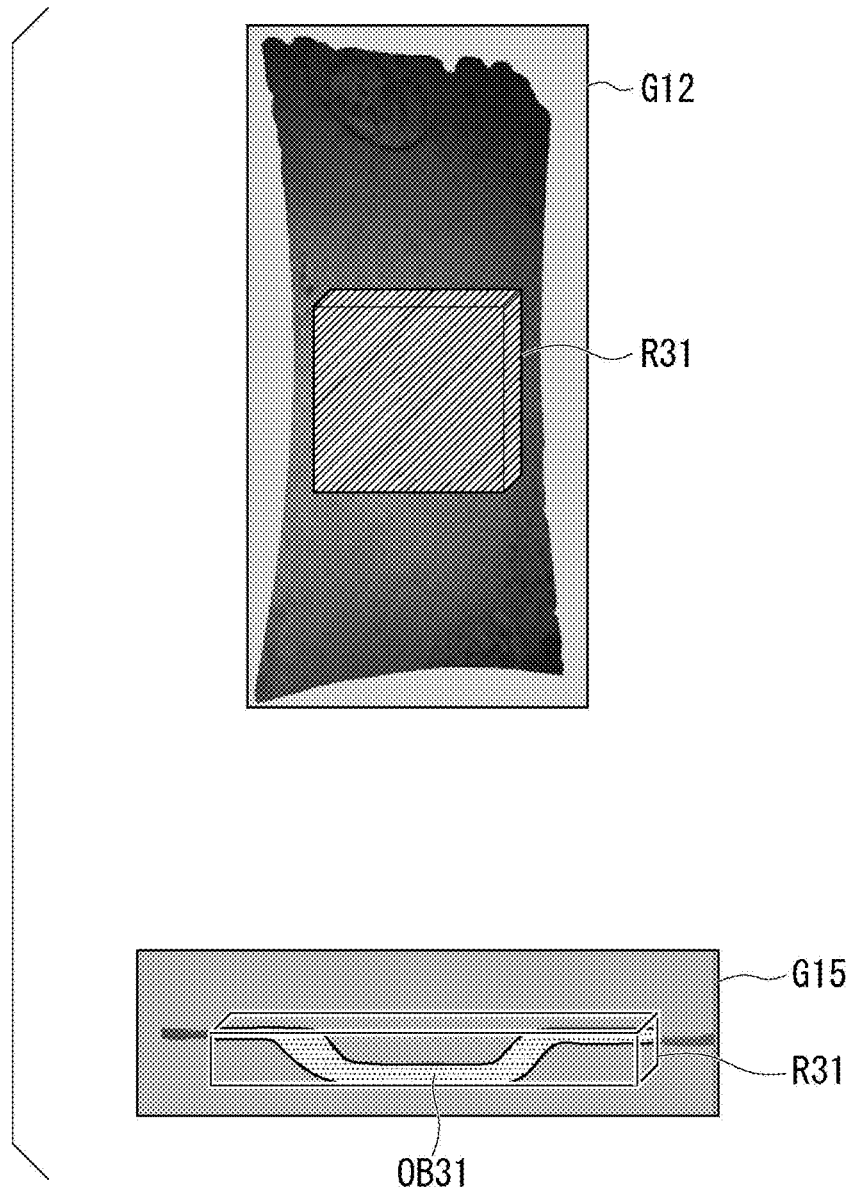
FIG. 17 is a diagram showing an example of a reference region in a second modified example of the second embodiment of the present invention.
Figure 18:
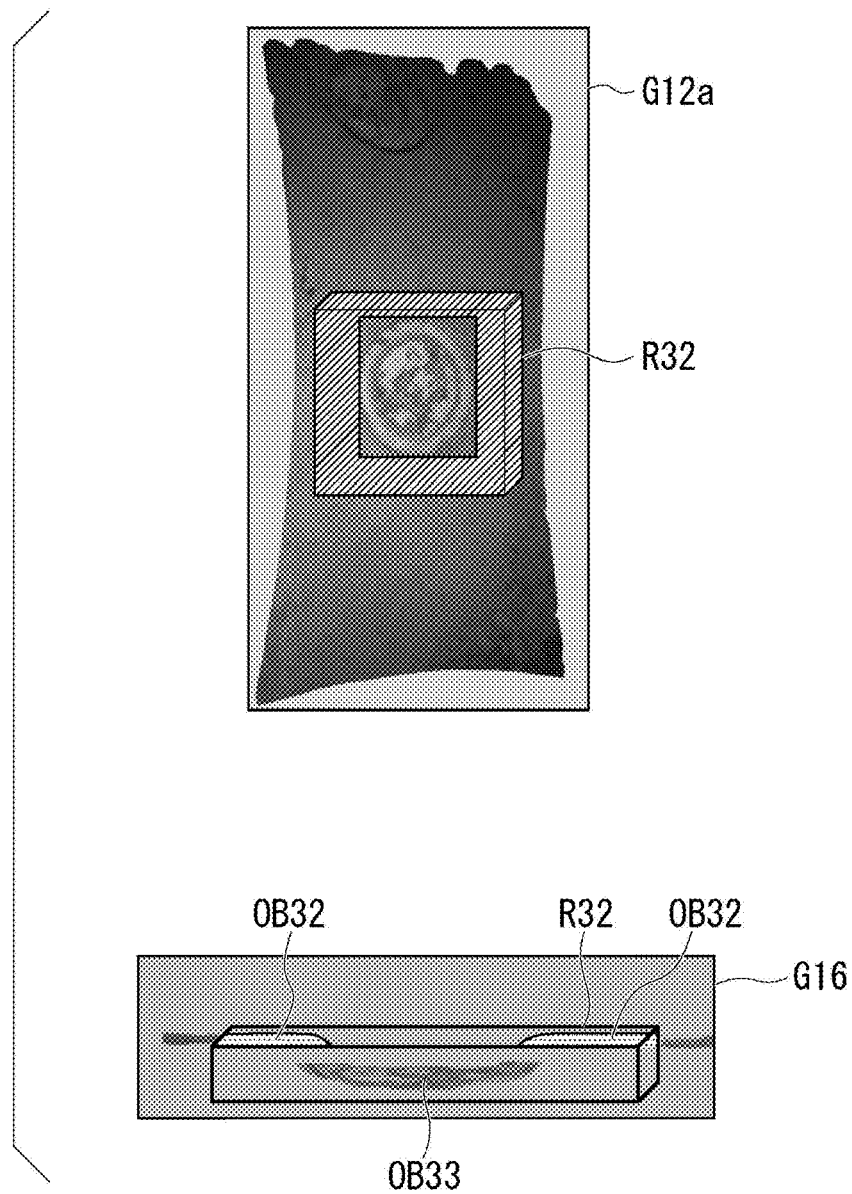
FIG. 18 is a diagram showing an example of the reference region in the second modified example of the second embodiment of the present invention.

FIG. 17 and FIG. 18 show examples of a reference region. Hereinafter, a reference region will be described by referring to the 3D image of the point-cloud data.

The same 3D image G12 as that shown in FIG. 10 is shown in FIG. 17. A 3D image G15 is shown in FIG. 17. The 3D image G15 shows a cross-section of the subject seen in the 3D image G12. The region-setting unit 182 assigns all the points in and around the recessed portion of the subject to an object OB31. The region-setting unit 182 sets a reference region R31 including points in the object OB31.

A 3D image G12a and a 3D image G16 are shown in FIG. 18. The 3D image G16 shows a cross-section of the subject seen in the 3D image G12a. The region-setting unit 182 assigns points in and around the recessed portion of the subject to an object OB32 or an object OB33. The object OB32 and the object OB33 are not connected to each other. The region-setting unit 182 sets a reference region R32 including points in the object OB32. The reference region R32 does not include points in the object OB33. Points in the object OB33 are not used for estimating a reference surface.

In a method of generating the point-cloud data by using two or more 2D images, there is a case in which a region seen in one 2D image is not seen in the other 2D images. Therefore, there is a case in which 3D coordinates of a point in the region cannot be calculated. In such a case, the surface of the subject indicated by the point-cloud data is discontinuous as shown in FIG. 18.

In the second modified example of the second embodiment, a reference surface is estimated on the basis of only points corresponding to a continuous surface of a subject. Therefore, the endoscope device 1 can improve the accuracy of a reference surface.

Third Modified Example of Second Embodiment

A third modified example of the second embodiment of the present invention will be described. In the third modified example of the second embodiment, a 3D image of the point-cloud data seen from each of two or more viewpoints is displayed on the display unit 5, and a reference surface is displayed on the 3D image.

Surface estimation processing in the third modified example of the second embodiment will be described. The surface estimation processing in the third modified example of the second embodiment is executed in accordance with FIG. 9. Hereinafter, the same processing as the surface estimation processing in the first modified example of the second embodiment will not be described.

The generation unit 181 generates a 3D image of the point-cloud data seen from each of two or more viewpoints in Step S101. Hereinafter, an example in which the generation unit 181 generates three 3D images will be described. Three directions of visual lines for generating three 3D images may be vertical to each other. For example, the generation unit 181 may generate a 3D image of the point-cloud data seen in a parallel direction to the X-axis, a 3D image of the point-cloud data seen in a parallel direction to the Y-axis, and a 3D image of the point-cloud data seen in a parallel direction to the Z-axis.

The display control unit 183 displays three 3D images on the display unit 5 in Step S102. The display control unit 183 displays a reference surface on each 3D image in Step S107. The display unit 5 displays the 3D image on which the reference surface is superimposed.

Figure 19:
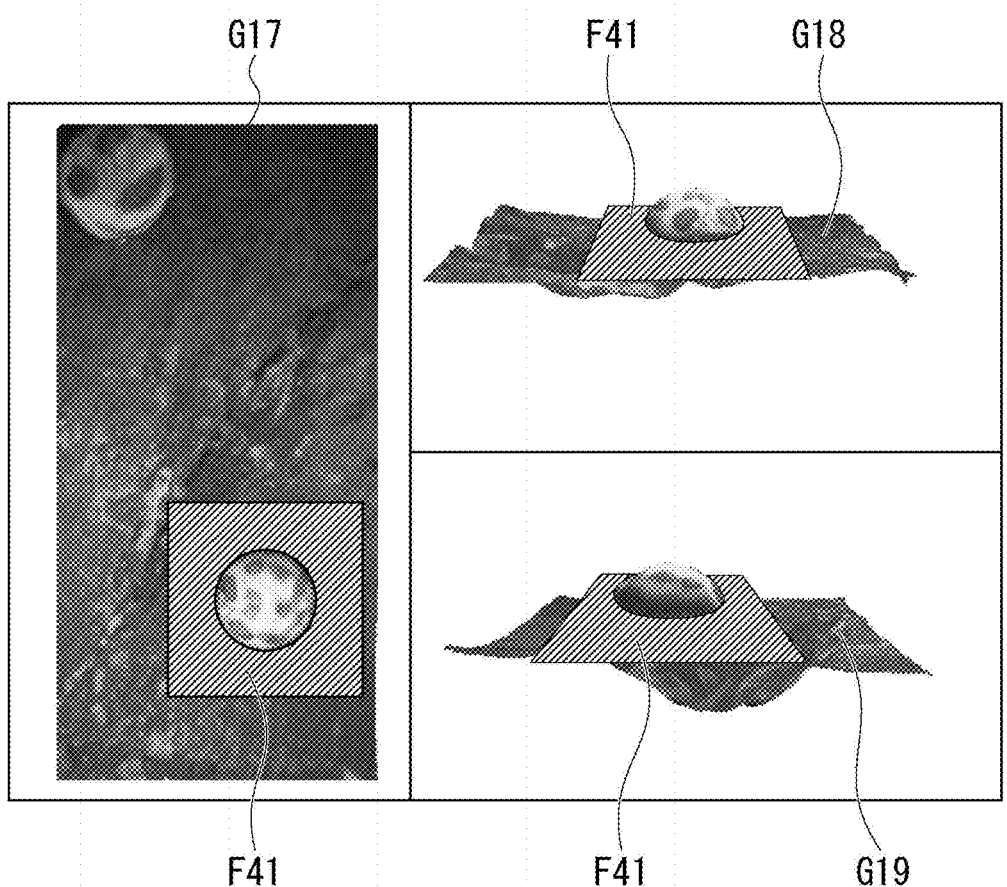
FIG. 19 is a diagram showing an example of an image displayed on a display unit in a third modified example of the second embodiment of the present invention.

FIG. 19 shows an example of an image displayed on the display unit 5 in Step S107. A 3D image G17, a 3D image G18, and a 3D image G19 are displayed on the display unit 5. The 3D image G17 is a 3D image of the point-cloud data seen from a first viewpoint. The 3D image G18 is a 3D image of the point-cloud data seen from a second viewpoint different from the first viewpoint. The 3D image G19 is a 3D image of the point-cloud data seen from a third viewpoint different from the first viewpoint and the second viewpoint.

The display control unit 183 executes similar processing to that for displaying the reference surface F21 shown in FIG. 16. The display control unit 183 displays a reference surface F41 on the 3D image G17, the 3D image G18, and the 3D image G19.

The display control unit 183 may display a 3D image of the point-cloud data seen in a parallel direction to the surface of the subject or the reference surface on the display unit 5. In this way, a user can easily check the reference surface.

The generation unit 181 may extract some of the points in the point-cloud data and may generate a 3D image including the extracted points. The display control unit 183 may display the 3D image on the display unit 5.

For example, the generation unit 181 generates a first 3D image of all the points in the point-cloud data. The first 3D image is a 3D image of the point-cloud data seen from a first viewpoint. The generation unit 181 generates a second 3D image including the points extracted from the point-cloud data. The second 3D image is a 3D image of the point-cloud data seen from a second viewpoint different from the first viewpoint. The display control unit 183 displays the first 3D image and the second 3D image on the display unit 5. At this time, the display control unit 183 may display the magnified second 3D image on the display unit 5. The display control unit 183 displays the reference surface on the first 3D image and the second 3D image.

In the third modified example of the second embodiment, a reference surface is displayed on the 3D image of the point-cloud data seen from each of two or more viewpoints. A user can check whether or not the reference surface accurately approximates the surface of the subject.

Third Embodiment

A third embodiment of the present invention will be described. The endoscope device 1 according to the third embodiment has a three-dimensional measurement function.

Figure 20:
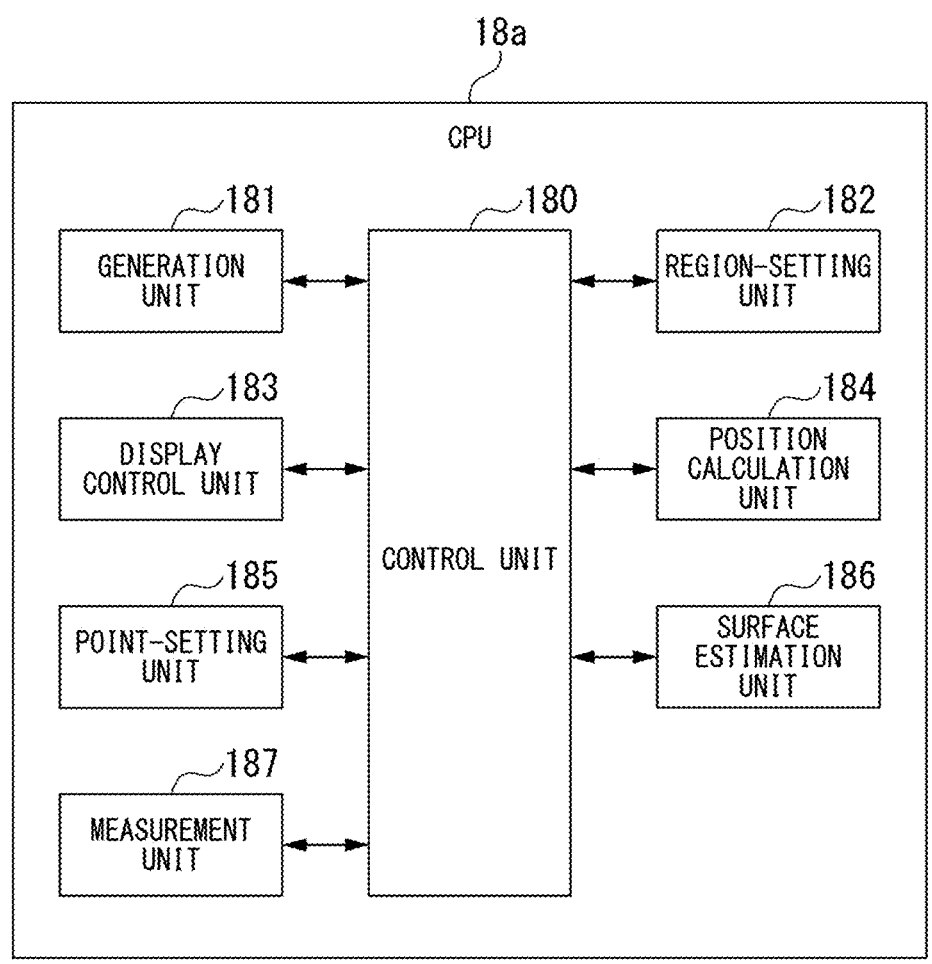
FIG. 20 is a block diagram showing a functional configuration of a CPU included in an endoscope device according to a third embodiment of the present invention.

In the third embodiment, the CPU 18 shown in FIG. 8 is changed to a CPU 18a shown in FIG. 20. FIG. 20 shows a functional configuration of the CPU 18a. The CPU 18a has functional units including a control unit 180, a generation unit 181, a region-setting unit 182, a display control unit 183, a position calculation unit 184, a point-setting unit 185, a surface estimation unit 186, and a measurement unit 187. At least one of the blocks shown in FIG. 20 may be constituted by a different circuit from the CPU 18a. The same configuration as that shown in FIG. 8 will not be described.

Each unit shown in FIG. 20 may be constituted by at least one of a processor and a logic circuit. Each unit shown in FIG. 20 may include one or a plurality of processors. Each unit shown in FIG. 20 may include one or a plurality of logic circuits.

The measurement unit 187 measures the size of a subject on the basis of the reference surface (measurement step). For example, the measurement unit 187 executes the surface-based measurement. In other words, the measurement unit 187 measures the 3D distance between the reference surface and a point on the surface of the subject in the measurement step.

The point-setting unit 185 accepts a reference point as in the second embodiment. The reference point indicates a reference position for setting a reference region. In addition, the point-setting unit 185 accepts a measurement point and generates point information indicating the accepted measurement point. The measurement point indicates a position at which the size of the subject is measured. A user designates a measurement point by using a cursor displayed on an image or by touching the screen of the display unit 5.

The measurement unit 187 calculates the 3D distance between the reference surface and the measurement point indicated by the point information. In this way, the measurement unit 187 can measure the depth of a recessed portion on the surface of the subject or can measure the height of a projection portion on the surface of the subject.

Figure 21:
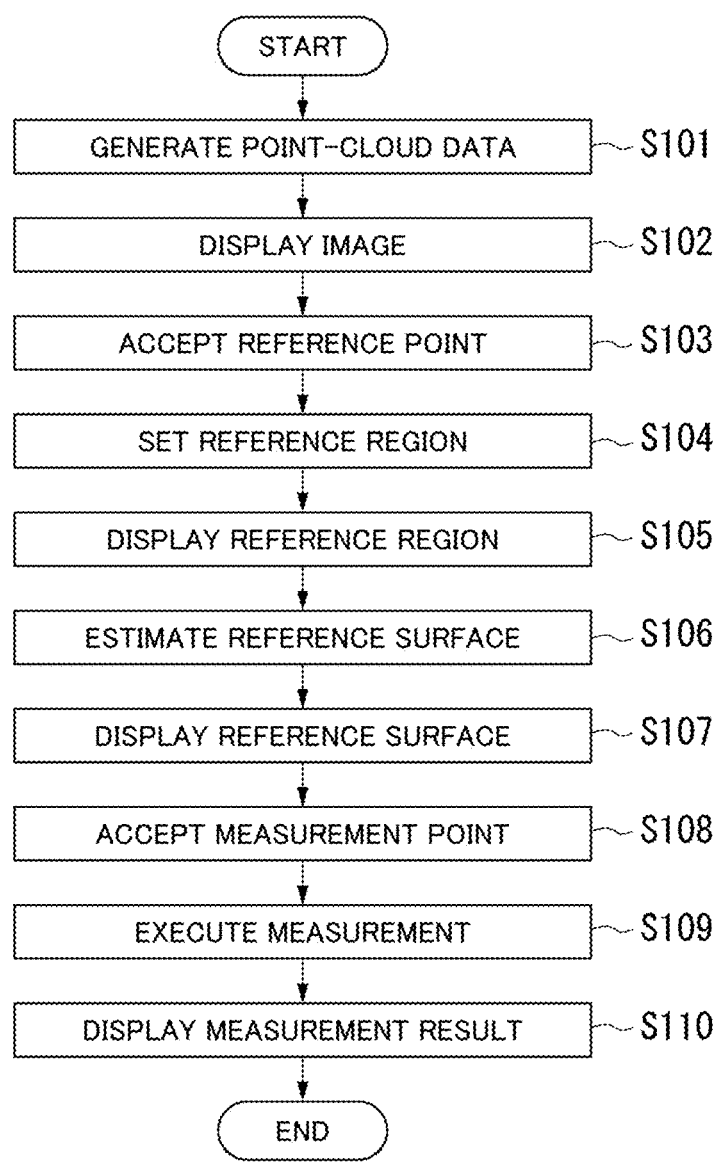
FIG. 21 is a flow chart showing a procedure of three-dimensional measurement in the third embodiment of the present invention.

Three-dimensional measurement (3D measurement) in the third embodiment will be described by using FIG. 21. FIG. 21 shows a procedure of the 3D measurement. The same processing as that shown in FIG. 9 will not be described.

After Step S107, the point-setting unit 185 accepts one measurement point on the 2D image of the subject through the operation unit 4 and generates point information indicating the accepted measurement point (Step S108).

After Step S108, the measurement unit 187 measures the size of the subject on the basis of the reference surface estimated in Step S106 and the measurement point indicated by the point information (Step S109). Step S109 corresponds to the measurement step.

After Step S109, the display control unit 183 displays a measurement result on the 2D image of the subject (Step S110). The measurement result indicates the size measured in Step S109. When Step S110 is executed, the 3D measurement is completed.

Specifically, the display control unit 183 generates a graphic image signal for displaying the measurement result. The display control unit 183 outputs the generated graphic image signal to the video-signal-processing circuit 12. The video-signal-processing circuit 12 combines the video signal output from the CCU 9 and the graphic image signal output from the CPU 18a. The video-signal-processing circuit 12 outputs the combined video signal to the display unit 5. The display unit 5 displays the 2D image of the subject on which the measurement result is superimposed. For example, a character indicating the size of the subject is displayed on the 2D image. The display control unit 183 may display the measurement result on the 3D image of the point-cloud data.

The measurement unit 187 may measure the 3D distance between the reference surface and each of two or more points on the surface of the subject in Step S109. The display control unit 183 may display the maximum value of the measured 3D distance on the display unit 5 in Step S110 (measurement result display step).

Specifically, the measurement unit 187 extracts all or some of the points in a circle circumscribing the two-dimensional reference region from the 2D image of the subject. A square, a rectangle, or the like may be used instead of a circle. Points on the 2D image of the subject are associated with the 3D coordinates of points in the point-cloud data. The measurement unit 187 acquires the 3D coordinates associated with each of the extracted points from the point-cloud data.

Alternatively, the measurement unit 187 extracts all or some of the points in a sphere circumscribing the three-dimensional reference region from the point-cloud data. A cube, a cylinder, or the like may be used instead of a sphere. The measurement unit 187 acquires the 3D coordinates of each of the extracted points from the point-cloud data.

The measurement unit 187 calculates the 3D distance between the reference surface and each of the extracted points. The measurement unit 187 obtains the maximum value of the calculated 3D distance as a measurement result. In this way, the measurement unit 187 can accurately measure the depth of a recessed portion on the surface of the subject or can accurately measure the height of a projection portion on the surface of the subject.

A user may designate a measurement mode. For example, before Step S103 is executed, a user inputs mode information indicating a measurement mode into the operation unit 4 by operating the operation unit 4. The mode information is output to the CPU 18a through the control interface 17. The control unit 180 sets the measurement mode on the basis of the mode information. In the example shown in the third embodiment, the mode information indicates the surface-based measurement. The mode information may indicate a mode that does not include measurement. In such a case, the surface estimation processing shown in FIG. 9 is executed.

After the point-setting unit 185 accepts the reference point in Step S103, a user may change the reference point.

Region information indicating at least one of the size of the reference region and the position of the reference region may be recorded on a recording medium in advance. The region-setting unit 182 may set at least one of the size of the reference region and the position of the reference region on the basis of the region information in Step S104.

Two or more pieces of the region information may be recorded on a recording medium in advance. The region-setting unit 182 may select one of the two or more pieces of the region information on the basis of information input through the operation unit 4 in Step S104. The region-setting unit 182 may set one of the size of the reference region and the position of the reference region on the basis of the selected region information in Step S104.

After the region-setting unit 182 sets the reference region in Step S104, a user may change at least one of the size of the reference region and the position of the reference region at any timing. The timing may come after the reference region is displayed in Step S105 or after the reference surface is displayed in Step S107.

The region-setting unit 182 may set a reference region without using a reference point. Accordingly, Step S103 does not need to be executed. In a case in which the measurement unit 187 extracts points used for measurement from the 2D image of the subject or the point-cloud data, Step S108 does not need to be executed. The CPU 18a does not need to have the functions of the position calculation unit 184 and the point-setting unit 185.

The display control unit 183 may display the 3D image of the point-cloud data on the display unit 5 and may display the three or more points of the point-cloud data used for estimating the reference surface on the 3D image. The display control unit 183 may display the 2D image of the subject on the display unit 5 and may display three or more points corresponding to the three or more points of the point-cloud data used for estimating the reference surface on the 2D image.

The reference region does not need to be displayed. Accordingly, Step S105 does not need to be executed. The reference surface does not need to be displayed. Accordingly, Step S107 does not need to be executed. The measurement result does not need to be displayed. Accordingly, Step S110 does not need to be executed.

In a case in which setting the reference point, displaying the reference region, displaying the reference surface, and displaying the measurement result are unnecessary, an image does not need to be displayed. Accordingly, Step S102 does not need to be executed. The CPU 18a does not need to have the function of the display control unit 183.

The order of processing in the 3D measurement is not limited to that shown in FIG. 21. For example, the 2D image of the subject may be displayed on the display unit 5 before Step S101 is executed.

In the third embodiment, the endoscope device 1 measures the size of the subject. Since the reference surface is accurately estimated, the endoscope device 1 can obtain an accurate measurement result.

Fourth Embodiment

A fourth embodiment of the present invention will be described. The endoscope device 1 according to the fourth embodiment includes the CPU 18 shown in FIG. 8 or the CPU 18a shown in FIG. 20.

There is a case in which the height or the depth on the surface of a subject is different between a predetermined region and a region around the predetermined region. The predetermined region is a recessed portion, a projection portion, a step, or the like. In a case in which the calculated reference surface approximates the surface including the predetermined region and the region around the predetermined region, the accuracy of the reference surface deteriorates. In the fourth embodiment, the surface estimation unit 186 estimates a reference surface that approximates a surface excluding the predetermined region.

The region-setting unit 182 sets a reference region including a region that is not a convex set. An object that is convex in Euclidean space is defined as follows. When a line segment connecting any two points included in the object together is defined and any point on the line segment is included in the object, the object is convex.

Figure 22:
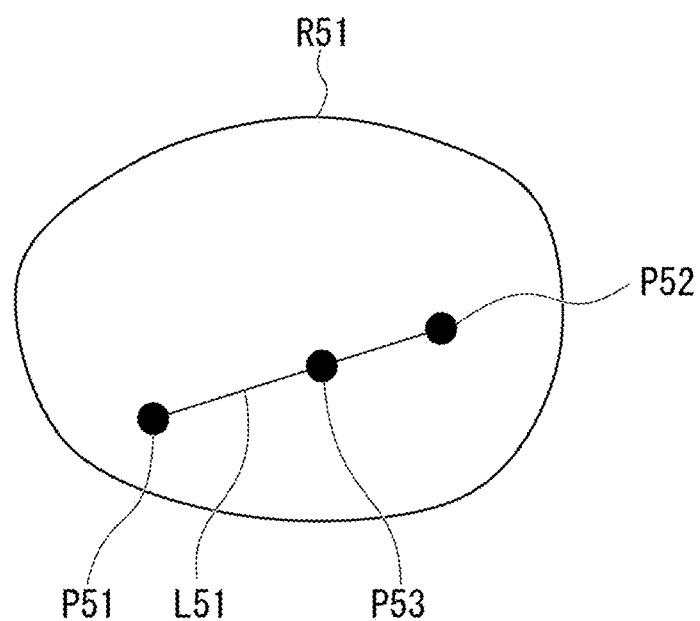
FIG. 22 is a diagram showing an example of a reference region in a fourth embodiment of the present invention.

A reference region in the fourth embodiment will be described by using FIG. 22 and FIG. 23. A reference region R51 shown in FIG. 22 includes a point P51, a point P52, and a point P53. A line segment L51 connects the point P51 and the point P52 together. The point P53 is on the line segment L51. The point P53 is included in the reference region R51. Points on the line segment L51 other than the point P53 are not shown in FIG. 22. All the points on the line segment L51 are included in the reference region R51. Points other than the point P51, the point P52, or the point P53 are not shown in FIG. 22. Points on a line segment connecting any two points in the reference region R51 together are always included in the reference region R51. In other words, a line segment connecting any two points in the reference region R51 together does not pass through a region outside the reference region R51. Accordingly, the reference region R51 is a convex set.

Figure 23:
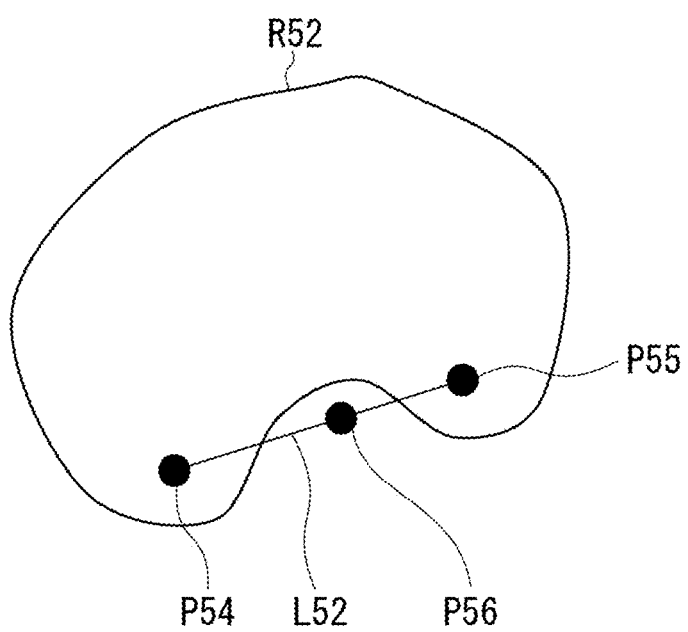
FIG. 23 is a diagram showing an example of the reference region in the fourth embodiment of the present invention.

A reference region R52 shown in FIG. 23 includes a point P54, a point P55, and a point P56. A line segment L52 connects the point P54 and the point P55 together. The point P56 is on the line segment L52. The point P56 is not included in the reference region R52. Some of the points on the line segment L52 are not included in the reference region R52. In other words, the line segment L52 passes through a region outside the reference region R52. Accordingly, the reference region R52 is not a convex set. The region-setting unit 182 sets a reference region like the reference region R52. A region that is a convex set is not limited to a two-dimensional region and may be a three-dimensional region.

Figure 24:
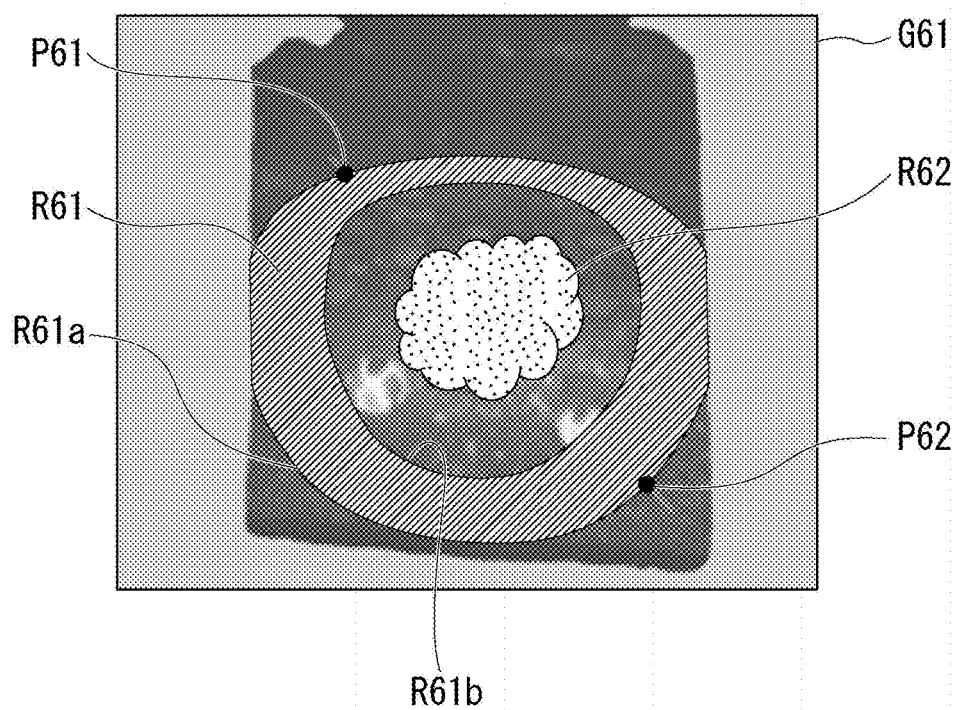
FIG. 24 is a diagram showing an example of a reference region in the fourth embodiment of the present invention.

Hereinafter, a reference region will be described by referring to the 3D image of the point-cloud data. FIG. 24 shows a first example of a reference region. A reference region in the first example is a region (spherical shell) between two spheres. The centers of the two spheres are the same, and the diameters of the two spheres are different from each other.

A 3D image G61 is shown in FIG. 24. A user designates a reference point P61 and a reference point P62 by using a cursor displayed on the 3D image G61 or by touching the screen of the display unit 5. The point-setting unit 185 accepts the reference point P61 and the reference point P62.

The region-setting unit 182 calculates a first sphere having a line segment connecting the reference point P61 and the reference point P62 together as the diameter. The region-setting unit 182 calculates a second sphere. The center of the first sphere and the center of the second sphere are the same. The diameter of the second sphere is less than that of the first sphere. The region-setting unit 182 sets a region between the first sphere and the second sphere as a reference region R61. The surface estimation unit 186 estimates a reference surface on the basis of three or more points included in the reference region R61.

The boundaries of the reference region R61 include a first boundary R61a and a second boundary R61b that is on the inner side of the first boundary R61a. The first boundary R61a is on the relatively outer side, and the second boundary R61b is on the relatively inner side. The first boundary R61a surrounds the second boundary R61b. The first boundary R61a is the same as the first sphere. The second boundary R61b is the same as the second sphere.

A region R62 is shown in FIG. 24. The height or the depth of the region R62 is different from that of a region around the region R62. The first boundary R61a and the second boundary R61b are around the region R62. The reference region R61 surrounds the region R62. Points in the region R62 are not included in the reference region R61. Therefore, the surface estimation unit 186 can accurately estimate a reference surface.

A user may correct the size of the first sphere or the second sphere. In an example in which the display unit 5 and the operation unit 4 are constituted as a touch panel, a user may correct the size of the first sphere or the second sphere by performing a drag operation.

Figure 25:
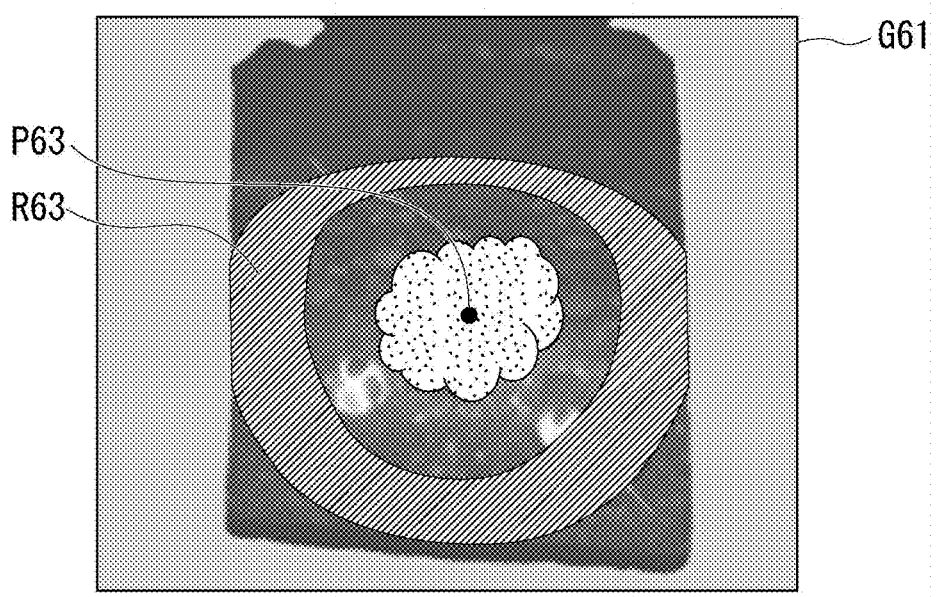
FIG. 25 is a diagram showing an example of the reference region in the fourth embodiment of the present invention.

In the example shown in FIG. 24, a user designates two reference points. FIG. 25 shows an example in which a user designates one reference point.

The same 3D image G61 as that shown in FIG. 24 is shown in FIG. 25. A user designates a reference point P63 by using a cursor displayed on the 3D image G61 or by touching the screen of the display unit 5. The point-setting unit 185 accepts the reference point P63.

The region-setting unit 182 calculates a first sphere and a second sphere, each of which has the reference points P63 at the center. The diameter of the second sphere is less than that of the first sphere. The region-setting unit 182 sets a region between the first sphere and the second sphere as a reference region R63.

Figure 26:
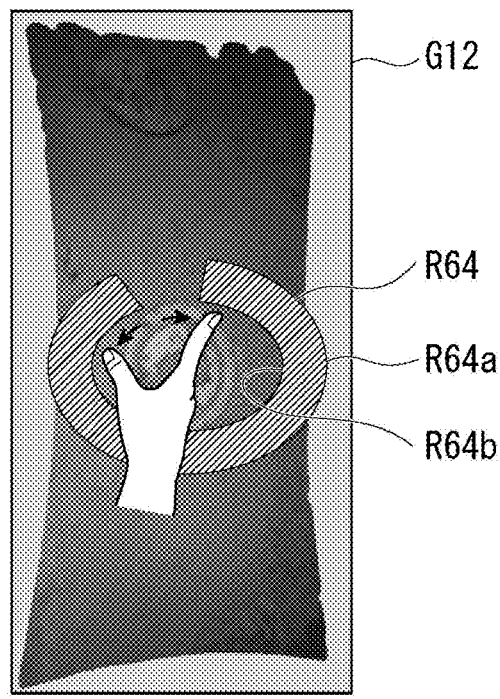
FIG. 26 is a diagram showing an example of the reference region in the fourth embodiment of the present invention.

After the region-setting unit 182 sets the reference region by using the method shown in FIG. 24 or FIG. 25, the region-setting unit 182 may exclude a partial region from the reference region. FIG. 26 shows a method of excluding a partial region from the reference region.

The same 3D image G12 as that shown in FIG. 10 is displayed on the display unit 5. After a reference region R64 is set, a user designates a region to be excluded from the reference region R64. In an example in which the display unit 5 and the operation unit 4 are constituted as a touch panel, a user may exclude a partial region from the reference region R64 by performing a pinch operation. The boundaries of the reference region R64 include a first boundary R64a and a second boundary R64b that is on the inner side of the first boundary R64a.

Figure 27:
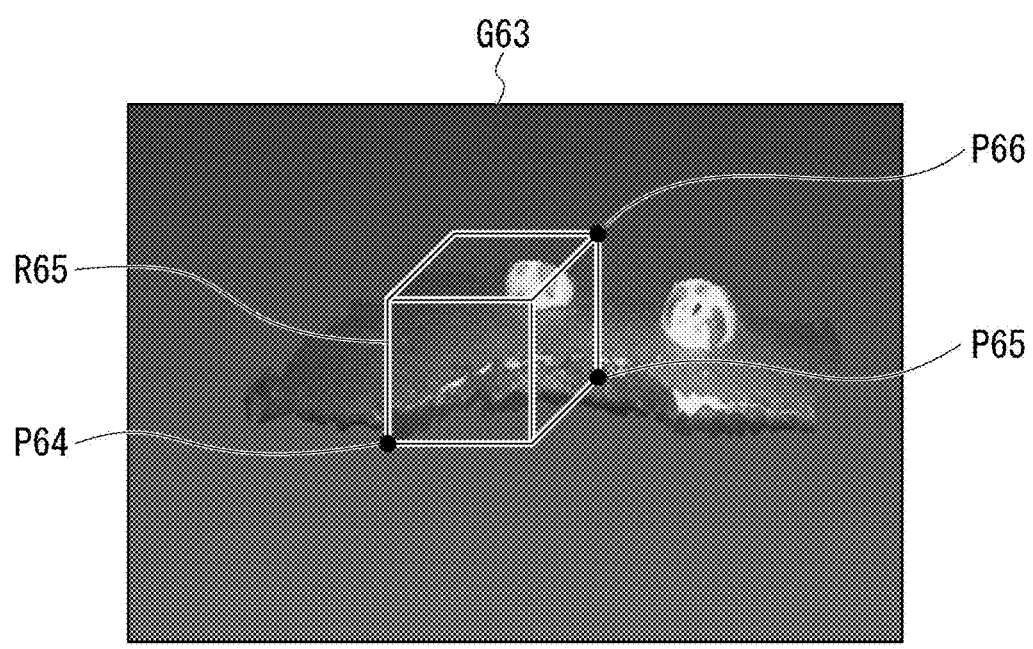
FIG. 27 is a diagram showing an example of the reference region in the fourth embodiment of the present invention.

FIG. 27 shows a second example of a reference region. A reference region in the second example includes only a region around a side of a cuboid. A 3D image G63 is shown in FIG. 27. A user designates a reference point P64 and a reference point P65 by using a cursor displayed on the 3D image G63 or by touching the screen of the display unit 5. The point-setting unit 185 accepts the reference point P64 and the reference point P65.

The region-setting unit 182 calculates a rectangle on the basis of the reference point P64 and the reference point P65. The reference point P64 and the reference point P65 are vertices on the diagonal line of the rectangle. After the reference point P64 and the reference point P65 are set, a user designates a reference point P66 by using a cursor displayed on the 3D image G63 or by touching the screen of the display unit 5. The point-setting unit 185 accepts the reference point P66.

The region-setting unit 182 calculates a cuboid on the basis of the reference point P64, the reference point P65, and the reference point P66. One of the surfaces of the cuboid is defined by a rectangle calculated on the basis of the reference point P64 and the reference point P65. The height of the cuboid is the same as the 3D distance between the rectangle and the reference point P66.

The region-setting unit 182 calculates a cylinder having each of the sides of the cuboid as a center axis. Since the cuboid has six sides, the region-setting unit 182 calculates six cylinders. The region-setting unit 182 sets a reference region R65 that is a set of regions in the six cylinders. The shape of a region included in the reference region R65 is not limited to a cylinder. The surface estimation unit 186 estimates a reference surface on the basis of three or more points included in the reference region R65.

The region-setting unit 182 may set a two-dimensional reference region that is not a convex set. For example, the region-setting unit 182 may calculate a first circle and a second circle on the 2D image of the subject. The center of the first circle and the center of the second circle are the same. The diameter of the second circle is less than that of the first circle. The region-setting unit 182 may set a region between the first circle and the second circle as a reference region. A square, a rectangle, or the like may be used instead of a circle.

The surface estimation unit 186 estimates a reference surface on the basis of three or more points in the point-cloud data corresponding to three or more points included in the reference region. For example, the surface estimation unit 186 extracts all the points in the reference region. The surface estimation unit 186 estimates a reference surface by using the 3D coordinates of each of the extracted points. The surface estimation unit 186 may extract some of the points in the reference region.

Specifically, the surface estimation unit 186 selects three or more of the four or more points included in the reference region in Step S106 shown in FIG. 9 or FIG. 21. The surface estimation unit 186 estimates a reference surface in Step S106 on the basis of three or more points of the point-cloud data corresponding to the three or more selected points. Since the number of points used for estimating a reference surface is reduced, the surface estimation unit 186 can reduce the processing load for estimating a reference surface.

In order for the surface estimation unit 186 to select three or more points, a reference region needs to include four or more points. Four or more points of a reference region include one or more combinations, each of which is constituted by three points that form a triangle. There is no straight line passing through all the four or more points of a reference region.

Figure 28:
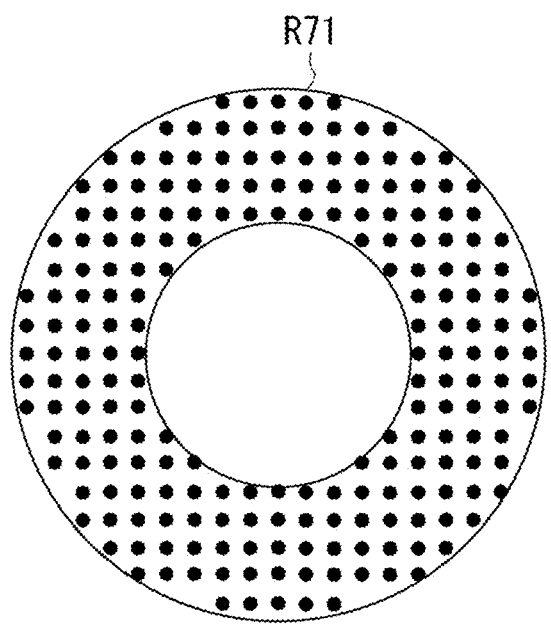
FIG. 28 is a diagram showing an example of points used for estimating a reference surface in the fourth embodiment of the present invention.
Figure 29:
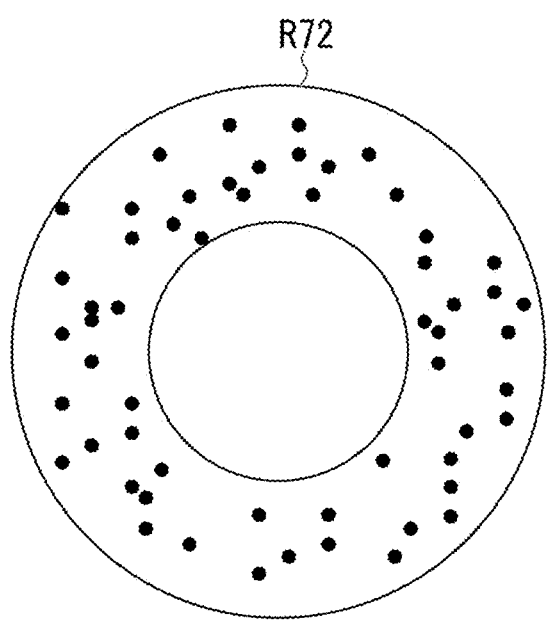
FIG. 29 is a diagram showing an example of points used for estimating the reference surface in the fourth embodiment of the present invention.

FIG. 28 and FIG. 29 show examples of points used for estimating a reference surface. In order to simplify the drawings, an example in which a two-dimensional reference region is used will be described. The following descriptions may be applied to a case in which a three-dimensional reference region is used.

A reference region R71 is shown in FIG. 28. The surface estimation unit 186 extracts some points (pixels of the 2D image) arranged regularly out of all the points (pixels of the 2D image) in the reference region R71. In FIG. 28, only points to be extracted are shown, and points not to be extracted are not shown. In the example shown in FIG. 28, the surface estimation unit 186 can extract points arranged uniformly in a wide range by executing simple processing.

A reference region R72 is shown in FIG. 29. The surface estimation unit 186 extracts some points (pixels of the 2D image) arranged randomly out of all the points (pixels of the 2D image) in the reference region R72. In FIG. 29, only points to be extracted are shown, and points not to be extracted are not shown. In a case in which a periodical uneven pattern exists on the surface of a subject, there is a possibility that the interval of the pattern and the interval of points to be extracted match each other in the example shown in FIG. 29. Therefore, there is a possibility that only points of a region matching a specific pattern are extracted and the accuracy of a reference surface deteriorates. In the example shown in FIG. 29, since points of a region not matching a specific pattern are also extracted, the accuracy of a reference surface is improved.

The surface estimation unit 186 may mainly extract points of a part near the boundary of the reference region. A first density is greater than a second density. The first density indicates a density at which points are extracted in a part near the boundary of the reference region. The second density indicates a density at which points are extracted in a part far from the boundary of the reference region. In this way, the surface estimation unit 186 can use many points in a part near the boundary of the reference region. In addition, the surface estimation unit 186 can restrict the total number of points used for estimating a reference surface and can extract points in a wide range.

The surface estimation unit 186 may extract points inside the boundary of the reference region or may extract all or some of the points on the boundary of the reference region by using the above-described method.

In the fourth embodiment, a reference region including a region that is not a convex set is set. The endoscope device 1 can exclude, from the reference region, points in a region having a different shape from that of a surrounding region. Therefore, the endoscope device 1 can improve the accuracy of a reference surface.

Fifth Embodiment

A fifth embodiment of the present invention will be described. The endoscope device 1 according to the fifth embodiment includes the CPU 18 shown in FIG. 8 or the CPU 18a shown in FIG. 20.

In the fifth embodiment, a reference region includes two or more regions. The two or more regions are apart from each other. Each of the two or more regions included in the reference region includes three or more points. The reference region may include a region including three or more points and a region including one or two points. Three or more points included in each of the regions include one or more combinations, each of which is constituted by three points that form a triangle. Alternatively, three or more points in the entire reference region include one or more combinations, each of which is constituted by three points that form a triangle.

In each of the regions included in the reference region, there is no straight line passing through all the three or more points. Alternatively, in the entire reference region including two or more regions, there is no straight line passing through all the points. In other words, even when all the points are on a straight line in one region included in the reference region, the straight line does not pass through one or more points in another region included in the reference region.

Figure 30:
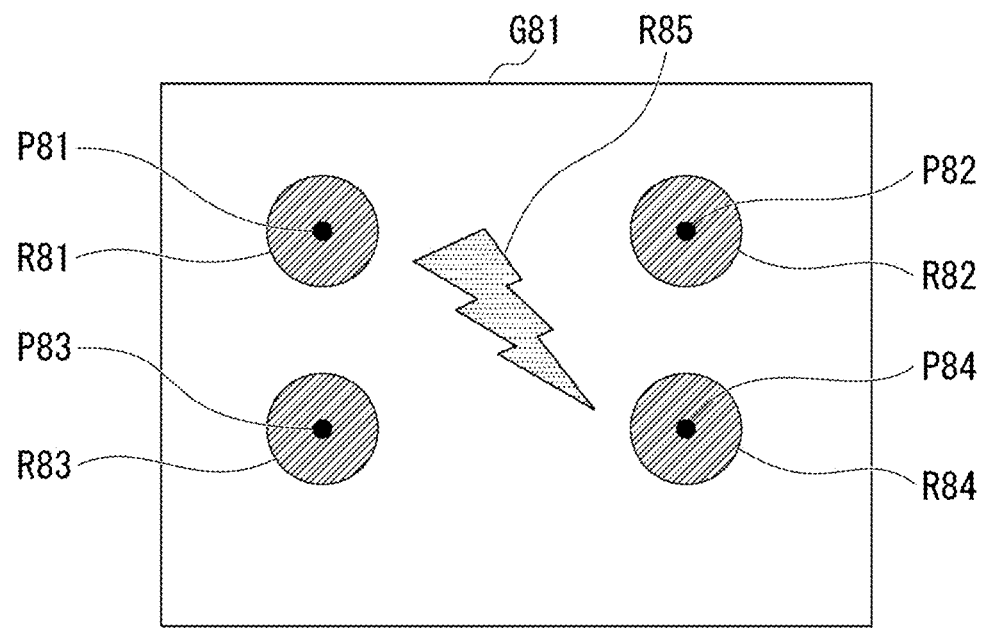
FIG. 30 is a diagram showing an example of a reference region in a fifth embodiment of the present invention.

FIG. 30 shows an example of a reference region. In order to simplify the drawings, an example in which a two-dimensional reference region is used will be described. The following descriptions may be applied to a case in which a three-dimensional reference region is used.

A 2D image G81 of a subject is shown in FIG. 30. A user designates a reference point P81, a reference point P82, a reference point P83, and a reference point P84 by using a cursor displayed on the 2D image G81 or by touching the screen of the display unit 5. The point-setting unit 185 accepts the reference point P81, the reference point P82, the reference point P83, and the reference point P84.

The region-setting unit 182 sets a region R81 having the reference point P81 at the center. The region-setting unit 182 sets a circle having the diameter of a predetermined value as the region R81. A square, a rectangle, or the like may be used instead of a circle. Similarly, the region-setting unit 182 sets a region R82 having the reference point P82 at the center, sets a region R83 having the reference point P83 at the center, and sets a region R84 having the reference point P84 at the center. The reference region includes the region R81, the region R82, the region R83, and the region R84. The region R81, the region R82, the region R83, and the region R84 are apart from each other.

A region R85 is shown in FIG. 30. The height or the depth of the region R85 is different from that of a region around the region R85. The region R81, the region R82, the region R83, and the region R84 are disposed at positions surrounding the region R85. Points in the region R85 are not included in the reference region. Therefore, the surface estimation unit 186 can accurately estimate a reference surface.

Figure 31:
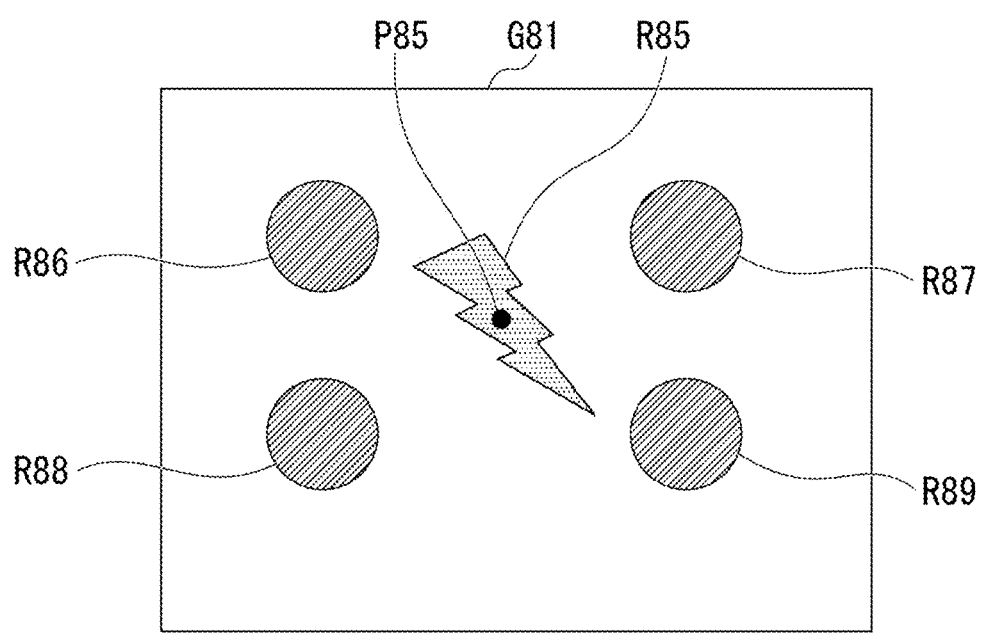
FIG. 31 is a diagram showing an example of the reference region in the fifth embodiment of the present invention.

In the example shown in FIG. 30, a user designates four reference points. FIG. 31 shows an example in which a user designates one reference point.

The same 2D image G81 as that shown in FIG. 30 is shown in FIG. 31. The same region R85 as that shown in FIG. 30 is shown in FIG. 31. A user designates a reference point P85 by using a cursor displayed on the 2D image G81 or by touching the screen of the display unit 5. The point-setting unit 185 accepts the reference point P85.

The region-setting unit 182 sets a region R86, a region R87, a region R88, and a region R89, each of which has a point around the reference point P85 at the center. For example, the region-setting unit 182 extracts four points that are a predetermined distance apart from the reference point P85. The region-setting unit 182 sets a region having each of the extracted points at the center.

In the fifth embodiment, a reference region including two or more regions is set. The endoscope device 1 can set a reference region that does not include a region having a different shape from that of a surrounding region. Therefore, the endoscope device 1 can improve the accuracy of a reference surface.

Sixth Embodiment

A sixth embodiment of the present invention will be described. In the sixth embodiment, the boundary of a reference region is set on the basis of the state of the surface of a subject.

Figure 32:
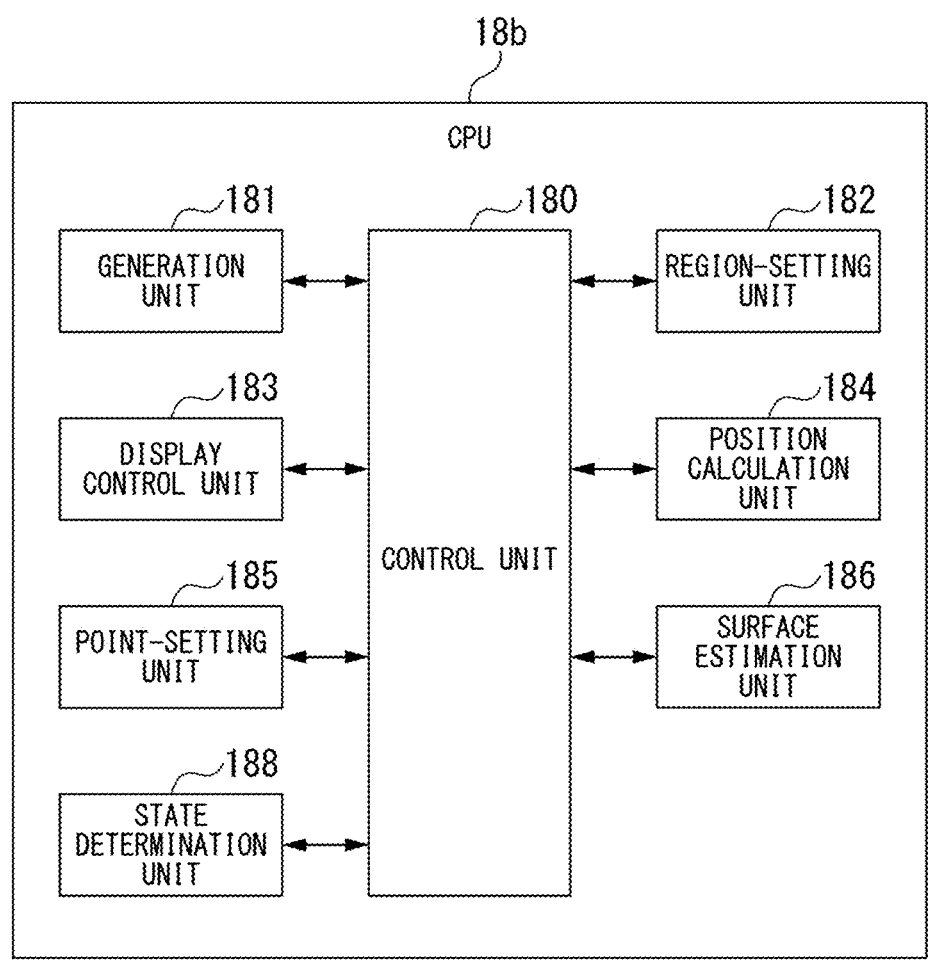
FIG. 32 is a block diagram showing a functional configuration of a CPU included in an endoscope device according to a sixth embodiment of the present invention.

In the sixth embodiment, the CPU 18 shown in FIG. 8 is changed to a CPU 18b shown in FIG. 32. FIG. 32 shows a functional configuration of the CPU 18*b*. The CPU 18*b* has functional units including a control unit 180, a generation unit 181, a region-setting unit 182, a display control unit 183, a position calculation unit 184, a point-setting unit 185, a surface estimation unit 186, and a state determination unit 188. At least one of the blocks shown in FIG. 32 may be constituted by a different circuit from the CPU 18*b*. The same configuration as that shown in FIG. 8 will not be described.

Each unit shown in FIG. 32 may be constituted by at least one of a processor and a logic circuit. Each unit shown in FIG. 32 may include one or a plurality of processors. Each unit shown in FIG. 32 may include one or a plurality of logic circuits.

The display control unit 183 displays one of a 3D image of the point-cloud data and a 2D image of a subject on the display unit 5 (image display step). The point-setting unit 185 accepts position information input through the operation unit 4 (position input step). The position information indicates a position on the 3D image of the point-cloud data or the 2D image of the subject displayed on the display unit 5. The state determination unit 188 determines a state of the subject (state determination step). The region-setting unit 182 determines a boundary of a reference region on the basis of both the position indicated by the position information and the state of the subject in a region-setting step.

Figure 33:
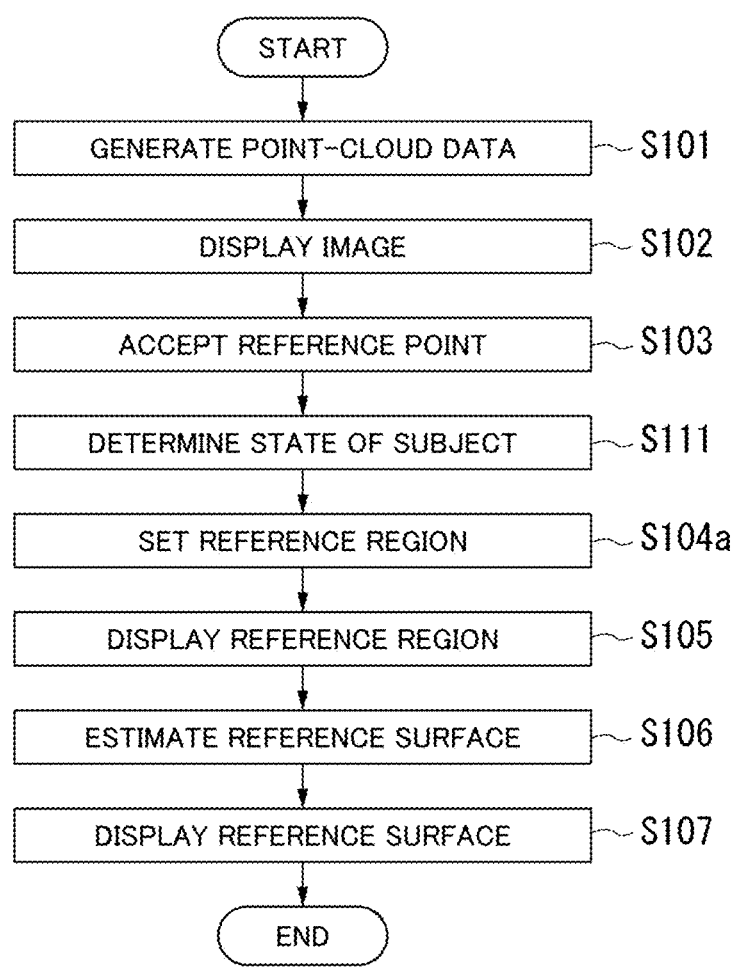
FIG. 33 is a flow chart showing a procedure of surface estimation processing in the sixth embodiment of the present invention.

Surface estimation processing in the sixth embodiment will be described by using FIG. 33. FIG. 33 shows a procedure of the surface estimation processing. The same processing as that shown in FIG. 9 will not be described.

The display control unit 183 displays the 3D image of the point-cloud data on the display unit 5 in Step S102. Step S102 corresponds to the image display step.

The point-setting unit 185 accepts two reference points on the 3D image of the point-cloud data through the operation unit 4 and generates point information indicating each of the two accepted reference points in Step S103. Step S103 corresponds to the position input step.

The two reference points input in Step S103 indicate pixel positions on the 3D image of the point-cloud data. Accordingly, the position information is input in Step S103, and the point-setting unit 185 accepts the position information. The point-setting unit 185 generates point information including the 3D coordinates of the two reference points indicated by the position information.

After Step S103, the state determination unit 188 determines a state of the subject (Step S111). Step S111 corresponds to the state determination step.

The state determination unit 188 determines a state of the subject by using at least one of the point-cloud data, the 3D image of the point-cloud data, and the 2D image of the subject. The state determination unit 188 divides a region on the 3D image into two or more regions (segments) on the basis of the state.

For example, the state determination unit 188 determines a feature of the 3D shape of the subject by using the point-cloud data. The state determination unit 188 divides (classifies) three or more points corresponding to the three-dimensional coordinates included in the point-cloud data into two or more regions on the basis of the feature. For example, the state determination unit 188 assigns each of the three or more points to one of two or more regions by using Euclidean cluster extraction. The state determination unit 188 associates each of the regions with a region on the 3D image of the point-cloud data. In this way, the state determination unit 188 divides the region on the 3D image into two or more regions.

The state determination unit 188 may calculate a normal line perpendicular to the surface of the subject on the basis of the point-cloud data and may detect an edge or a step of the subject on the basis of the change in the direction of the normal line. The state determination unit 188 may divide three or more points in the point-cloud data into a first region and a second region. For example, the first region is constituted by points on the edge or the step. The second region is constituted by points on a part other than the edge or the step. The state determination unit 188 may divide a region on the 3D image of the point-cloud data into two regions by associating each of the regions of the point-cloud data with the region on the 3D image.

The state determination unit 188 may determine a state of the subject by using the 2D image of the subject or the 3D image of the point-cloud data. For example, the state determination unit 188 may detect an edge of the subject by performing image processing on the 2D image of the subject or the 3D image of the point-cloud data. The state determination unit 188 may divide three or more points in the 2D image of the subject into a first region and a second region. For example, the first region is constituted by points on the edge. The second region is constituted by points on a part other than the edge. The state determination unit 188 may divide a region on the 3D image of the point-cloud data into two regions by associating each of the regions on the 2D image of the subject with the region on the 3D image. Similarly, the state determination unit 188 may divide three or more points in the 3D image of the point-cloud data into a first region and a second region.

The state determination unit 188 may determine a feature of the subject on the basis of the brightness or the color of the 2D image of the subject or the 3D image of the point-cloud data. The state determination unit 188 may perform matching processing on a stereo image of the subject and may determine a feature of the subject on the basis of the correlation value obtained in the matching processing. The state determination unit 188 may determine a feature of the subject by using a watershed algorithm, deep learning, or the like.

After Step S111, the region-setting unit 182 sets a reference region on the basis of the positions of the two reference points and the state of the subject (Step S104*a*). Step S104*a* corresponds to the region-setting step.

The region-setting unit 182 sets a three-dimensional reference region in the 3D space defining the 3D coordinates of the point-cloud data. For example, the region-setting unit 182 sets an outer boundary of the reference region on the basis of the positions of the two reference points. The region-setting unit 182 sets an inner boundary of the reference region on the basis of the state of the subject. For example, there is a case in which there is an abnormal region on the surface of the subject. The height or the depth of the abnormal region is different from that of a region around the abnormal region. The region-setting unit 182 excludes the abnormal region from the reference region by setting the inner boundary of the reference region. In this way, the region-setting unit 182 can set the reference region that does not include the abnormal region. After Step S104*a*, Step S105 is executed.

Figure 34:
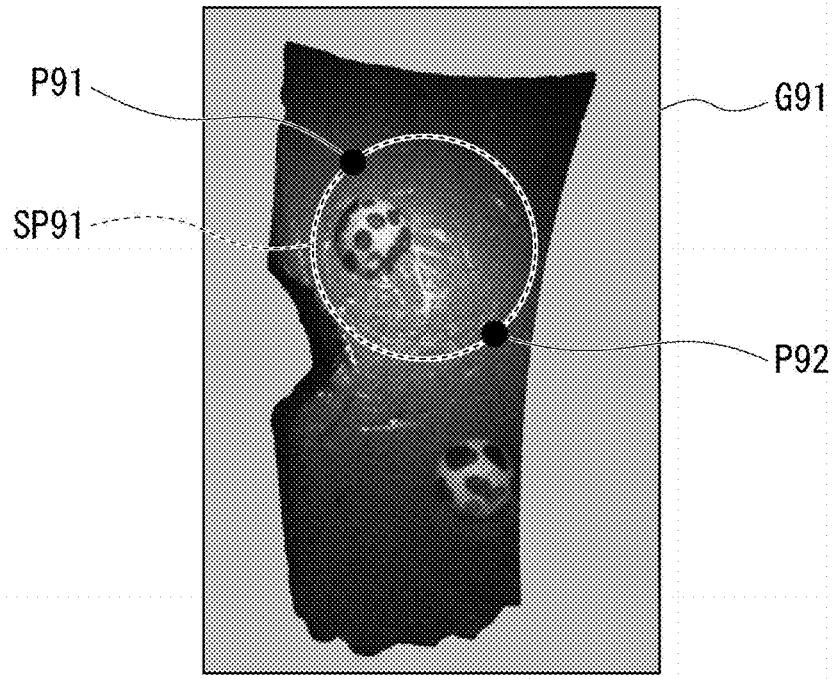
FIG. 34 is a diagram showing an example of an image displayed on a display unit in the sixth embodiment of the present invention.

FIG. 34 shows an example of an image displayed on the display unit 5. A 3D image G91 is displayed on the display unit 5. A user designates a reference point P91 and a reference point P92 by using a cursor displayed on the 3D image G91 or by touching the screen of the display unit 5. The point-setting unit 185 accepts the reference point P91 and the reference point P92.

The region-setting unit 182 calculates a sphere SP91 having a line segment connecting the reference point P91 and the reference point P92 together as the diameter. The region-setting unit 182 sets the sphere SP91 as the outer boundary of a reference region.

Figure 35:
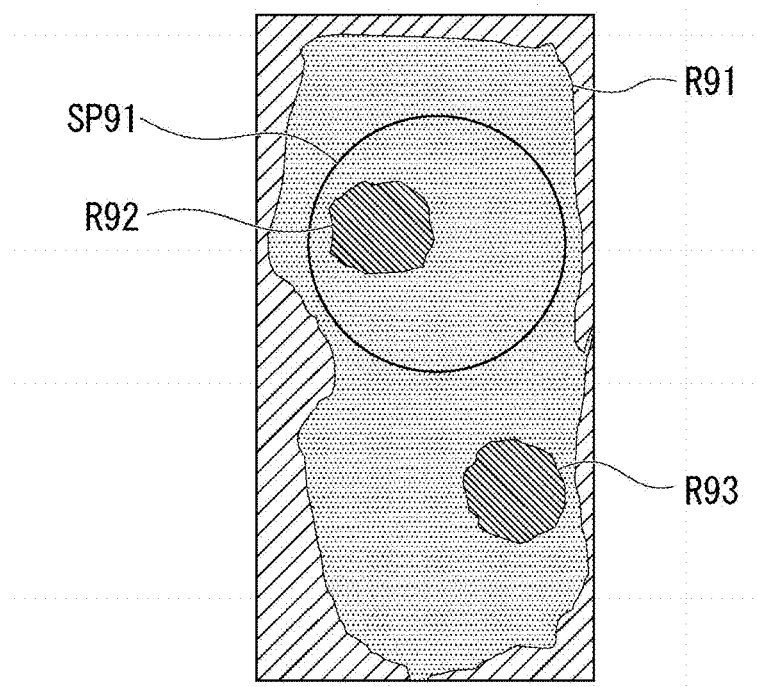
FIG. 35 is a diagram showing two or more regions on a three-dimensional image of point-cloud data in the sixth embodiment of the present invention.

FIG. 35 shows two or more regions on the 3D image of the point-cloud data. The state determination unit 188 divides a region on the 3D image into two or more regions on the basis of the state of the subject. FIG. 35 shows such two or more regions. In the example shown in FIG. 35, a region of the subject on the 3D image is divided into a region R91, a region R92, and a region R93.

The region-setting unit 182 sets a region having the greatest volume among the two or more regions in the sphere SP91 as a reference region. Regions other than the region set as the reference region are not included in the reference region. Part of the region R91 and the entire region R92 are in the sphere SP91. The region R91 in the sphere SP91 is included in the reference region. The region R92 is not included in the reference region. The region-setting unit 182 sets the boundary of the region R92 as the inner boundary of the reference region.

In the above-described example, the state determination unit 188 divides three or more points corresponding to the three-dimensional coordinates included in the point-cloud data into two or more regions. The boundary of the reference region includes boundaries of one or more regions included in the two or more regions.

Each of the above-described two or more regions includes three or more points. The above-described two or more regions may include a region including three or more points and a region including one or two points. The reference region includes a region including three or more points.

In the example shown in FIG. 35, the state determination unit 188 divides three or more points included in the point-cloud data into three regions. The boundary of the reference region includes the boundary of the region R92. The state determination unit 188 may set a reference region surrounding the region R92 and the region R93, and the boundary of the reference region may include the boundary of the region R92 and the boundary of the region R93.

The outer boundary of the reference region may be a cuboid, a cube, a cylinder, or the like. The shape of the reference region is not limited to these examples.

Figure 36:
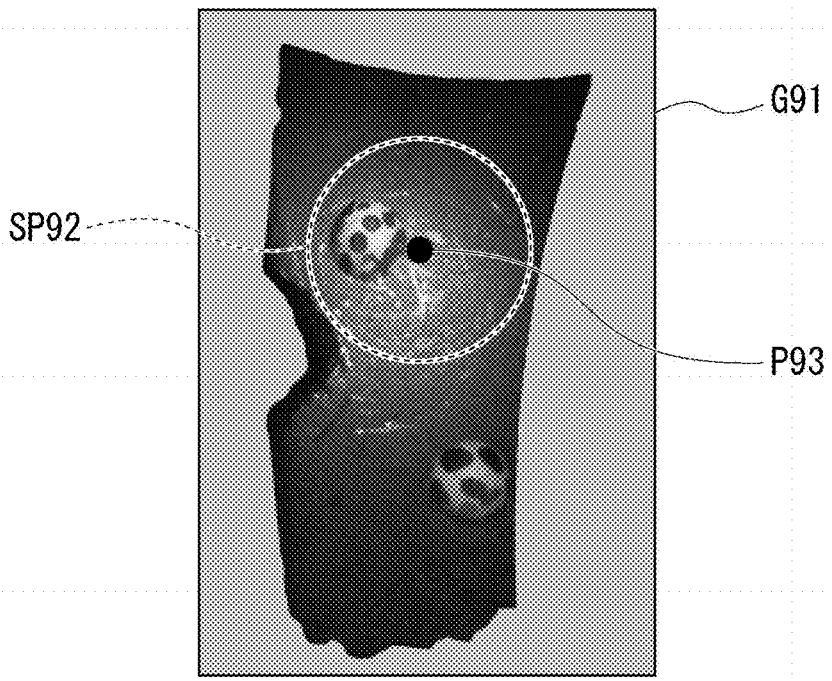
FIG. 36 is a diagram showing an example of an image displayed on the display unit in the sixth embodiment of the present invention.

In the example shown in FIG. 34, a user designates two reference points. FIG. 36 shows an example in which a user designates one reference point.

The same 3D image G91 as that shown in FIG. 34 is shown in FIG. 36. A user designates a reference point P93 by using a cursor displayed on the 3D image G91 or by touching the screen of the display unit 5. The point-setting unit 185 accepts the reference point P93.

The region-setting unit 182 calculates a sphere SP92 having the reference point P93 at the center. The diameter of the sphere SP92 is a predetermined length. The region-setting unit 182 sets the sphere SP92 as the outer boundary of a reference region. The state determination unit 188 sets the boundary of the region R92 shown in FIG. 35 as the inner boundary of the reference region.

After the region-setting unit 182 sets the outer boundary of the reference region, the state determination unit 188 may divide a region only inside the boundary into two or more regions. In the example shown in FIG. 34, after the region-setting unit 182 sets the sphere SP91 as the outer boundary of the reference region, the state determination unit 188 may divide a region inside the boundary into two or more regions. The processing load is reduced, compared to a case in which all of the point-cloud data are processed.

The 2D image of the subject may be used instead of the 3D image of the point-cloud data. Hereinafter, an example in which the 2D image of the subject is used will be described.

The display control unit 183 displays the 2D image of the subject on the display unit 5 in Step S102. The point-setting unit 185 accepts one or more reference points on the 2D image of the subject through the operation unit 4 and generates point information indicating each of the one or more accepted reference points in Step S103.

The state determination unit 188 determines a state of the subject by using the 2D image of the subject in Step S111. The state determination unit 188 divides a region on the 2D image into two or more regions on the basis of the result of the determination.

The region-setting unit 182 sets a two-dimensional reference region on the 2D image of the subject in Step S104a. For example, the region-setting unit 182 sets the outer boundary of the reference region on the basis of the positions of the reference points. The region-setting unit 182 sets the inner boundary of the reference region on the basis of the state of the subject.

The CPU 18b may include the measurement unit 187 shown in FIG. 20. After Step S107 is executed, Step S108, Step S109, and Step S110 shown in FIG. 21 may be executed.

After the point-setting unit 185 accepts the reference points in Step S103, a user may change the reference points. The number of reference points set in Step S103 is not limited to two.

Region information indicating at least one of the size of the reference region and the position of the reference region may be recorded on a recording medium in advance. The region-setting unit 182 may set at least one of the size of the reference region and the position of the reference region on the basis of the region information in Step S104a. For example, the region-setting unit 182 may set at least one of the size of the outer boundary of the reference region and the position of the outer boundary of the reference region on the basis of the region information.

Two or more pieces of the region information may be recorded on a recording medium in advance. The region-setting unit 182 may select one of the two or more pieces of the region information on the basis of information input through the operation unit 4 in Step S104a. The region-setting unit 182 may set one of the size of the reference region and the position of the reference region on the basis of the selected region information in Step S104a.

After the region-setting unit 182 sets the reference region in Step S104a, a user may change at least one of the size of the reference region and the position of the reference region at any timing. The timing may come after the reference region is displayed in Step S105 or after the reference surface is displayed in Step S107.

The display control unit 183 may display the 3D image of the point-cloud data on the display unit 5 and may display the three or more points of the point-cloud data used for estimating the reference surface on the 3D image. The display control unit 183 may display the 2D image of the subject on the display unit 5 and may display three or more points corresponding to the three or more points of the point-cloud data used for estimating the reference surface on the 2D image.

The reference region does not need to be displayed. Accordingly, Step S105 does not need to be executed. The reference surface does not need to be displayed. Accordingly, Step S107 does not need to be executed.

The order of processing in the surface estimation processing is not limited to that shown in FIG. 33. For example, Step S111 may be executed before Step S102 or Step S103 is executed. Step S111 may be executed by using the 2D image of the subject before Step S101 is executed.

In the sixth embodiment, a reference region is set on the basis of the state of the surface of a subject. The endoscope device 1 can easily set a reference region that does not include an abnormal region. Accordingly, the endoscope device 1 can improve the accuracy of a reference surface.

First Modified Example of Sixth Embodiment

A first modified example of the sixth embodiment of the present invention will be described. In the first modified example of the sixth embodiment, the state determination unit 188 divides (classifies) three or more points corresponding to the three-dimensional coordinates included in the point-cloud data into two or more regions. The display control unit 183 displays an image of the two or more regions on the display unit 5, and the point-setting unit 185 accepts a reference point on the image.

Figure 37:
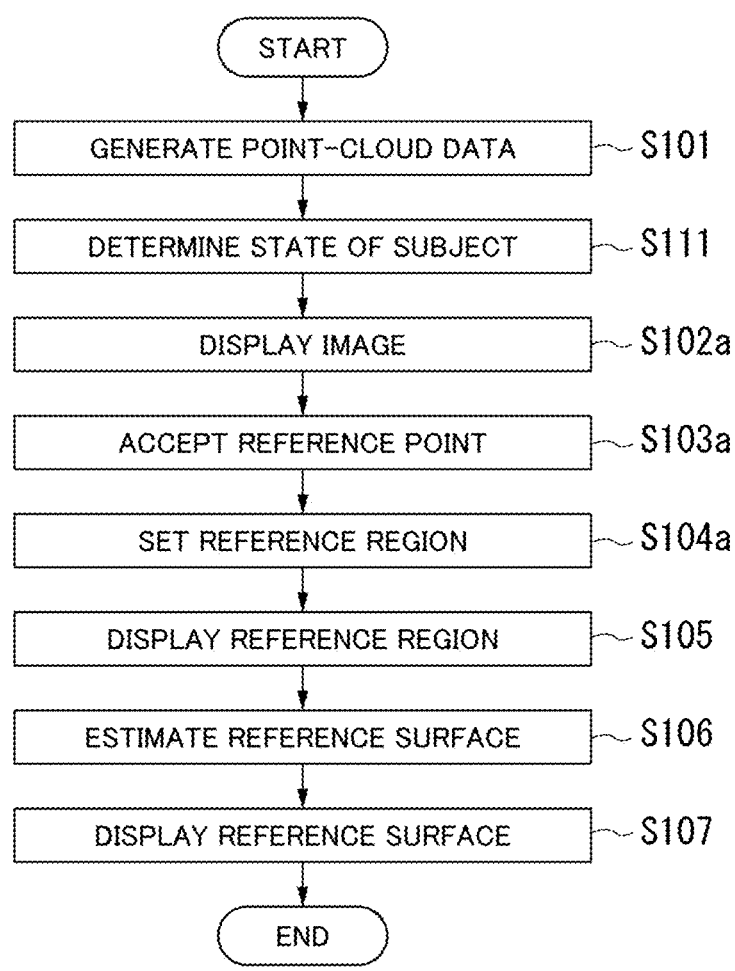
FIG. 37 is a flow chart showing a procedure of surface estimation processing in a first modified example of the sixth embodiment of the present invention.

Surface estimation processing in the first modified example of the sixth embodiment will be described by using FIG. 37. FIG. 37 shows a procedure of the surface estimation processing. The same processing as that shown in FIG. 33 will not be described.

After Step S101, the state determination unit 188 determines a state of the subject in Step S111. In this way, the state determination unit 188 divides three or more points corresponding to the three-dimensional coordinates included in the point-cloud data into two or more regions.

After Step S111, the display control unit 183 displays the 3D image of the point-cloud data and an image of the two or more regions on the display unit 5 (Step S102a). Specifically, the display control unit 183 generates a graphic image signal for displaying the 3D image of the point-cloud data and the image of the two or more regions. The image of the two or more regions includes color data of each pixel. The display control unit 183 outputs the generated graphic image signal to the display unit 5 through the video-signal-processing circuit 12. The display unit 5 displays the 3D image of the point-cloud data and the image of the two or more regions.

After Step S102a, the point-setting unit 185 accepts two reference points on the image of the two or more regions through the operation unit 4 and generates point information indicating the accepted reference points (Step S103a). After Step S103a, Step S104a is executed.

Figure 38:
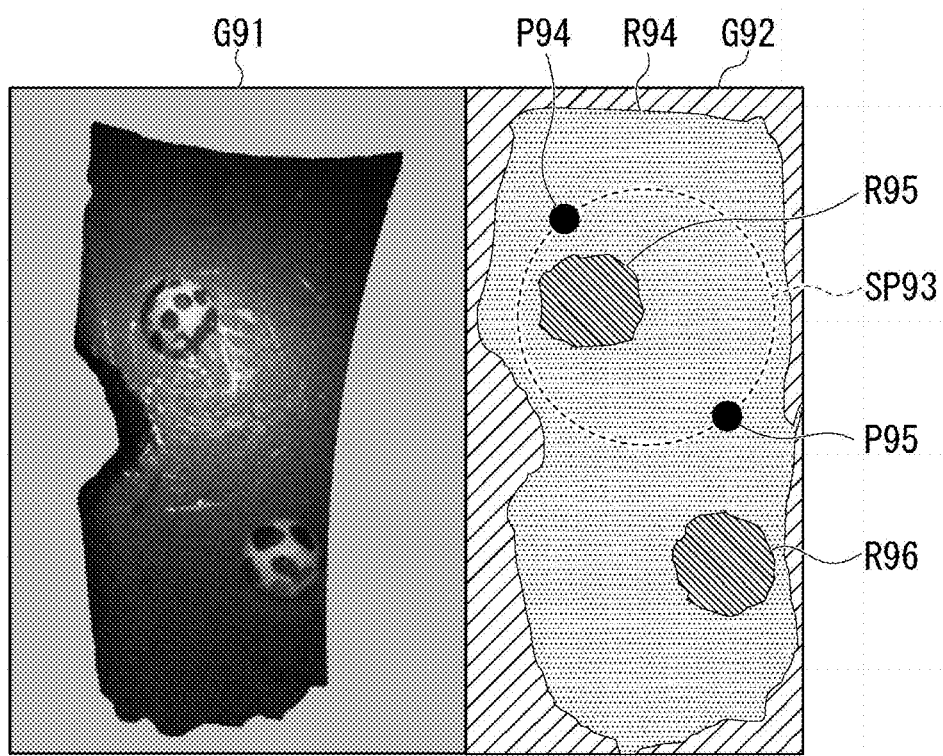
FIG. 38 is a diagram showing an example of an image displayed on a display unit in the first modified example of the sixth embodiment of the present invention.

FIG. 38 shows an example of an image displayed on the display unit 5. The same 3D image G91 as that shown in FIG. 34 and an image G92 of the two or more regions are displayed on the display unit 5. In the example shown in FIG. 38, the region of the image G92 is divided into a region R94, a region R95, and a region R96.

A user refers to the image G92 and determines a position of a reference point. A user can determine a feature of a subject by comparing the 3D image G91 with the image G92. For example, a user can determine that the region R95 and the region R96 are recessed portions or projection portions. A user determines a position of a reference point for setting a reference region that does not include regions corresponding to the region R95 and the region R96. For example, a user designates a reference point on the largest region R94.

A user designates a reference point P94 and a reference point P95 by using a cursor displayed on the image G92 or by touching the screen of the display unit 5. The point-setting unit 185 accepts the reference point P94 and the reference point P95.

The region-setting unit 182 calculates a sphere SP93 having a line segment connecting the reference point P94 and the reference point P95 together as the diameter. The region-setting unit 182 sets the sphere SP93 as the outer boundary of a reference region.

The region-setting unit 182 sets a region having the greatest volume among two or more regions in the sphere SP93 as a reference region. Regions other than the region set as the reference region are not included in the reference region. Part of the region R94 and the entire region R95 are in the sphere SP93. The region R94 in the sphere SP93 is included in the reference region. The region R95 is not included in the reference region. The region-setting unit 182 sets the boundary of the region R95 as the inner boundary of the reference region.

The outer boundary of the reference region may be a cuboid, a cube, a cylinder, or the like. The shape of the reference region is not limited to these examples.

The display control unit 183 may display the 2D image of the subject on the display unit 5 instead of the 3D image of the point-cloud data in Step S102a.

The CPU 18b may include the measurement unit 187 shown in FIG. 20. After Step S107 is executed, Step S108, Step S109, and Step S110 shown in FIG. 21 may be executed.

After the point-setting unit 185 accepts the reference points in Step S103a, a user may change the reference points. The number of reference points set in Step S103a is not limited to two.

After the region-setting unit 182 sets the reference region in Step S104a, a user may change at least one of the size of the reference region and the position of the reference region at any timing. The timing may come after the reference region is displayed in Step S105 or after the reference surface is displayed in Step S107.

The display control unit 183 may display the 3D image of the point-cloud data on the display unit 5 and may display the three or more points of the point-cloud data used for estimating the reference surface on the 3D image. The display control unit 183 may display the 2D image of the subject on the display unit 5 and may display three or more points corresponding to the three or more points of the point-cloud data used for estimating the reference surface on the 2D image.

The display control unit 183 may display an image of the two or more regions generated by dividing the three or more points in the point-cloud data on the display unit 5. The display control unit 183 may display three or more points on the image corresponding to the three or more points of the point-cloud data used for estimating the reference surface.

The reference region does not need to be displayed. Accordingly, Step S105 does not need to be executed. The reference surface does not need to be displayed. Accordingly, Step S107 does not need to be executed.

In the first modified example of the sixth embodiment, a reference region is set on the basis of the state of the surface of a subject. The endoscope device 1 can easily set a reference region that does not include an abnormal region. Accordingly, the endoscope device 1 can improve the accuracy of a reference surface.

Second Modified Example of Sixth Embodiment

A second modified example of the sixth embodiment of the present invention will be described. In the second modified example of the sixth embodiment, a curvature map is used for setting a reference region. The curvature map indicates the distribution of curvatures in the 3D shape of a subject indicated by the point-cloud data. For example, the curvature map includes 3D coordinates of a point and a curvature at the point. A reference region includes a region in which curvatures fall within a predetermined range.

Surface estimation processing in the second modified example of the sixth embodiment will be described. The surface estimation processing in the second modified example of the sixth embodiment is executed in accordance with FIG. 33. Hereinafter, the same processing as the surface estimation processing in the sixth embodiment will not be described.

The state determination unit 188 calculates a curvature at each point of the point-cloud data and generates a curvature map in Step S111. The state determination unit 188 determines a state of a subject on the basis of the curvature map. Specifically, the state determination unit 188 determines a curvature of the surface of the subject by using the following method.

The state determination unit 188 sets, in the 3D space, a three-dimensional determination region having a reference point on the 3D image of the point-cloud data at the center. The state determination unit 188 acquires a curvature associated with each point in the determination region from the curvature map. The state determination unit 188 calculates the difference between the curvature at the reference point and the curvature at each point in the determination region.

The region-setting unit 182 extracts a point at which the difference falls within a predetermined range from the determination region in Step S104a. The region-setting unit 182 extracts three or more points from the determination region. The region-setting unit 182 sets a reference region including the three or more extracted points. The reference region includes all or some of the points in the determination region.

The 2D image of the subject may be used instead of the 3D image of the point-cloud data. Hereinafter, an example in which the 2D image of the subject is used will be described.

The state determination unit 188 calculates a curvature at each point of the point-cloud data and generates a curvature map in Step S111. The state determination unit 188 sets, in the 2D image of the subject, a two-dimensional determination region having the reference point accepted by the point-setting unit 185 at the center. Thereafter, similar processing to that in the example in which the 3D image of the point-cloud data is used is executed, and a reference region is set in the 2D image of the subject.

The display control unit 183 may display an image of the curvature map on the display unit 5 and may display three or more points corresponding to the three or more points of the point-cloud data used for estimating the reference surface on the image.

In the second modified example of the sixth embodiment, a reference region includes three or more points on a surface having a stable curvature. The endoscope device 1 can set a reference region that does not include an abnormal region. Accordingly, the endoscope device 1 can improve the accuracy of a reference surface.

Third Modified Example of Sixth Embodiment

A third modified example of the sixth embodiment of the present invention will be described. In the third modified example of the sixth embodiment, the display control unit 183 displays an image of a curvature map on the display unit 5, and the point-setting unit 185 accepts a reference point on the image.

Figure 39:
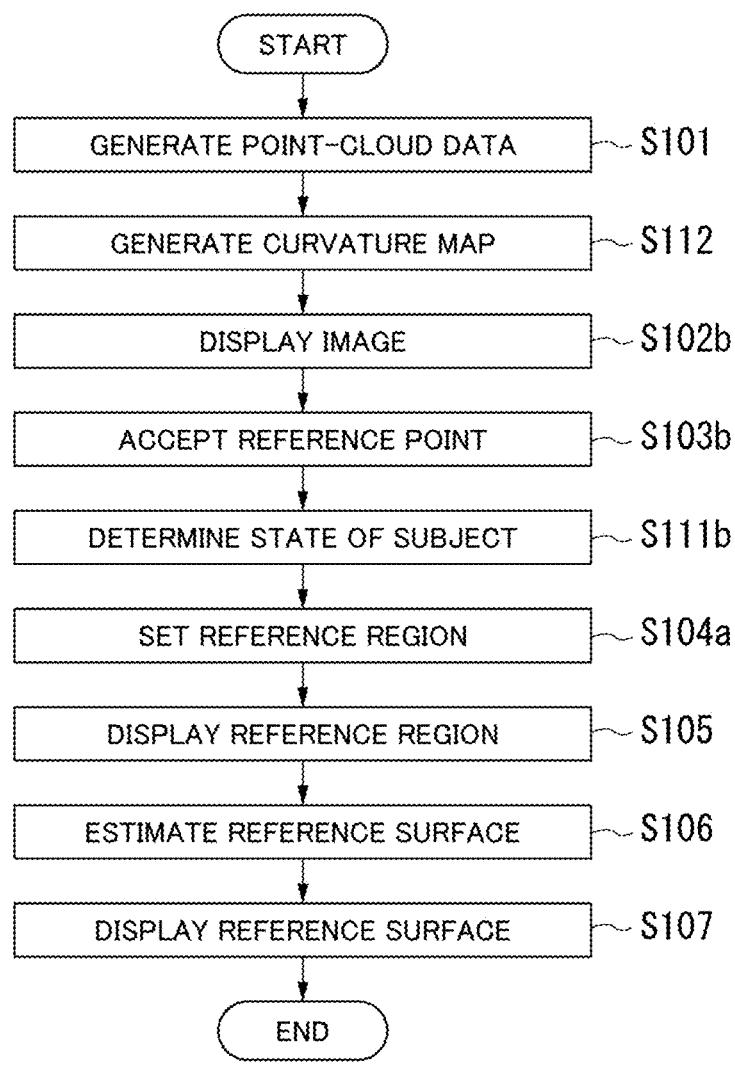
FIG. 39 is a flow chart showing a procedure of surface estimation processing in a third modified example of the sixth embodiment of the present invention.

Surface estimation processing in the third modified example of the sixth embodiment will be described by using FIG. 39. FIG. 39 shows a procedure of the surface estimation processing. The same processing as that shown in FIG. 33 will not be described.

After Step S101, the state determination unit 188 calculates a curvature at each point of the point-cloud data and generates a curvature map (Step S112).

After Step S112, the display control unit 183 displays the 3D image of the point-cloud data and an image of the curvature map on the display unit 5 (Step S102b). Specifically, the display control unit 183 generates a graphic image signal for displaying the 3D image of the point-cloud data and the image of the curvature map. The image of the curvature map includes color data of each pixel. The display control unit 183 outputs the generated graphic image signal to the display unit 5 through the video-signal-processing circuit 12. The display unit 5 displays the 3D image of the point-cloud data and the image of the curvature map.

After Step S102b, the point-setting unit 185 accepts one reference point on the image of the curvature map through the operation unit 4 and generates point information indicating the accepted reference point (Step S103b).

Figure 40:
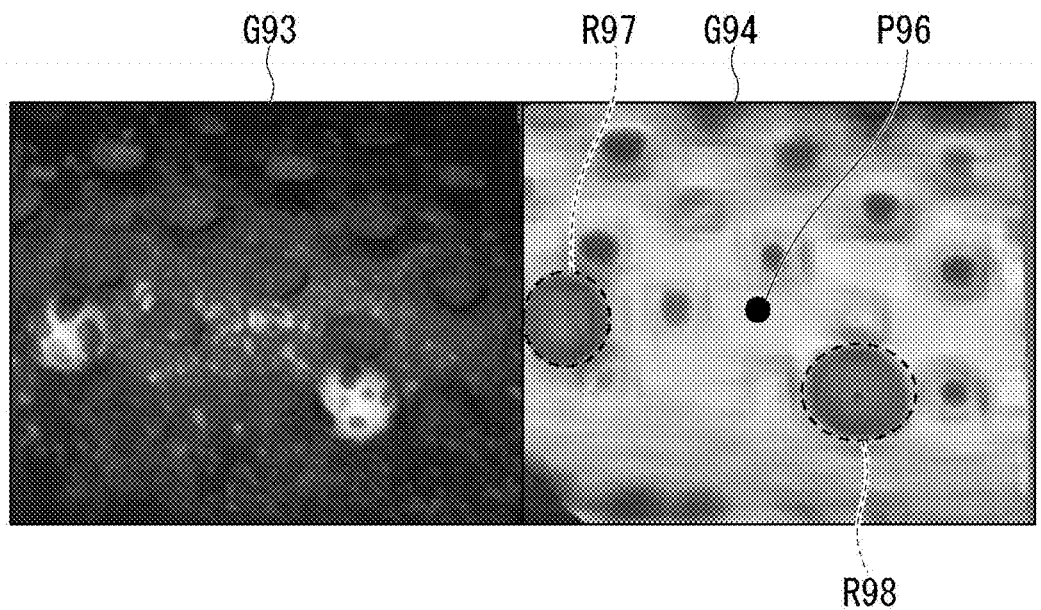
FIG. 40 is a diagram showing an example of an image displayed on a display unit in the third modified example of the sixth embodiment of the present invention.

FIG. 40 shows an example of an image displayed on the display unit 5 in Step S103b. A 3D image G93 of the point-cloud data and an image G94 of the curvature map are displayed on the display unit 5. A pixel of the image G94 is displayed in a color corresponding to the curvature at the pixel. For example, a pixel having a large curvature is displayed in a dark color, and a pixel having a small curvature is displayed in a light color.

A user refers to the image G94 and determines a position of a reference point. A user can determine a feature of a subject by comparing the 3D image G93 with the image G94. For example, the curvatures of a region R97 and a region R98 on the image G94 of the curvature map are higher than those of regions around the region R97 and the region R98. Therefore, a user can determine that the region R97 and the region R98 are recessed portions or projection portions. A user determines a position of a reference point for setting a reference region that does not include regions corresponding to the region R97 and the region R98.

A user designates a reference point P96 by using a cursor displayed on the image G94 or by touching the screen of the display unit 5. The point-setting unit 185 accepts the reference point P96.

After Step S103b, the state determination unit 188 calculates a point of the point-cloud data corresponding to the reference point accepted by the point-setting unit 185. The state determination unit 188 sets, in the 3D space, a three-dimensional determination region having the calculated point at the center. The state determination unit 188 acquires a curvature associated with each point in the determination region from the curvature map. The state determination unit 188 calculates the difference between the curvature at the reference point and the curvature at each point in the determination region (Step S111b). After Step S111b, Step S104a is executed.

The 2D image of the subject may be used instead of the 3D image of the point-cloud data. Hereinafter, an example in which the 2D image of the subject is used will be described.

After the point-setting unit 185 accepts the reference point on the image of the curvature map, the state determination unit 188 calculates a point on the 2D image of the subject corresponding to the reference point. The state determination unit 188 sets, in the 2D image of the subject, a two-dimensional determination region having the calculated point at the center. Thereafter, similar processing to that in the example in which the 3D image of the point-cloud data is used is executed, and a reference region is set in the 2D image of the subject.

In the third modified example of the sixth embodiment, a reference region includes three or more points on a surface having a stable curvature. The endoscope device 1 can set a reference region that does not include an abnormal region. Accordingly, the endoscope device 1 can improve the accuracy of a reference surface.

Seventh Embodiment

A seventh embodiment of the present invention will be described. The endoscope device 1 according to the seventh embodiment includes the CPU 18 shown in FIG. 8 or the CPU 18a shown in FIG. 20.

In the seventh embodiment, a user designates three or more points on the 3D image of the point-cloud data or the 2D image of the subject. A reference region is set on the basis of line segments connecting the three or more points together.

The display control unit 183 displays one of the 3D image of the point-cloud data and the 2D image of the subject on the display unit 5 (image display step). Three or more points on the 3D image of the point-cloud data or the 2D image of the subject are input through the operation unit 4 (region-setting step). The region-setting unit 182 sets a reference region including the input three or more points (region-setting step).

The region-setting unit 182 sets a reference region on the basis of the line segments connecting the input three or more points together in the region-setting step.

Surface estimation processing in the seventh embodiment will be described. The surface estimation processing in the seventh embodiment is executed in accordance with FIG. 9 or FIG. 21. Hereinafter, the same processing as the surface estimation processing in the second embodiment or the third embodiment will not be described.

The display control unit 183 displays the 3D image of the point-cloud data on the display unit 5 in Step S102. Step S102 corresponds to the image display step.

The point-setting unit 185 accepts three or more reference points on the 3D image of the point-cloud data through the operation unit 4 and generates point information indicating each of the three or more accepted reference points in Step S103. Step S103 corresponds to the region-setting step.

The region-setting unit 182 sets a reference region on the basis of the three or more reference points indicated by the point information in Step S104. Step S104 corresponds to the region-setting step.

Figure 41:
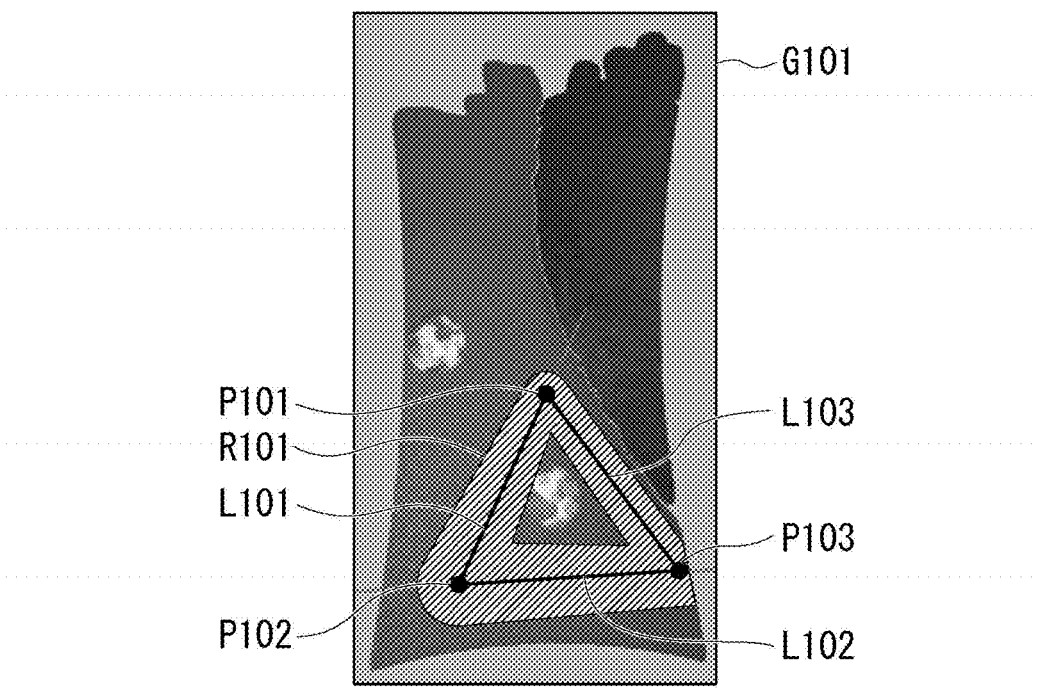
FIG. 41 is a diagram showing an example of an image displayed on a display unit in a seventh embodiment of the present invention.

FIG. 41 shows an example of an image displayed on the display unit 5. A 3D image G101 is displayed on the display unit 5. A user designates a reference point P101, a reference point P102, and a reference point P103 by using a cursor displayed on the 3D image G101 or by touching the screen of the display unit 5. The point-setting unit 185 accepts the reference point P101, the reference point P102, and the reference point P103.

The region-setting unit 182 calculates a line segment connecting two reference points together. In the example shown in FIG. 41, the region-setting unit 182 calculates a line segment L101, a line segment L102, and a line segment L103. The line segment L101 connects the reference point P101 and the reference point P102 together. The line segment L102 connects the reference point P102 and the reference point P103 together. The line segment L103 connects the reference point P103 and the reference point P101 together. Each of the line segment L101, the line segment L102, and the line segment L103 may be displayed on the 3D image G101.

The region-setting unit 182 calculates three cylinders, each of which has one of the line segment L101, the line segment L102, and the line segment L103 as the center axis. The region-setting unit 182 sets a reference region R101 that is a set of regions in the three cylinders. The shape of regions included in the reference region R101 is not limited to a cylinder. The surface estimation unit 186 estimates a reference surface on the basis of three or more points included in the reference region R101.

Figure 42:
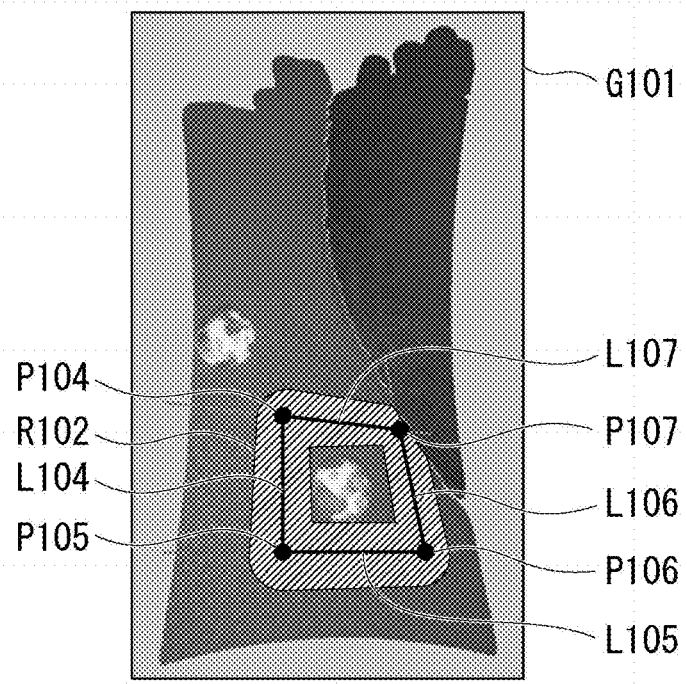
FIG. 42 is a diagram showing an example of an image displayed on the display unit in the seventh embodiment of the present invention.

FIG. 42 shows another example of an image displayed on the display unit 5. The same 3D image G101 as that shown in FIG. 41 is displayed on the display unit 5. A user designates a reference point P104, a reference point P105, a reference point P106, and a reference point P107 by using a cursor displayed on the 3D image G101 or by touching the screen of the display unit 5. The point-setting unit 185 accepts the reference point P104, the reference point P105, the reference point P106, and the reference point P107.

The region-setting unit 182 calculates a line segment connecting two reference points together. In the example shown in FIG. 42, the region-setting unit 182 calculates a line segment L104, a line segment L105, a line segment L106, and a line segment L107. The line segment L104 connects the reference point P104 and the reference point P105 together. The line segment L105 connects the reference point P105 and the reference point P106 together. The line segment L106 connects the reference point P106 and the reference point P107 together. The line segment L107 connects the reference point P107 and the reference point P104 together. Each of the line segment L104, the line segment L105, the line segment L106, and the line segment L107 may be displayed on the 3D image G101.

The region-setting unit 182 calculates four cylinders, each of which has one of the line segment L104, the line segment L105, the line segment L106, and the line segment L107 as the center axis. The region-setting unit 182 sets a reference region R102 that is a set of regions in the four cylinders. The shape of regions included in the reference region R102 is not limited to a cylinder. The surface estimation unit 186 estimates a reference surface on the basis of three or more points included in the reference region R102.

The 2D image of the subject may be used instead of the 3D image of the point-cloud data. Hereinafter, an example in which the 2D image of the subject is used will be described.

The display control unit 183 displays the 2D image of the subject on the display unit 5 in Step S102. The point-setting unit 185 accepts three or more reference points on the 2D image of the subject through the operation unit 4 and generates point information indicating each of the three or more accepted reference points in Step S103. The region-setting unit 182 sets a reference region on the basis of the three or more reference points indicated by the point information in Step S104.

After the point-setting unit 185 accepts the reference points in Step S103, a user may change the reference points. The number of reference points set in Step S103 is not limited to three or four.

The display control unit 183 may display the 3D image of the point-cloud data on the display unit 5 and may display the three or more points of the point-cloud data used for estimating the reference surface on the 3D image. The display control unit 183 may display the 2D image of the subject on the display unit 5 and may display three or more points corresponding to the three or more points of the point-cloud data used for estimating the reference surface on the 2D image.

The reference region does not need to be displayed. Accordingly, Step S105 does not need to be executed. The reference surface does not need to be displayed. Accordingly, Step S107 does not need to be executed.

In the seventh embodiment, a reference region including three or more points designated by a user is set. Therefore, the degree of freedom of the reference region increases in accordance with the shape of the subject or the composition of an image. The endoscope device 1 can easily set a reference region.

Eighth Embodiment

An eighth embodiment of the present invention will be described. The endoscope device 1 according to the eighth embodiment includes the CPU 18 shown in FIG. 8 or the CPU 18*a* shown in FIG. 20.

In the eighth embodiment, a user designates a line on an image by tracing the 3D image of the point-cloud data or the 2D image of the subject. A reference region is set on the basis of three or more points on the designated line.

The display control unit 183 displays one of the 3D image of the point-cloud data and the 2D image of the subject on the display unit 5 (image display step). Three or more points on the line designated in the 3D image of the point-cloud data or the 2D image of the subject by a user are input through the operation unit 4 (region-setting step). The region-setting unit 182 sets a reference region including three or more points on the line (region-setting step).

Surface estimation processing in the eighth embodiment will be described. The surface estimation processing in the eighth embodiment is executed in accordance with FIG. 9 or FIG. 21. Hereinafter, the same processing as the surface estimation processing in the second embodiment or the third embodiment will not be described.

The display control unit 183 displays the 3D image of the point-cloud data on the display unit 5 in Step S102. Step S102 corresponds to the image display step.

A user draws a line by tracing the 3D image of the point-cloud data. The point-setting unit 185 accepts three or more reference points on the line through the operation unit 4 and generates point information indicating each of the three or more accepted reference points in Step S103. Step S103 corresponds to the region-setting step.

The region-setting unit 182 sets a reference region on the basis of the three or more reference points indicated by the point information in Step S104. Step S104 corresponds to the region-setting step.

Figure 43:
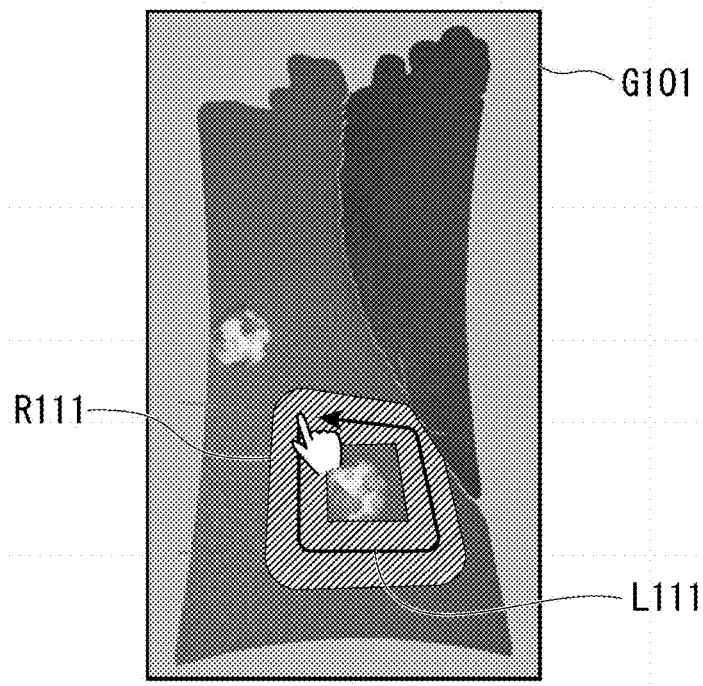
FIG. 43 is a diagram showing an example of an image displayed on a display unit in an eighth embodiment of the present invention.

FIG. 43 shows an example of an image displayed on the display unit 5. The same 3D image G101 as that shown in FIG. 41 is displayed on the display unit 5. In an example in which the display unit 5 and the operation unit 4 are constituted as a touch panel, a user draws a line L111 by tracing the screen of the display unit 5 so that the trace forms a line. In an example in which a cursor on the 3D image G101 is displayed, a user may draw the line L111 by moving the cursor on the 3D image G101 so that the trace forms a line. The point-setting unit 185 accepts all the reference points on the line L111. The point-setting unit 185 may accept some of the reference points on the line L111. The line L111 is not necessarily a closed line.

The region-setting unit 182 sets a reference region R111 having the line L111 as the center axis and having a circle as the cross-section. The shape of the cross-section of the reference region R111 is not limited to a circle. The surface estimation unit 186 estimates a reference surface on the basis of three or more points included in the reference region R111.

The 2D image of the subject may be used instead of the 3D image of the point-cloud data. Hereinafter, an example in which the 2D image of the subject is used will be described.

The display control unit 183 displays the 2D image of the subject on the display unit 5 in Step S102. A user draws a line by tracing the 2D image of the subject. The point-setting unit 185 accepts three or more reference points on the line through the operation unit 4 and generates point information indicating each of the three or more accepted reference points in Step S103. The region-setting unit 182 sets a reference region on the basis of the three or more reference points indicated by the point information in Step S104.

The display control unit 183 may display the 3D image of the point-cloud data on the display unit 5 and may display the three or more points of the point-cloud data used for estimating the reference surface on the 3D image. The display control unit 183 may display the 2D image of the subject on the display unit 5 and may display three or more points corresponding to the three or more points of the point-cloud data used for estimating the reference surface on the 2D image.

The reference region does not need to be displayed. Accordingly, Step S105 does not need to be executed. The reference surface does not need to be displayed. Accordingly, Step S107 does not need to be executed.

In the eighth embodiment, a reference region including three or more points on a line designated by a user by tracing an image is set. Therefore, the degree of freedom of the reference region increases in accordance with the shape of the subject or the composition of an image. The endoscope device 1 can easily set a reference region.

Ninth Embodiment

A ninth embodiment of the present invention will be described. In the ninth embodiment, the 3D image of the point-cloud data or the 2D image of the subject is displayed on the display unit 5, and an image of two or more regions in the point-cloud data is displayed on the display unit 5. A user refers to the image of the two or more regions and designates a reference point on the 3D image of the point-cloud data.

Figure 44:
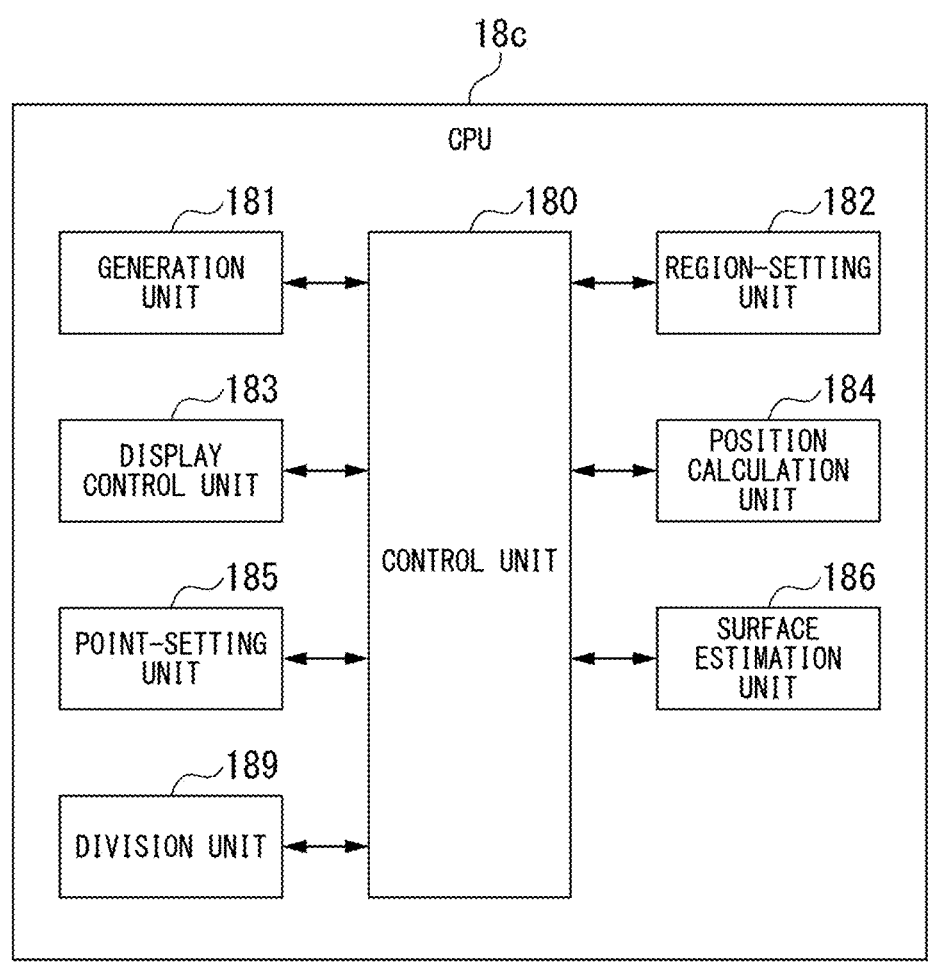
FIG. 44 is a block diagram showing a functional configuration of a CPU included in an endoscope device according to a ninth embodiment of the present invention.

In the ninth embodiment, the CPU 18 shown in FIG. 8 is changed to a CPU 18*c* shown in FIG. 44. FIG. 44 shows a functional configuration of the CPU 18*c*. The CPU 18*c* has functional units including a control unit 180, a generation unit 181, a region-setting unit 182, a display control unit 183, a position calculation unit 184, a point-setting unit 185, a surface estimation unit 186, and a division unit 189. At least one of the blocks shown in FIG. 44 may be constituted by a different circuit from the CPU 18*c*. The same configuration as that shown in FIG. 8 will not be described.

Each unit shown in FIG. 44 may be constituted by at least one of a processor and a logic circuit. Each unit shown in FIG. 44 may include one or a plurality of processors. Each unit shown in FIG. 44 may include one or a plurality of logic circuits.

The division unit 189 has some of the functions of the state determination unit 188 shown in FIG. 32. The division unit 189 divides (classifies) three or more points corresponding to the three-dimensional coordinates included in the point-cloud data into two or more regions (division step). The display control unit 183 displays one of the image of the point-cloud data and the 2D image of the subject on the display unit 5 and displays an image of the two or more regions on the display unit 5 (image display step).

Figure 45:
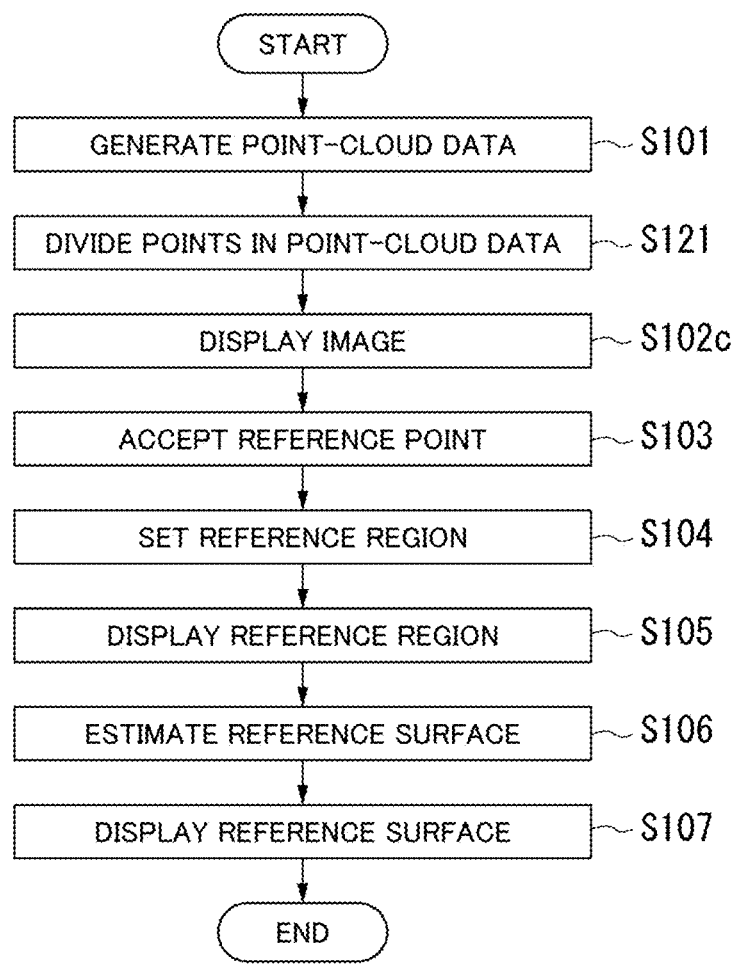
FIG. 45 is a flow chart showing a procedure of surface estimation processing in the ninth embodiment of the present invention.

Surface estimation processing in the ninth embodiment will be described by using FIG. 45. FIG. 45 shows a procedure of the surface estimation processing. The same processing as that shown in FIG. 9 will not be described.

After Step S101, the division unit 189 divides three or more points corresponding to the three-dimensional coordinates included in the point-cloud data into two or more regions (Step S121). Step S121 corresponds to the division step. The division unit 189 divides three or more points in the point-cloud data into two or more regions by using a similar method to that in the sixth embodiment.

After Step S121, the display control unit 183 displays the 3D image of the point-cloud data and an image of the two or more regions on the display unit 5 (Step S102*c*). Step S102*c* corresponds to the image display step. Step S102*c* is the same as Step S102*a* shown in FIG. 37. After Step S102*c*, Step S103 is executed.

Figure 46:
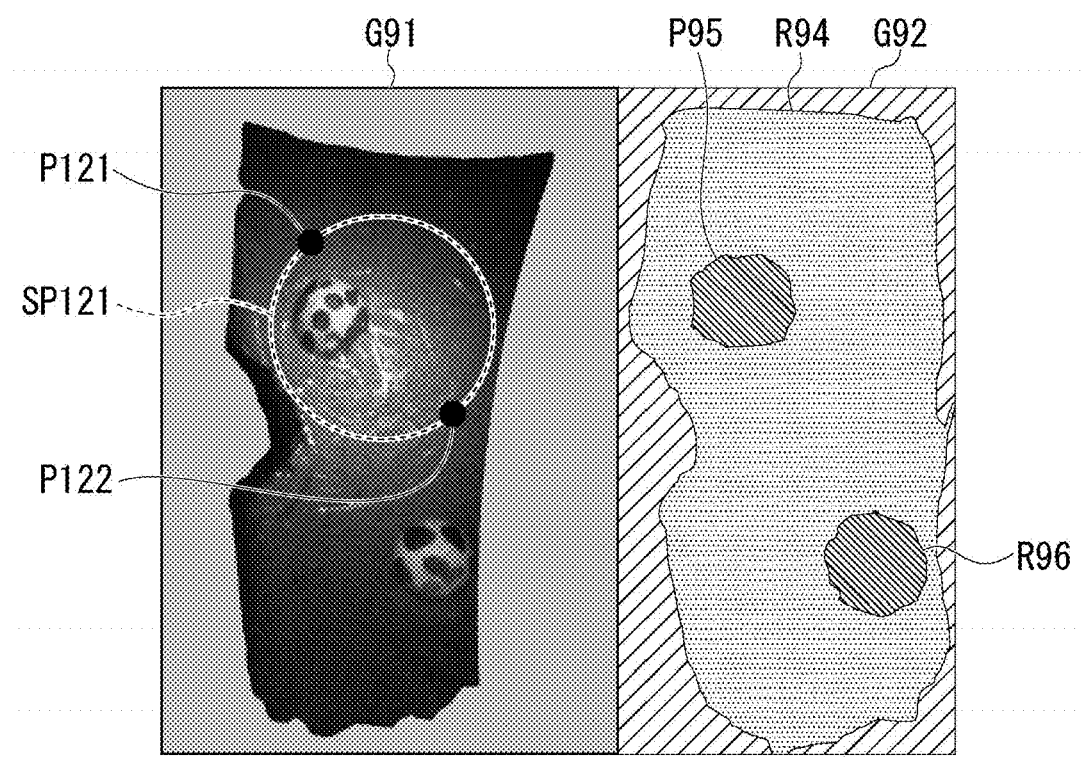
FIG. 46 is a diagram showing an example of an image displayed on a display unit in the ninth embodiment of the present invention.

FIG. 46 shows an example of an image displayed on the display unit 5. The same 3D image G91 as that shown in FIG. 34 and the same image G92 as that shown in FIG. 38 are displayed on the display unit 5. In the example shown in FIG. 46, the region of the image G92 is divided into a region R94, a region R95, and a region R96.

A user refers to the image G92 and determines a position of a reference point. A user can determine a feature of a subject by comparing the 3D image G91 with the image G92. For example, a user can determine that the region R95 and the region R96 are recessed portions or projection portions. A user determines a position of a reference point for setting a reference region that does not include regions corresponding to the region R95 and the region R96. For example, a user designates a reference point on a region of the 3D image G91 corresponding to the largest region R94.

A user designates a reference point P121 and a reference point P122 by using a cursor displayed on the 3D image G91 or by touching the screen of the display unit 5. The point-setting unit 185 accepts the reference point P121 and the reference point P122.

The region-setting unit 182 calculates a sphere SP121 having a line segment connecting the reference point P121 and the reference point P122 together as the diameter. The region-setting unit 182 sets the sphere SP121 as the boundary of a reference region. The region-setting unit 182 may exclude a region of the 3D image G91 corresponding to the region R95 from the reference region.

The reference region may be a cuboid, a cube, a cylinder, or the like. The shape of the reference region is not limited to these examples.

The display control unit 183 may display the 2D image of the subject on the display unit 5 instead of the 3D image of the point-cloud data in Step S102*c*.

The CPU 18*c* may include the measurement unit 187 shown in FIG. 20. After Step S107 is executed, Step S108, Step S109, and Step S110 shown in FIG. 21 may be executed.

After the point-setting unit 185 accepts the reference points in Step S103, a user may change the reference points. The number of reference points set in Step S103 is not limited to two.

After the region-setting unit 182 sets the reference region in Step S104, a user may change at least one of the size of the reference region and the position of the reference region at any timing. The timing may come after the reference region is displayed in Step S105 or after the reference surface is displayed in Step S107.

The display control unit 183 may display the 3D image of the point-cloud data on the display unit 5 and may display the three or more points of the point-cloud data used for estimating the reference surface on the 3D image. The display control unit 183 may display the 2D image of the subject on the display unit 5 and may display three or more points corresponding to the three or more points of the point-cloud data used for estimating the reference surface on the 2D image.

The reference region does not need to be displayed. Accordingly, Step S105 does not need to be executed. The reference surface does not need to be displayed. Accordingly, Step S107 does not need to be executed.

In the ninth embodiment, an image of two or more regions in the point-cloud data is displayed on the display unit 5. A user can determine a suitable region for designating a reference point by referring to the image.

Modified Example of Ninth Embodiment

A modified example of the ninth embodiment of the present invention will be described. In the modified example of the ninth embodiment, the 3D image of the point-cloud data or the 2D image of the subject is displayed on the display unit 5, and an image of a curvature map is displayed on the display unit 5. The curvature map indicates the distribution of curvatures in the 3D shape of the subject indicated by the point-cloud data. For example, the curvature map includes 3D coordinates of a point and a curvature at the point. A user refers to the image of the curvature map and designates a reference point on the 3D image of the point-cloud data.

Figure 47:
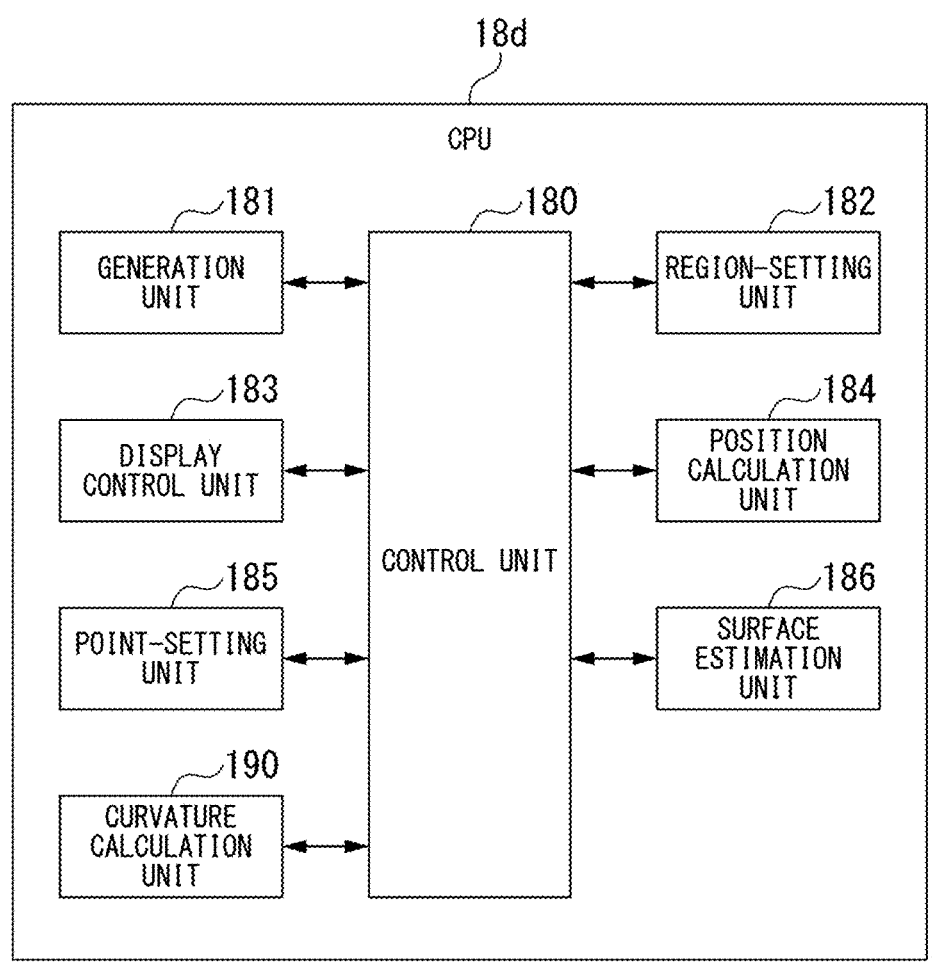
FIG. 47 is a block diagram showing a functional configuration of a CPU included in an endoscope device according to a modified example of the ninth embodiment of the present invention.

In the modified example of the ninth embodiment, the CPU 18 shown in FIG. 8 is changed to a CPU 18*d* shown in FIG. 47. FIG. 47 shows a functional configuration of the CPU 18*d*. The CPU 18*d* has functional units including a control unit 180, a generation unit 181, a region-setting unit 182, a display control unit 183, a position calculation unit 184, a point-setting unit 185, a surface estimation unit 186, and a curvature calculation unit 190. At least one of the blocks shown in FIG. 47 may be constituted by a different circuit from the CPU 18*d*. The same configuration as that shown in FIG. 8 will not be described.

Each unit shown in FIG. 47 may be constituted by at least one of a processor and a logic circuit. Each unit shown in FIG. 47 may include one or a plurality of processors. Each unit shown in FIG. 47 may include one or a plurality of logic circuits.

The curvature calculation unit 190 has some of the functions of the state determination unit 188 shown in FIG. 32. The curvature calculation unit 190 calculates a curvature at each point of the point-cloud data and generates a curvature map (map generation step). The display control unit 183 displays one of the 3D image of the point-cloud data and the 2D image of the subject on the display unit 5 and displays an image of the curvature map on the display unit 5 (image display step).

Figure 48:
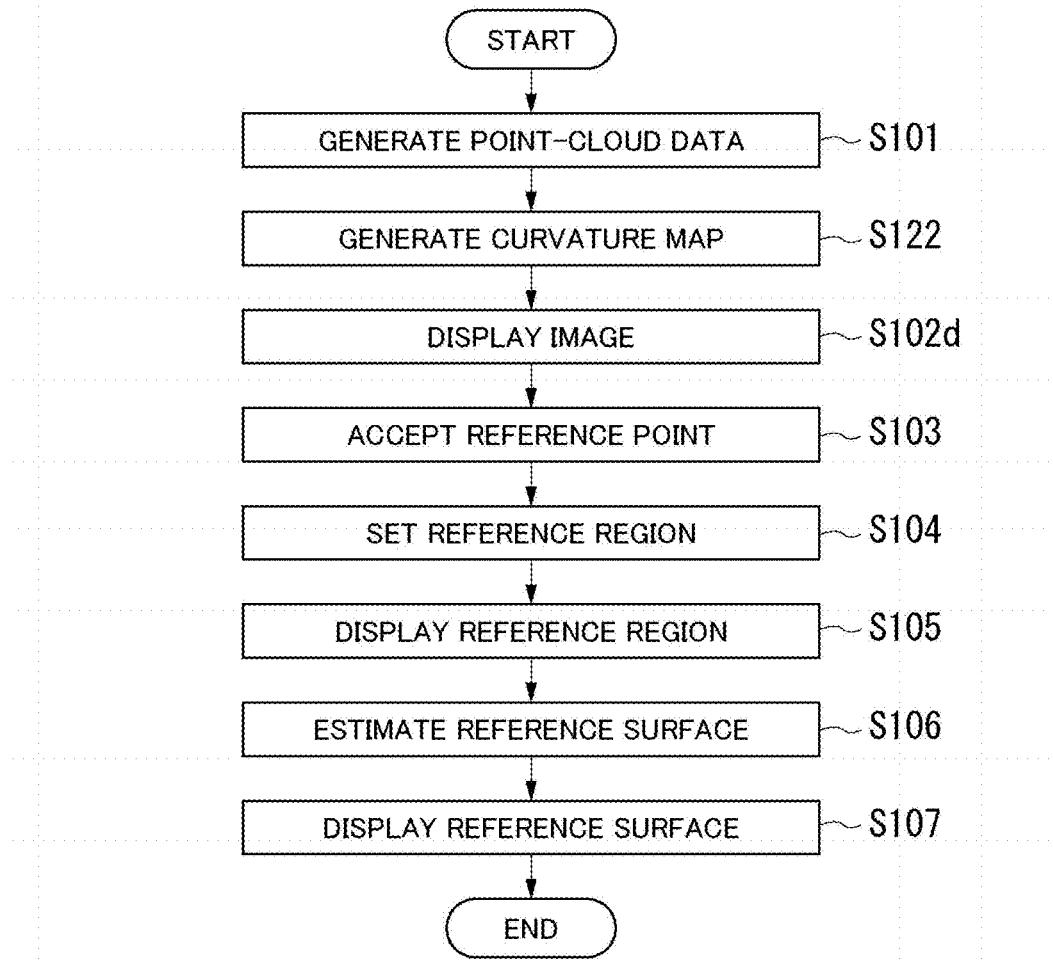
FIG. 48 is a flow chart showing a procedure of surface estimation processing in the modified example of the ninth embodiment of the present invention.

Surface estimation processing in the modified example of the ninth embodiment will be described by using FIG. 48. FIG. 48 shows a procedure of the surface estimation processing. The same processing as that shown in FIG. 9 will not be described.

After Step S101, the curvature calculation unit 190 calculates a curvature at each point of the point-cloud data and generates a curvature map (Step S122). Step S122 corresponds to the map generation step. The curvature calculation unit 190 generates the curvature map by using a similar method to that in the second modified example of the sixth embodiment.

After Step S122, the display control unit 183 displays the 3D image of the point-cloud data and an image of the curvature map on the display unit 5 (Step S102d). Step S102d corresponds to the image display step. Step S102d is the same as Step S102b shown in FIG. 39. After Step S102d, Step S103 is executed.

Figure 49:
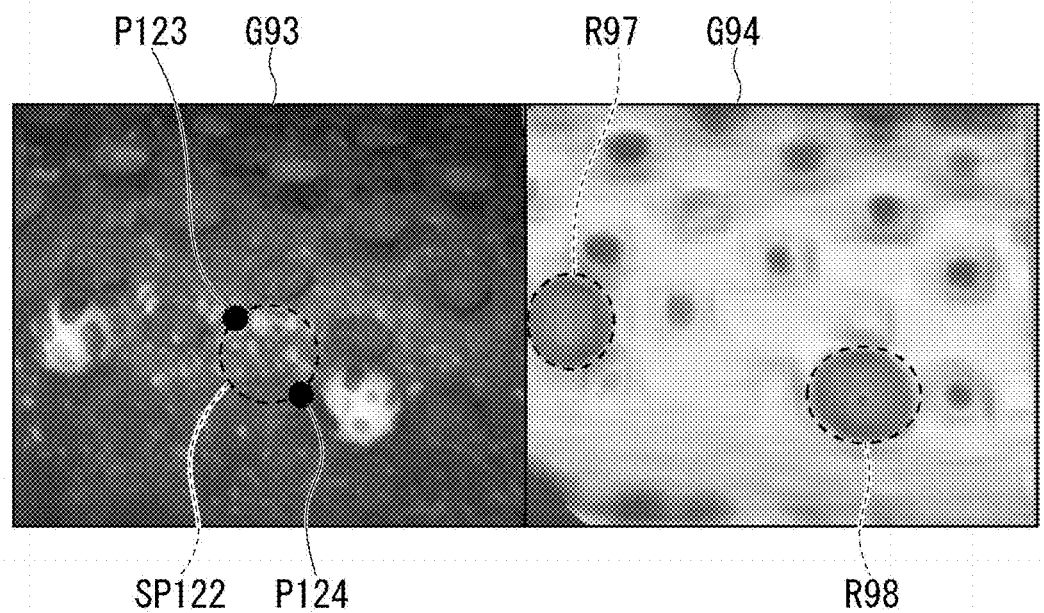
FIG. 49 is a diagram showing an example of an image displayed on a display unit in the modified example of the ninth embodiment of the present invention.

FIG. 49 shows an example of an image displayed on the display unit 5. The same 3D image G93 as that shown in FIG. 40 and the same image G94 as that shown in FIG. 40 are displayed on the display unit 5.

A user refers to the image G94 and determines a position of a reference point. A user can determine a feature of a subject by comparing the 3D image G93 with the image G94. For example, the curvatures of a region R97 and a region R98 on the image G94 of the curvature map are greater than those of regions around the region R97 and the region R98. Therefore, a user can determine that the region R97 and the region R98 are recessed portions or projection portions. A user determines a position of a reference point for setting a reference region that does not include regions corresponding to the region R97 and the region R98.

A user designates a reference point P123 and a reference point P124 by using a cursor displayed on the 3D image G93 or by touching the screen of the display unit 5. The point-setting unit 185 accepts the reference point P123 and the reference point P124.

The region-setting unit 182 calculates a sphere SP122 having a line segment connecting the reference point P123 and the reference point P124 together as the diameter. The region-setting unit 182 sets the sphere SP122 as the boundary of a reference region.

The reference region may be a cuboid, a cube, a cylinder, or the like. The shape of the reference region is not limited to these examples.

The display control unit 183 may display the 2D image of the subject on the display unit 5 instead of the 3D image of the point-cloud data in Step S102d.

The CPU 18d may include the measurement unit 187 shown in FIG. 20. After Step S107 is executed, Step S108, Step S109, and Step S110 shown in FIG. 21 may be executed.

After the point-setting unit 185 accepts the reference points in Step S103, a user may change the reference points. The number of reference points set in Step S103 is not limited to two.

After the region-setting unit 182 sets the reference region in Step S104, a user may change at least one of the size of the reference region and the position of the reference region at any timing. The timing may come after the reference region is displayed in Step S105 or after the reference surface is displayed in Step S107.

The display control unit 183 may display the 3D image of the point-cloud data on the display unit 5 and may display the three or more points of the point-cloud data used for estimating the reference surface on the 3D image. The display control unit 183 may display the 2D image of the subject on the display unit 5 and may display three or more points corresponding to the three or more points of the point-cloud data used for estimating the reference surface on the 2D image.

The reference region does not need to be displayed. Accordingly, Step S105 does not need to be executed. The reference surface does not need to be displayed. Accordingly, Step S107 does not need to be executed.

In the modified example of the ninth embodiment, an image of a curvature map is displayed on the display unit 5. A user can determine a suitable region for designating a reference point by referring to the image.

Tenth Embodiment

A tenth embodiment of the present invention will be described. In the tenth embodiment, an abnormal region on the surface of a subject is automatically detected, and a reference region excluding a region corresponding to the abnormal region is set. A user does not need to designate a reference point.

Figure 50:
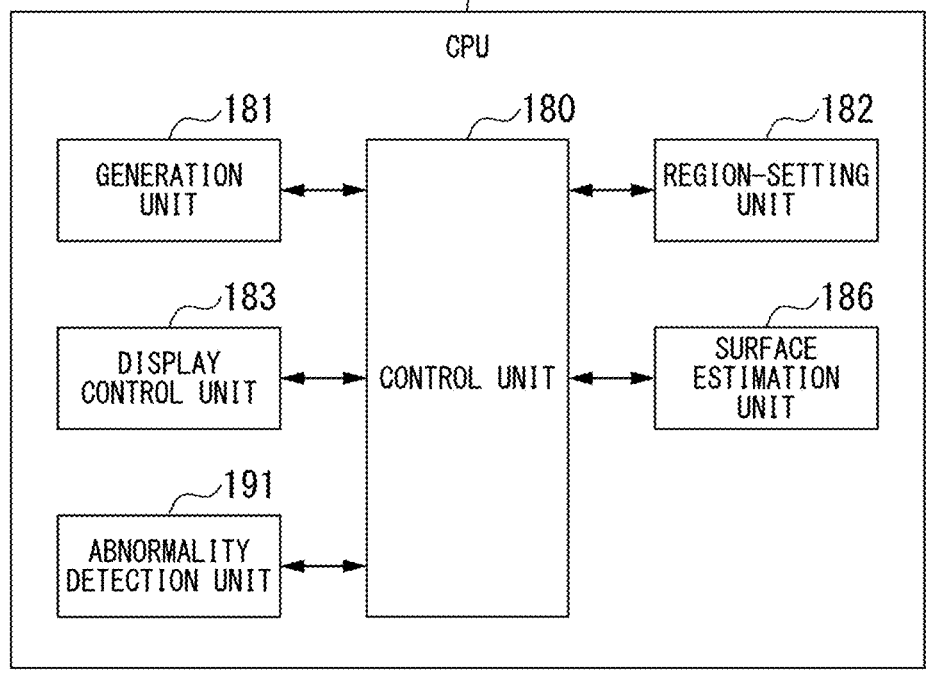
FIG. 50 is a block diagram showing a functional configuration of a CPU included in an endoscope device according to a tenth embodiment of the present invention.

In the tenth embodiment, the CPU 18 shown in FIG. 8 is changed to a CPU 18e shown in FIG. 50. FIG. 50 shows a functional configuration of the CPU 18e. The CPU 18e has functional units including a control unit 180, a generation unit 181, a region-setting unit 182, a display control unit 183, a surface estimation unit 186, and an abnormality detection unit 191. At least one of the blocks shown in FIG. 50 may be constituted by a different circuit from the CPU 18e. The same configuration as that shown in FIG. 8 will not be described.

Each unit shown in FIG. 50 may be constituted by at least one of a processor and a logic circuit. Each unit shown in FIG. 50 may include one or a plurality of processors. Each unit shown in FIG. 50 may include one or a plurality of logic circuits.

The abnormality detection unit 191 detects an abnormal region on the surface of a subject on the basis of one of the 3D image of the point-cloud data and the 2D image of the subject (abnormality detection step). The region-setting unit 182 sets a reference region excluding a region corresponding to the abnormal region (region-setting step).

Figure 51:
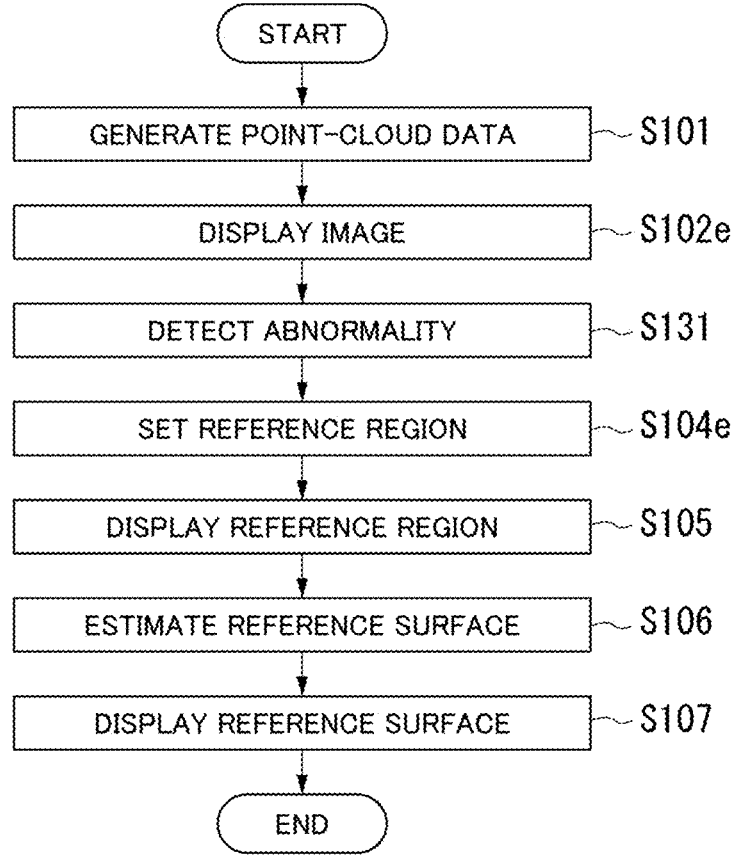
FIG. 51 is a flow chart showing a procedure of surface estimation processing in the tenth embodiment of the present invention.

Surface estimation processing in the tenth embodiment will be described by using FIG. 51. FIG. 51 shows a procedure of the surface estimation processing. The same processing as that shown in FIG. 9 will not be described.

After Step S101, the display control unit 183 displays the 2D image of the subject on the display unit 5 (Step S102e).

After Step S102e, the abnormality detection unit 191 detects an abnormal region on the surface of the subject on the basis of the 2D image of the subject (Step S131). Step S131 corresponds to the abnormality detection step.

The abnormality detection unit 191 detects an abnormal region from the 2D image of the subject by using a recognition model of an abnormality. For example, a recognition model of an abnormality is acquired through machine learning such as deep learning. An abnormality is a defect, damage, or the like. The abnormality detection unit 191 obtains a type of an abnormality and a position of the abnormal region.

After Step S131, the region-setting unit 182 sets a reference region excluding a region corresponding to the abnormal region on the 2D image of the subject (Step S104e). Step S104e corresponds to the region-setting step. After Step S104e, Step S105 is executed.

Figure 52:
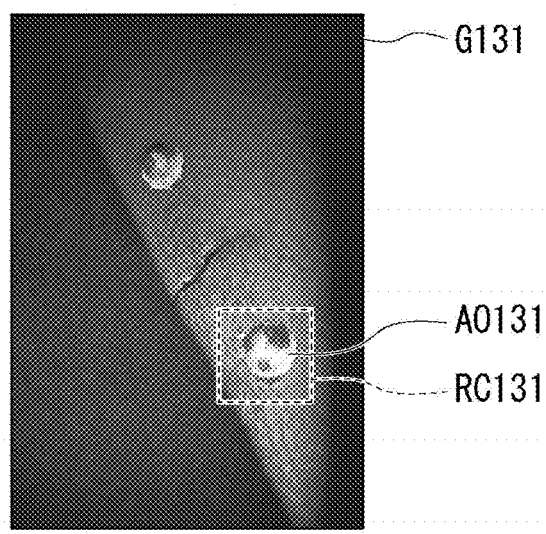
FIG. 52 is a diagram showing an example of an image displayed on a display unit in the tenth embodiment of the present invention.
Figure 53:
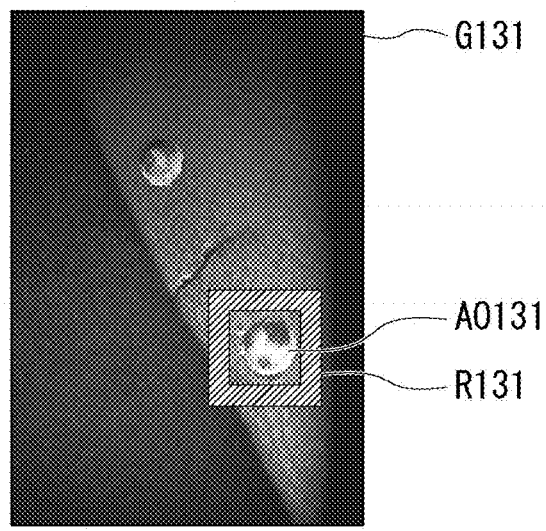
FIG. 53 is a diagram showing an example of an image displayed on the display unit in the tenth embodiment of the present invention.

FIG. 52 and FIG. 53 show examples of an image displayed on the display unit 5. A 2D image G131 is displayed on the display unit 5. The abnormality detection unit 191 detects a convex abnormal object AO131 by processing the 2D image G131.

The region-setting unit 182 calculates a rectangle RC131 around the abnormal object AO131. The region-setting unit 182 sets a first boundary that is a predetermined distance away from the rectangle RC131 outside the rectangle RC131. In addition, the region-setting unit 182 sets a second boundary that is a predetermined distance away from the rectangle RC131 inside the rectangle RC131. In this way, the region-setting unit 182 sets a reference region R131 including the first boundary and the second boundary in the 2D image G131.

The boundary of the reference region R131 may be a polygon having three or more vertices. The boundary of the reference region R131 may be a circle, an ellipse, or the like. The shape of the reference region R131 is not limited to these examples.

The 3D image of the point-cloud data may be used instead of the 2D image of the subject. Hereinafter, an example in which the 3D image of the point-cloud data is used will be described.

The display control unit 183 displays the 3D image of the point-cloud data on the display unit 5 in Step S102e. The abnormality detection unit 191 detects an abnormal region on the surface of the subject on the basis of the 3D image of the point-cloud data in Step S131. The region-setting unit 182 sets, in the 3D space, a reference region excluding a region corresponding to the abnormal region in Step S104e.

The CPU 18e may include the measurement unit 187 shown in FIG. 20. After Step S107 is executed, Step S108, Step S109, and Step S110 shown in FIG. 21 may be executed.

The control unit 180 may set the measurement mode on the basis of the type of the abnormality detected by the abnormality detection unit 191. For example, when a convex or concave abnormal object is detected, the control unit 180 may set the measurement mode to the surface-based measurement in order to measure the height or the depth.

Region information indicating the size of the reference region may be recorded on a recording medium in advance. The region-setting unit 182 may set the size of the reference region on the basis of the region information in Step S104e.

Two or more pieces of the region information may be recorded on a recording medium in advance. The region-setting unit 182 may select one of the two or more pieces of the region information on the basis of information input through the operation unit 4 in Step S104e. The region-setting unit 182 may set the size of the reference region on the basis of the selected region information in Step S104e.

After the region-setting unit 182 sets the reference region in Step S104e, a user may change at least one of the size of the reference region and the position of the reference region at any timing. The timing may come after the reference region is displayed in Step S105 or after the reference surface is displayed in Step S107.

The display control unit 183 may display the 3D image of the point-cloud data on the display unit 5 and may display the three or more points of the point-cloud data used for estimating the reference surface on the 3D image. The display control unit 183 may display the 2D image of the subject on the display unit 5 and may display three or more points corresponding to the three or more points of the point-cloud data used for estimating the reference surface on the 2D image.

The reference region does not need to be displayed. Accordingly, Step S105 does not need to be executed. The reference surface does not need to be displayed. Accordingly, Step S107 does not need to be executed.

In a case in which displaying the reference region and displaying the reference surface are unnecessary, an image does not need to be displayed. Accordingly, Step S102e does not need to be executed. The CPU 18e does not need to have the function of the display control unit 183.

In the tenth embodiment, the endoscope device 1 can set a reference region that does not include an abnormal region. Therefore, the endoscope device 1 can improve the accuracy of a reference surface.

Eleventh Embodiment

An eleventh embodiment of the present invention will be described. In the eleventh embodiment, a deviation map is displayed on the display unit 5. The deviation map indicates the distribution of the 3D distance between a reference surface and a point corresponding to the 3D coordinates included in the point-cloud data.

Figure 54:
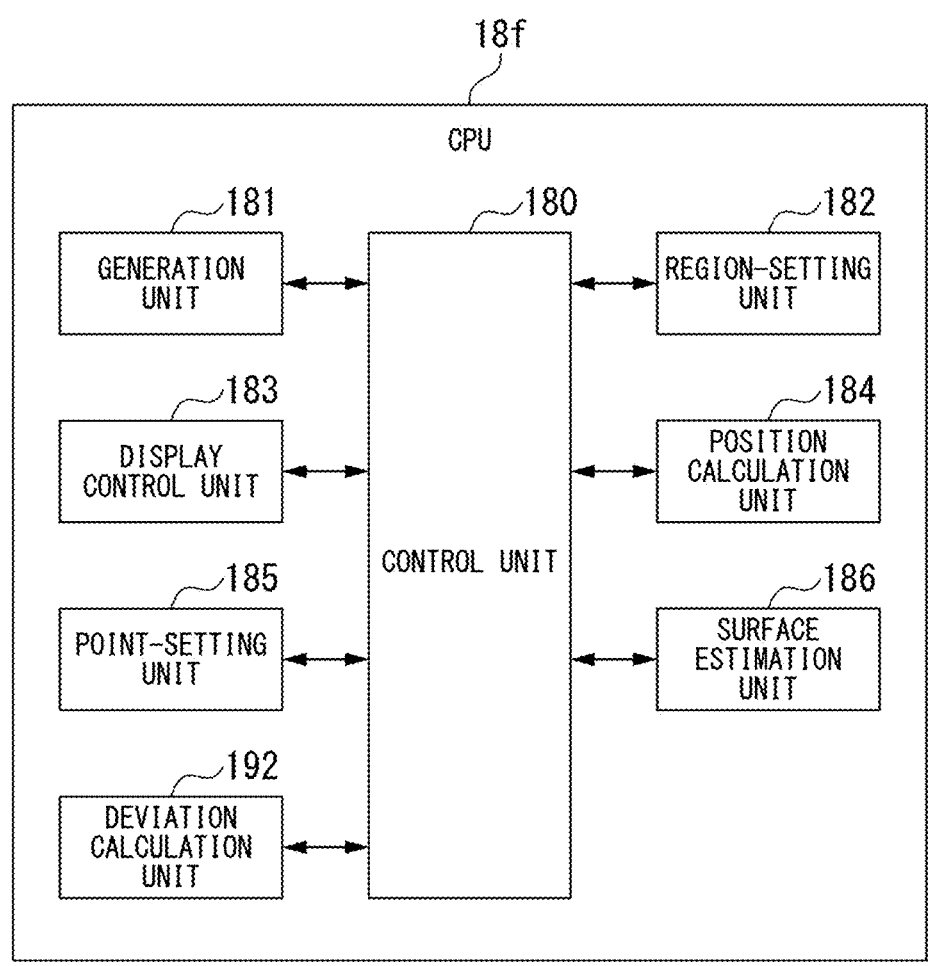
FIG. 54 is a block diagram showing a functional configuration of a CPU included in an endoscope device according to an eleventh embodiment of the present invention.

In the eleventh embodiment, the CPU 18 shown in FIG. 8 is changed to a CPU 18f shown in FIG. 54. FIG. 54 shows a functional configuration of the CPU 18f. The CPU 18f has functional units including a control unit 180, a generation unit 181, a region-setting unit 182, a display control unit 183, a position calculation unit 184, a point-setting unit 185, a surface estimation unit 186, and a deviation calculation unit 192. At least one of the blocks shown in FIG. 54 may be constituted by a different circuit from the CPU 18f. The same configuration as that shown in FIG. 8 will not be described.

Each unit shown in FIG. 54 may be constituted by at least one of a processor and a logic circuit. Each unit shown in FIG. 54 may include one or a plurality of processors. Each unit shown in FIG. 54 may include one or a plurality of logic circuits.

The deviation calculation unit 192 calculates a deviation by calculating the 3D distance between a reference surface and each point in the point-cloud data. The deviation calculation unit 192 generates a deviation map indicating the distribution of deviations (map generation step). The display control unit 183 displays one of the 3D image of the point-cloud data and the 2D image of the subject on the display unit 5 and displays the deviation map on the 3D image of the point-cloud data or the 2D image of the subject (image display step).

Figure 55:
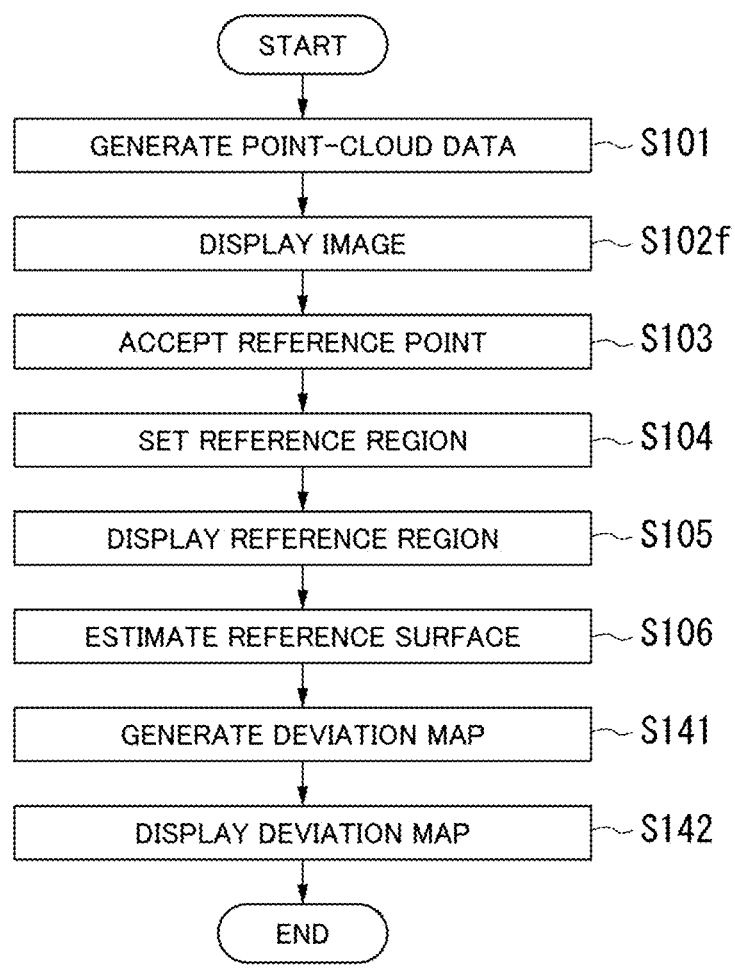
FIG. 55 is a flow chart showing a procedure of surface estimation processing in the eleventh embodiment of the present invention.

Surface estimation processing in the eleventh embodiment will be described by using FIG. 55. FIG. 55 shows a procedure of the surface estimation processing. The same processing as that shown in FIG. 9 will not be described.

After Step S101, the display control unit 183 displays the 3D image of the point-cloud data on the display unit 5 (Step S102f). After Step S102f, Step S103 is executed.

After Step S106, the deviation calculation unit 192 calculates a deviation at each point of the point-cloud data and generates a deviation map (Step S141). Step S141 corresponds to the map generation step.

After Step S141, the display control unit 183 displays an image of the deviation map on the display unit 5 (Step S142). Specifically, the display control unit 183 generates a graphic image signal for displaying the 3D image of the point-cloud data on which the image of the deviation map is superimposed. The image of the deviation map includes color data of each pixel. The display control unit 183 outputs the generated graphic image signal to the display unit 5 through the video-signal-processing circuit 12. The display unit 5 displays the 3D image of the point-cloud data on which the image of the deviation map is superimposed.

Step S142 corresponds to the image display step. When Step S142 is executed, the surface estimation processing is completed.

Figure 56:
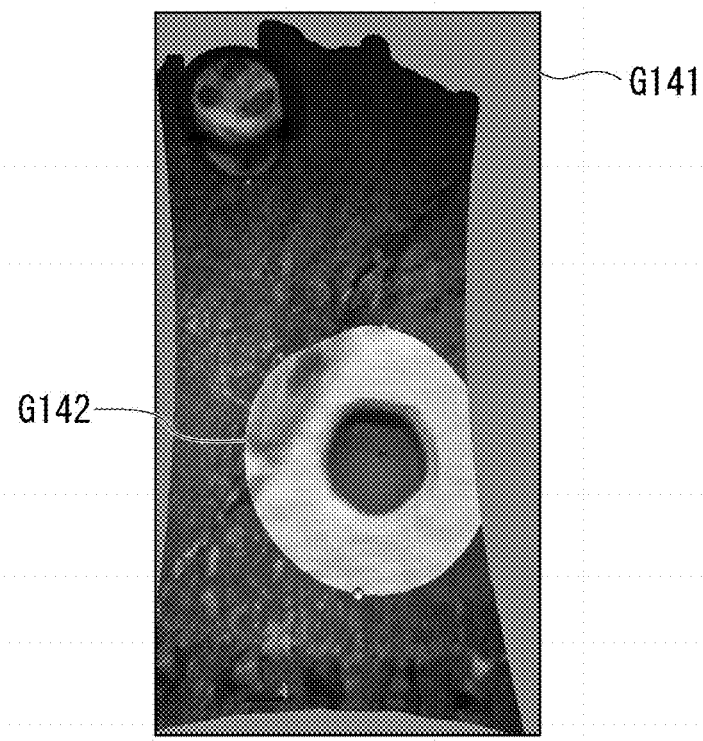
FIG. 56 is a diagram showing an example of an image displayed on a display unit in the eleventh embodiment of the present invention.

FIG. 56 shows an example of an image displayed on the display unit 5. A 3D image G141 of the point-cloud data is displayed on the display unit 5 and an image G142 of the deviation map is displayed on the 3D image G141. A pixel of the image G142 is displayed in a color corresponding to the deviation at the pixel. For example, a pixel having a large deviation is displayed in a dark color, and a pixel having a small deviation is displayed in a light color. In FIG. 56, a reference region and a reference surface are not shown.

A user can check whether or not a reference surface matches the surface of a subject by referring to the image G142. In a case in which a region having a large deviation is included in a reference region, the accuracy of a reference surface may deteriorate. When a reference region and the image G142 are displayed on the 3D image G141, a user can check whether or not a region having a large deviation is included in the reference region.

The display control unit 183 may display the 2D image of the subject on the display unit 5 instead of the 3D image of the point-cloud data in Step S102$f$.

The CPU 18$f$ may include the measurement unit 187 shown in FIG. 20. After Step S107, Step S141, or Step S142 is executed, Step S108, Step S109, and Step S110 shown in FIG. 21 may be executed.

After the point-setting unit 185 accepts the reference points in Step S103, a user may change the reference points.

Region information indicating at least one of the size of the reference region and the position of the reference region may be recorded on a recording medium in advance. The region-setting unit 182 may set at least one of the size of the reference region and the position of the reference region on the basis of the region information in Step S104. For example, the region-setting unit 182 may set at least one of the size of the outer boundary of the reference region and the position of the outer boundary of the reference region on the basis of the region information.

Two or more pieces of the region information may be recorded on a recording medium in advance. The region-setting unit 182 may select one of the two or more pieces of the region information on the basis of information input through the operation unit 4 in Step S104. The region-setting unit 182 may set one of the size of the reference region and the position of the reference region on the basis of the selected region information in Step S104.

After the region-setting unit 182 sets the reference region in Step S104, a user may change at least one of the size of the reference region and the position of the reference region at any timing. The timing may come after the reference region is displayed in Step S105 or after the deviation map is displayed in Step S142.

The region-setting unit 182 may set a reference region without using a reference point. Accordingly, Step S103 does not need to be executed. The CPU 18$f$ does not need to have the functions of the position calculation unit 184 and the point-setting unit 185.

The display control unit 183 may display the 3D image of the point-cloud data on the display unit 5 and may display the three or more points of the point-cloud data used for estimating the reference surface on the 3D image. The display control unit 183 may display the 2D image of the subject on the display unit 5 and may display three or more points corresponding to the three or more points of the point-cloud data used for estimating the reference surface on the 2D image.

The reference region does not need to be displayed. Accordingly, Step S105 does not need to be executed.

In the eleventh embodiment, an image of a deviation map is displayed on the display unit 5. A user can check whether or not the reference surface accurately approximates the surface of the subject by referring to the image.

Twelfth Embodiment

A twelfth embodiment of the present invention will be described. Hereinafter, an example in which the PC 41 shown in FIG. 7 is a surface estimation device will be described. The PC 41 acquires a 2D image of a subject from the endoscope device 1 and executes surface estimation processing.

The external device interface 16 of the endoscope device 1 performs communication with the PC 41. Specifically, the external device interface 16 transmits one or more 2D images of a subject to the PC 41. The PC 41 receives the 2D images from the endoscope device 1.

For example, the external device interface 16 is connected to the PC 41 wirelessly or by a cable. The communication between the external device interface 16 and the PC 41 may be performed via a local area network (LAN) or the Internet.

Figure 57:
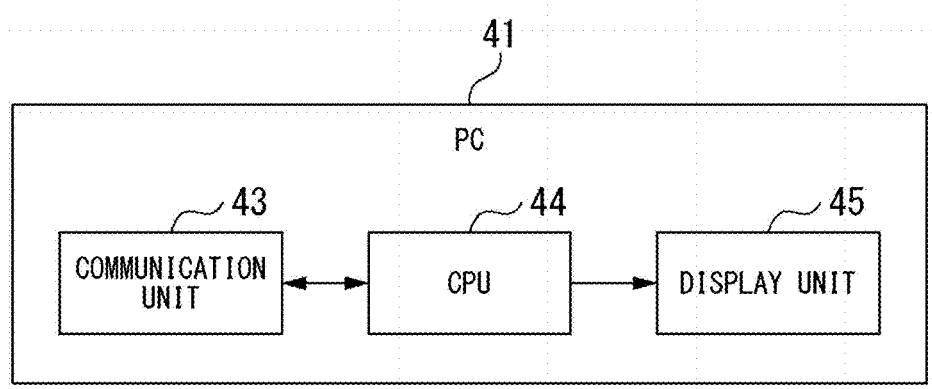
FIG. 57 is a block diagram showing a configuration of a personal computer according to a twelfth embodiment of the present invention.

FIG. 57 shows a configuration of the PC 41. The PC 41 shown in FIG. 57 includes a communication unit 43, a CPU 44, and a display unit 45.

The communication unit 43 performs communication with the external device interface 16 of the endoscope device 1. Specifically, the communication unit 43 receives one or more 2D images of a subject from the external device interface 16. The CPU 44 executes surface estimation processing. The display unit 45 is a monitor (display) such as an LCD. The display unit 45 includes a display screen and displays an image, an operation menu, and the like on the display screen.

Figure 58:
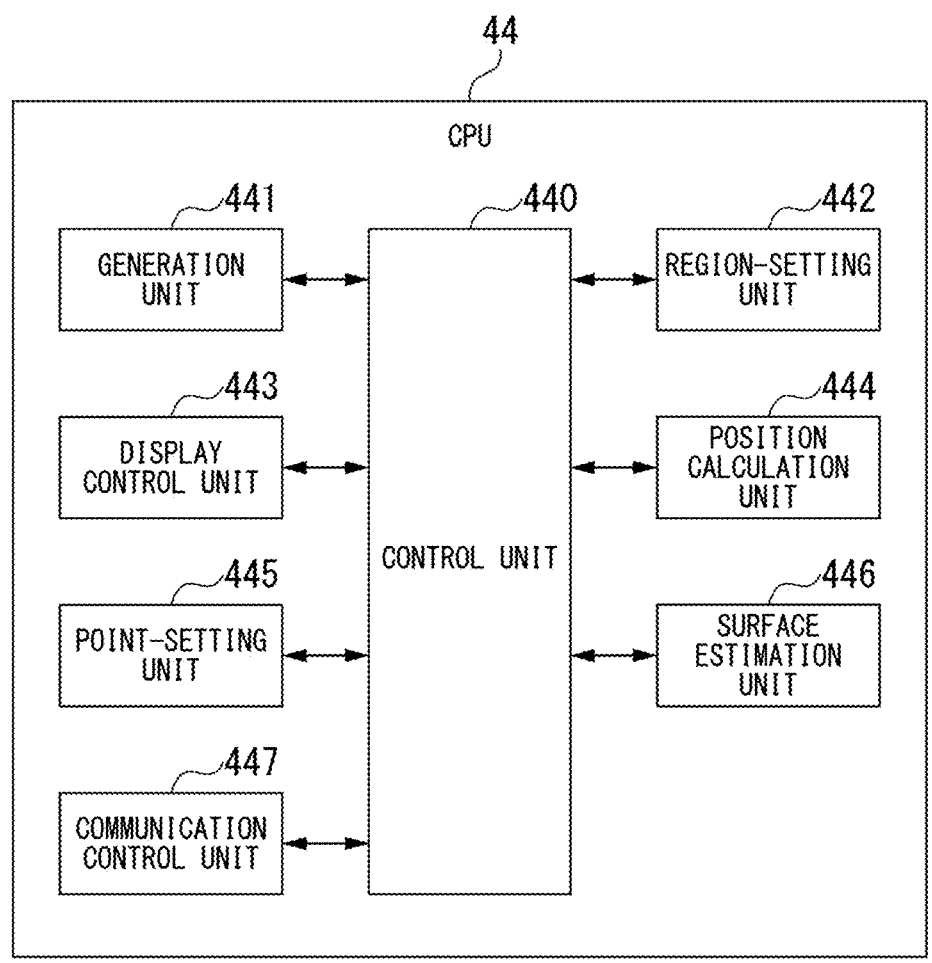
FIG. 58 is a block diagram showing a functional configuration of a CPU included in the personal computer according to the twelfth embodiment of the present invention.

FIG. 58 shows a functional configuration of the CPU 44. The CPU 44 has functional units including a control unit 440, a generation unit 441, a region-setting unit 442, a display control unit 443, a position calculation unit 444, a point-setting unit 445, a surface estimation unit 446, and a communication control unit 447. At least one of the blocks shown in FIG. 58 may be constituted by a different circuit from the CPU 44.

Each unit shown in FIG. 58 may be constituted by at least one of a processor and a logic circuit. Each unit shown in FIG. 58 may include one or a plurality of processors. Each unit shown in FIG. 58 may include one or a plurality of logic circuits.

The control unit 440 controls processing executed by each unit. The generation unit 441 has the same function as that of the generation unit 181 shown in FIG. 8. The region-setting unit 442 has the same function as that of the region-setting unit 182 shown in FIG. 8. The display control unit 443 has the same function as that of the display control unit 183 shown in FIG. 8. The position calculation unit 444 has the same function as that of the position calculation unit 184 shown in FIG. 8. The point-setting unit 445 has the same function as that of the point-setting unit 185 shown in FIG. 8. The surface estimation unit 446 has the same function as that of the surface estimation unit 186 shown in FIG. 8. The communication control unit 447 performs communication with the external device interface 16 of the endoscope device 1 by controlling the communication unit 43.

The CPU 44 executes the surface estimation processing shown in FIG. 9. The CPU 44 may have the function of the measurement unit 187 shown in FIG. 20. In a case in which the CPU 44 has the function of the measurement unit 187, the CPU 44 may execute the 3D measurement shown in FIG. 21. The CPU 44 may have the function of the state determination unit 188 shown in FIG. 32. In a case in which the CPU 44 has the function of the state determination unit 188, the CPU 44 may execute the surface estimation processing shown in FIG. 33, FIG. 37, or FIG. 39.

The CPU 44 may have the function of the division unit 189 shown in FIG. 44. In a case in which the CPU 44 has the function of the division unit 189, the CPU 44 may execute the surface estimation processing shown in FIG. 45. The CPU 44 may have the function of the curvature calculation unit 190 shown in FIG. 47. In a case in which the CPU 44 has the function of the curvature calculation unit 190, the CPU 44 may execute the surface estimation processing shown in FIG. 48.

The CPU 44 may have the function of the abnormality detection unit 191 shown in FIG. 50. In a case in which the CPU 44 has the function of the abnormality detection unit 191, the CPU 44 may execute the surface estimation processing shown in FIG. 51. The CPU 44 may have the function of the deviation calculation unit 192 shown in FIG. 54. In a case in which the CPU 44 has the function of the deviation calculation unit 192, the CPU 44 may execute the surface estimation processing shown in FIG. 55.

The CPU 44 may read a program including commands defining the operations of the CPU 44 and may execute the read program. In other words, the function of the CPU 44 may be realized by software.

The endoscope device 1 may generate point-cloud data on the basis of a 2D image of a subject, and the external device interface 16 of the endoscope device 1 may transmit the 2D image and the point-cloud data to the PC 41. The communication unit 43 of the PC 41 may receive the 2D image and the point-cloud data from the external device interface 16. Therefore, the CPU 44 does not need to include the generation unit 181.

In the twelfth embodiment, the PC 41 can improve the accuracy of a reference surface.

(Related Technique)

The 3D measurement is executed in an inspection using an industrial endoscope. In the 3D measurement, a user adjusts the composition between the distal end of an endoscope and a measurement target captured in the visual field of the endoscope, and then acquires an image. A user inputs intended multiple points (coordinates) on the acquired image and obtains a measurement result.

Stereo measurement can be used as a method for the 3D measurement. In the stereo measurement, a stereo image including a first image of a subject seen from a first viewpoint and a second image of the subject seen from a second viewpoint different from the first viewpoint is used. In the stereo measurement, matching processing is executed, and a point on the second image corresponding to a point on the first image is detected.

There is a case in which an image on which a user inputs a point includes various factors that obstruct accurate measurement. These factors are collectively called matching-obstruction factors. In addition, a region on an image including a matching-obstruction factor is called a matching-obstruction region.

In a case in which a user accidently inputs a point in a matching-obstruction region, a device cannot calculate accurate 3D coordinates of the point and cannot obtain an accurate measurement result. Therefore, it is important to notify a user of a region for which measurement can be executed and a matching-obstruction region for which measurement cannot be executed when the user inputs a point. At this time, a device can use a method such as a method of visualizing these regions.

As a specific example of the matching-obstruction factor, there is a phenomenon called occlusion, an unnecessary object attached to an optical system, or the like. In addition, there is a case in which specular reflection of illumination light emitted to the surface of a subject occurs and an optical image of reflected light is seen in an image. This phenomenon caused by the specular reflection of the illumination light is also an example of the matching-obstruction factor. Hereinafter, this phenomenon is called a factor of interest.

The occurrence frequency of a factor of interest is higher than that of the other matching-obstruction factors. In addition, in a case in which only one of two images included in a stereo image is displayed and a factor of interest occurs in the other of the two images included in the stereo image, a user is unlikely to notice the factor of interest in the image that is not displayed. Therefore, it is important to detect a region in which a factor of interest has occurred and notify a user of the region.

In order for a user to accurately input a point even when a factor of interest occurs, the following two methods are applicable.

A first method is to apply the matching processing to the entire measurement-possible region in a stereo image. The measurement-possible region is a region having a common visual field between the first image and the second image. For example, the first method includes a method of visualizing the reliability of a point input by a user. The reliability is obtained through the matching processing applied to the entire measurement-possible region in a stereo image. Alternatively, the first method includes a method or the like of displaying a 3D shape of a subject obtained through the matching processing.

However, in these methods, a processing time is generally long since the matching processing at all the points in a measurement-possible region is required. Therefore, there is a shortcoming in that a waiting time is long from when an image is acquired until a user is notified of a region in which a factor of interest has occurred.

A second method is to devise an algorithm so that accurate matching processing can be executed even when a factor of interest occurs. In the second method, it is ideal to calculate accurate 3D coordinates corresponding to an input point. In the matching processing, calculation is performed by using information of the brightness or color of a first image and a second image of a stereo image in many cases. In a case in which the pattern of a bright part caused by a factor of interest is stronger than that of a subject, it is generally difficult to avoid a mistake of the matching. Even if there is an algorithm that can execute accurate matching processing on the basis of a point in a region in which a factor of interest has occurred, it is difficult to balance the accuracy and a processing time.

Therefore, it is necessary to detect a region in which a factor of interest has occurred in a short processing time by using a different method from the first method and the second method. In particular, calculation resources are limited in built-in equipment such as an industrial endoscope. Therefore, it is highly necessary to improve a processing time. In addition, it is preferable to detect a matching-obstruction region at regular time intervals in an image displayed live. In this way, a device can notify a user of whether or not an image is suitable for measurement in a stage at which the composition is adjusted.

In order to meet the above-described request for a processing time, there is a method of detecting a region in which a factor of interest has occurred in a short processing time by using a 2D image of a subject without using a calculation result of 3D coordinates. For example, the method is disclosed in Japanese Patent No. 6253380 (reference document).

The above-described reference document discloses a method of using a first image and a second image in a stereo image so as to detect an unnecessary component included in each of the images. An unnecessary component does not necessarily match a matching-obstruction region. Specifically, the following method is disclosed as a method of detecting an unnecessary component.

A plurality of images having mutually different parallax are acquired. Each image included in the plurality of images is set as a reference image, and a relative difference, which is the difference between the reference image and one or more of the other images, is calculated. An unnecessary component included in each image is detected by using information of the relative difference.

In addition to the above-described method, the reference document discloses that processing to match the positions of two images included in a stereo image may be executed before the relative difference is calculated.

(Problem of Related Technique)

In the technique disclosed in the reference document, each image included in the plurality of images having mutually different parallax is set as a reference image, and the difference between the reference image and one or more of the other images is calculated. If this method is applied to an industrial endoscope, there is a possibility that the performance of detecting a matching-obstruction region deteriorates in terms of a processing time and the detection accuracy. Hereinafter, these points will be described.

(1) Terms of Point of Processing Time

Calculation resources are limited in an industrial endoscope that is built-in equipment. In addition, it is preferable to detect a matching-obstruction region at regular time intervals in an image displayed live. Therefore, a short processing time is preferable.

In the method disclosed in the reference document, each of two images included in a stereo image is set as a reference image, and the same processing is repeated twice. Therefore, the processing is redundant and requires a long processing time.

(2) Terms of Point of Detection Accuracy

In the technique disclosed in the reference document, it is not considered to detect a region in which a factor of interest caused by specular reflection of illumination light has occurred. In an industrial endoscope, since the distance between an endoscope and a subject is different between imaging timings, the processing to match the positions of two images disclosed in the reference document is suitable.

In an industrial endoscope, an illumination optical system and a stereo-observation optical system are physically close to each other. Therefore, the difference in brightness between two images included in a stereo image is likely to occur, especially when a subject is close to an endoscope. When it is assumed that processing to match positions with high accuracy, which is executed in a long processing time, is applied to the two images, the difference in brightness between the two images remains after the processing is executed. Therefore, there is a possibility that a region having the difference in brightness between the two images is erroneously detected as a matching-obstruction region.

A factor of interest does not always occur in the entire region having the difference in brightness. In order to detect a region in which a factor of interest has occurred, the entire region having the difference in brightness does not need to be detected.

In a specific imaging condition of a subject, there is a possibility that the positional deviation occurs between two images for which the processing to match positions has been executed. In a region in which this deviation has occurred, the difference in brightness occurs between the two images. Therefore, there is a possibility that a region having the difference in brightness is erroneously detected as a matching-obstruction region.

The purpose of a related invention is to provide a method that can detect a region in which a factor of interest caused by specular reflection of illumination light has occurred in a short processing time with high accuracy.

Embodiment of Related Invention

Figure 59:
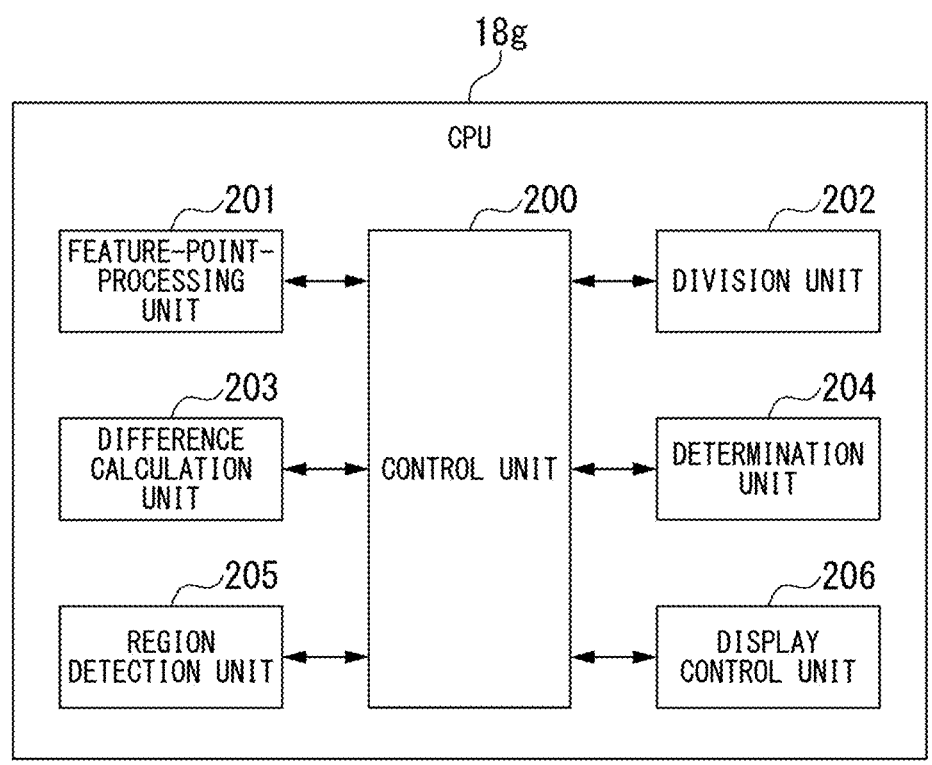
FIG. 59 is a block diagram showing a functional configuration of a CPU included in an endoscope device according to an embodiment of an invention related to the present invention.

An embodiment of the related invention will be described. The endoscope device 1 in the embodiment of the related invention includes a CPU 18g shown in FIG. 59 instead of the CPU 18 shown in FIG. 8. FIG. 59 shows a functional configuration of the CPU 18g. The CPU 18g has functional units including a control unit 200, a feature-point-processing unit 201, a division unit 202, a difference calculation unit 203, a determination unit 204, a region detection unit 205, and a display control unit 206. At least one of the blocks shown in FIG. 59 may be constituted by a different circuit from the CPU 18g.

Each unit shown in FIG. 59 may be constituted by at least one of a processor and a logic circuit. Each unit shown in FIG. 59 may include one or a plurality of processors. Each unit shown in FIG. 59 may include one or a plurality of logic circuits.

The control unit 200 acquires a stereo image (image data) of a subject from the video-signal-processing circuit 12 and controls processing executed by each unit shown in FIG. 59. The stereo image includes a first image of the subject seen from a first viewpoint and a second image of the subject seen from a second viewpoint different from the first viewpoint.

The feature-point-processing unit 201 detects three or more feature points on the first image and detects a point on the second image corresponding to each of the feature points. The feature-point-processing unit 201 associates the feature point on the first image and the point on the second image with each other.

The division unit 202 performs Delaunay triangulation on the second image on the basis of the point on the second image associated with the feature point on the first image. In this way, the division unit 202 sets one or more triangular regions in the second image. The division unit 202 sets one or more triangular regions in the first image on the basis of the relationship of points associated between the two images. In addition, the division unit 202 deforms the triangle in the second image in order to match the shape of the triangle in the first image and the shape of the triangle in the second image.

The difference calculation unit 203 calculates the difference between a pixel value of the first image and a pixel value of the second image for each pixel. In this way, the difference calculation unit 203 calculates the difference in brightness between the two images. The difference calculation unit 203 extracts, from the first image, a region including a pixel at which the difference exceeds a predetermined threshold value. The extracted region is a candidate of a region in which a factor of interest caused by specular reflection of illumination light has occurred.

The determination unit 204 determines whether or not there is a pair of two regions having a similar feature among the extracted regions. Hereinafter, this determination is called pairing determination. In a case in which a factor of interest occurs in a stereo image, there is a feature that this pair exists. In a case in which the pair exists, the determination unit 204 detects a region included in the pair as a region in which a factor of interest has occurred.

In addition, the determination unit 204 detects a region having brightness exceeding a reference value of brightness that is set in advance. When at least part of the region overlaps the two regions detected in the pairing determination, the determination unit 204 determines the two regions detected in the pairing determination and the region having high brightness as regions in which a factor of interest has occurred.

The display control unit 206 displays a stereo image on the display unit 5 and displays the regions in which a factor of interest has occurred on the stereo image.

Figure 60:
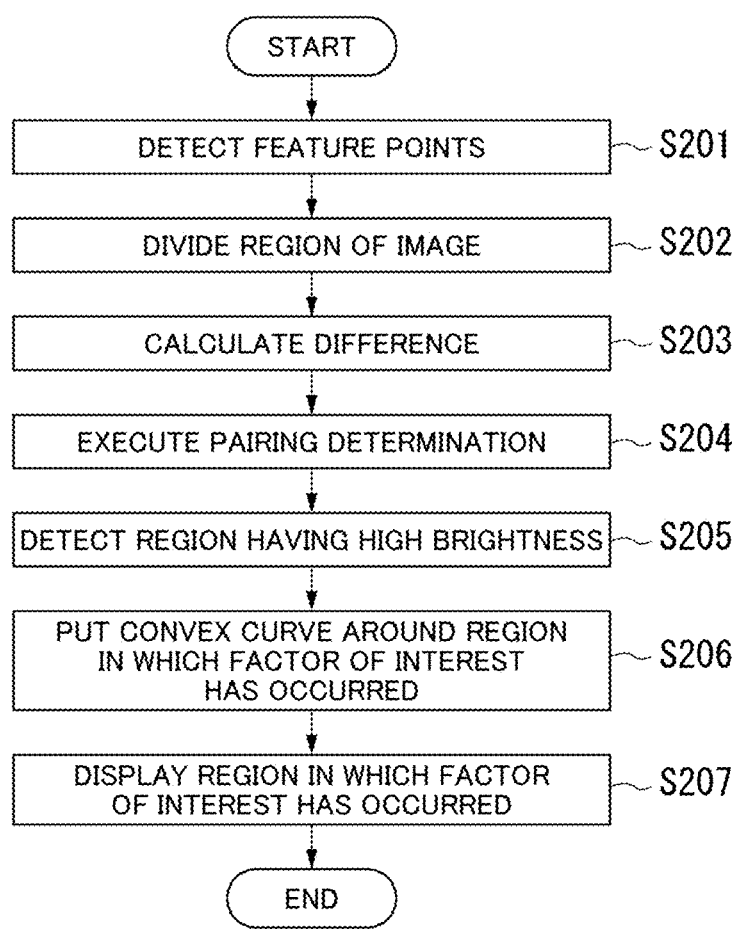
FIG. 60 is a flow chart showing a procedure of processing of detecting a region in which a factor of interest has occurred in the embodiment of the invention related to the present invention.

Processing to detect a region in which a factor of interest has occurred will be described by using FIG. 60. FIG. 60 shows a procedure of the processing.

The feature-point-processing unit 201 detects feature points on the first image and detects a point on the second image corresponding to each of the feature points (Step S201).

Figure 61:
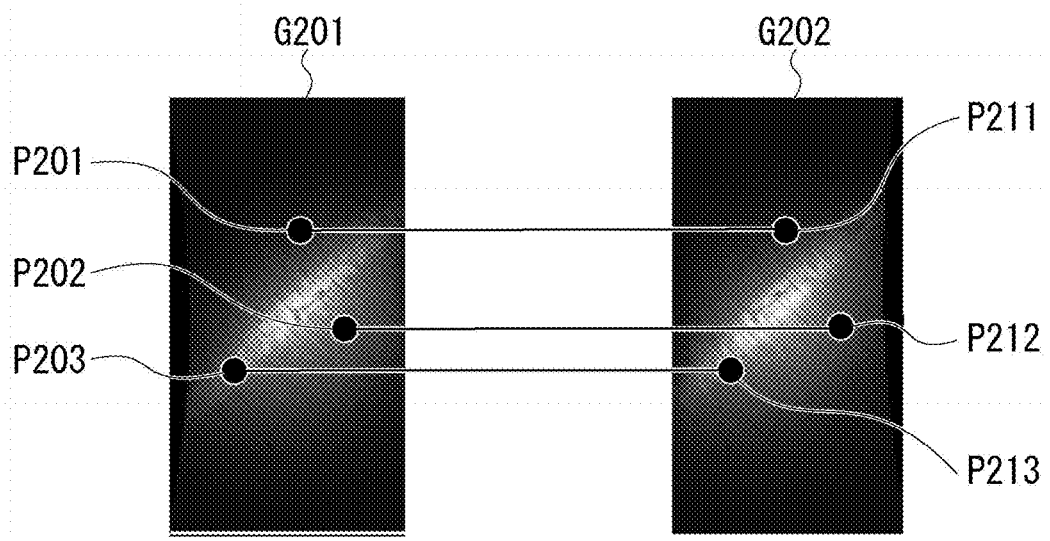
FIG. 61 is a diagram showing an example of a stereo image in the embodiment of the invention related to the present invention.

Details of Step S201 will be described. FIG. 61 shows an example of a stereo image. The stereo image shown in FIG. 61 includes a first image G201 and a second image G202. The feature-point-processing unit 201 detects a feature point P201, a feature point P202, and a feature point P203 on the first image G201. The feature-point-processing unit 201 detects a point P211 on the second image G202 and associates the point P211 with the feature point P201. The feature-point-processing unit 201 detects a point P212 on the second image G202 and associates the point P212 with the feature point P202. The feature-point-processing unit 201 detects a point P213 on the second image G202 and associates the point P213 with the feature point P203. In the example shown in FIG. 61, three feature points are detected. The number of feature points is not limited to three.

The feature-point-processing unit 201 detects, as a feature point, a point of which an error in the matching processing, which uses the first image and the second image, is expected to be small. The feature-point-processing unit 201 determines the adequacy of the feature point by checking the following index for that purpose. For example, the feature-point-processing unit 201 uses a uniqueness ratio, continuity of parallax, consistency of an image, a reprojection error, and the like as an index.

The uniqueness ratio indicates the similarity between two points on the second image. Specifically, the uniqueness ratio indicates the similarity between a first point and a second point. The first point is the most similar to the feature point on the first image. The second point is the second most similar to the feature point. The continuity of parallax indicates the relationship of parallax that is allowed in a localized area. When the parallax at the feature point and the parallax at a point around the feature point are almost the same, there is continuity of parallax. When the parallax at the feature point and the parallax at a point around the feature point are greatly different from each other, there is not continuity of parallax.

The consistency of an image indicates the relationship between two points associated with each other through the matching processing. Specifically, the matching processing is executed twice. A point on the second image corresponding to a point on the first image is detected through first matching processing. In addition, a point on the first image corresponding to the point on the second image is detected through second matching processing. The consistency of an image indicates how well the two points match each other. One of the two points is the point on the first image used for the first matching processing. The other of the two points is the point on the first image detected through the second matching processing. In the matching processing executed twice, the entire image does not need to be used.

The reprojection error indicates the amount of shift between the point detected through the matching processing and an epipolar line.

The feature-point-processing unit 201 does not need to use all the above-described indices. The feature-point-processing unit 201 determines the adequacy of the feature point on the basis of one or more indices.

The feature-point-processing unit 201 may detect a feature point by detecting a point having any feature from the first image. Alternatively, the first image may be divided in a lattice shape in advance, and the feature-point-processing unit 201 may detect an intersection point of two boundary lines as a candidate of a feature point.

After Step S201, the division unit 202 sets one or more triangular regions in the second image and sets one or more triangular regions in the first image on the basis of the relationship of points between the two images (Step S202).

Figure 62:
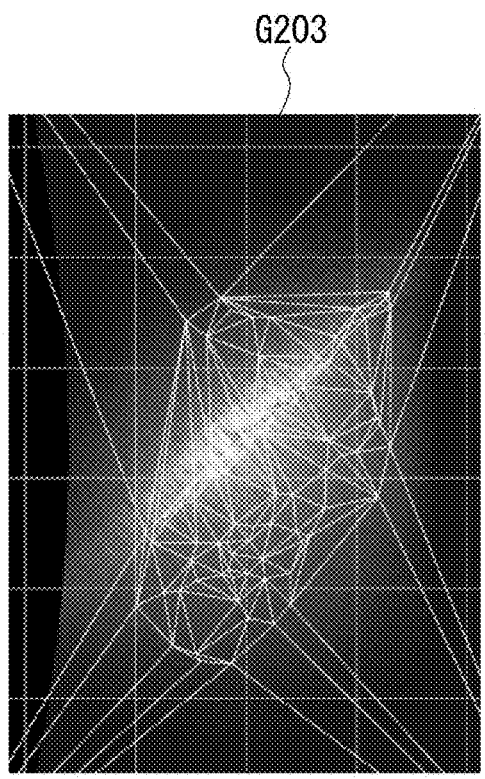
FIG. 62 is a diagram showing an example of an image in which a triangle is set in the embodiment of the invention related to the present invention.

Details of Step S202 will be described. The division unit 202 sets one or more triangular regions in the second image by performing Delaunay triangulation on the second image. The vertices of each triangle are associated with the feature points on the first image detected in Step S201. FIG. 62 shows an example of an image in which triangles are set. The region of the second image G203 includes two or more triangular regions.

The division unit 202 identifies three feature points on the first image corresponding to three vertices of one triangle on the second image. The division unit 202 sets a triangle having the three feature points as vertices in the first image. The division unit 202 associates the triangle on the second image and the triangle on the first image with each other. The division unit 202 executes the above-described processing in which all the triangles on the second image are targeted.

Figure 63:
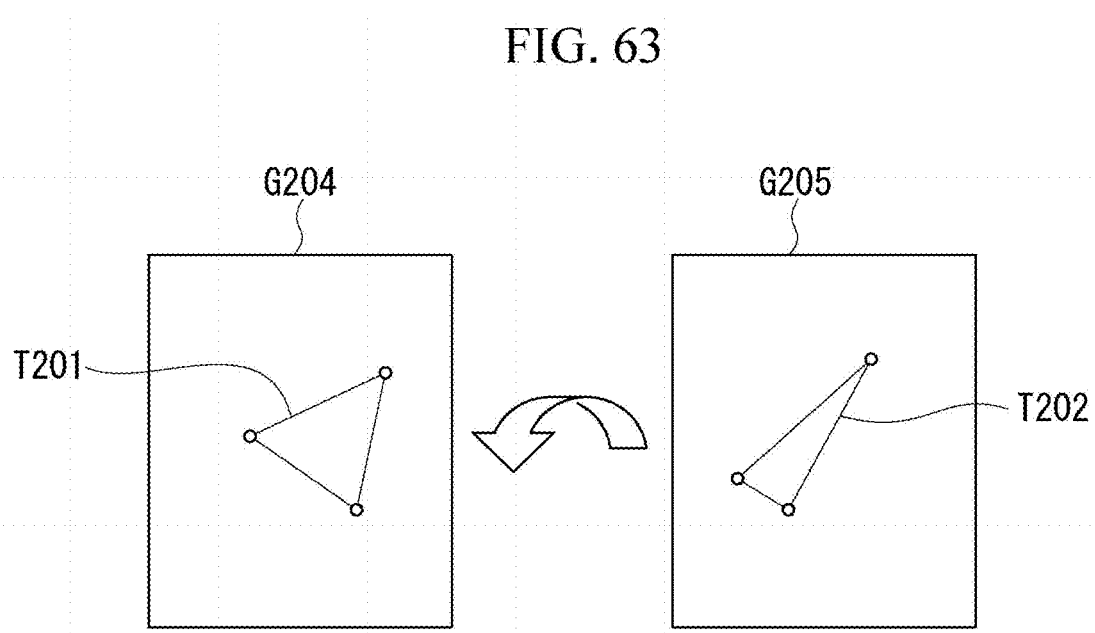
FIG. 63 is a diagram showing a triangle that is set in each of two images included in a stereo image in the embodiment of the invention related to the present invention.

FIG. 63 shows triangles set in each of the first image and the second image. An image G204, which is part of the first image, and an image G205, which is part of the second image, are shown in FIG. 63. A triangle T201 on the image G204 and a triangle T202 on the image G205 are associated with each other. The division unit 202 deforms the shape of the triangle T202 and causes the shape of the triangle T201 and the shape of the triangle T202 to match each other. The division unit 202 performs this processing on all the triangles on the second image, thus generating a deformed image of the second image.

After Step S202, the difference calculation unit 203 calculates the difference in brightness between the first image and the second image (Step S203).

Details of Step S203 will be described. The difference calculation unit 203 calculates the difference in brightness by using the first image and the deformed image of the second image generated in Step S202. The difference calculation unit 203 extracts, from the first image, a region including a pixel at which the difference exceeds a predetermined threshold value. For example, the difference calculation unit 203 extracts a pixel value of the deformed image of the second image from a pixel value of the first image, thus calculating the difference. The difference calculation unit 203 extracts, from the first image, a region including a pixel at which the positive difference is greater than a predetermined threshold value. In addition, the difference calculation unit 203 extracts, from the first image, a region including a pixel at which the negative difference is less than a predetermined threshold value.

Figure 64:
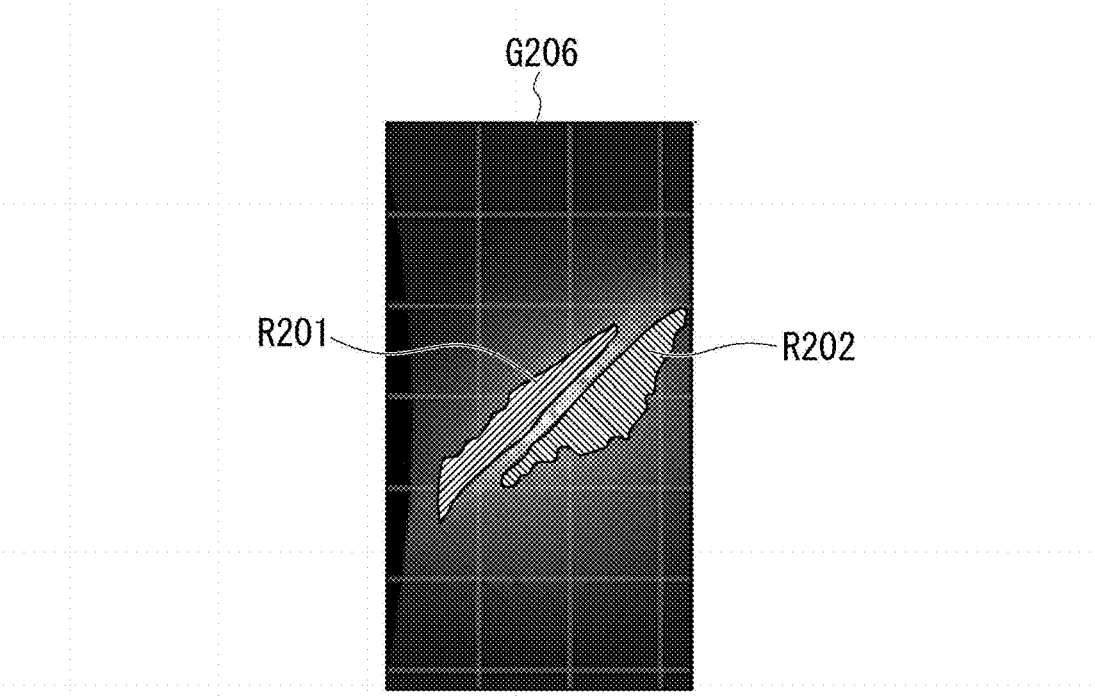
FIG. 64 is a diagram showing an example of an image included in a stereo image in the embodiment of the invention related to the present invention.
Figure 65:
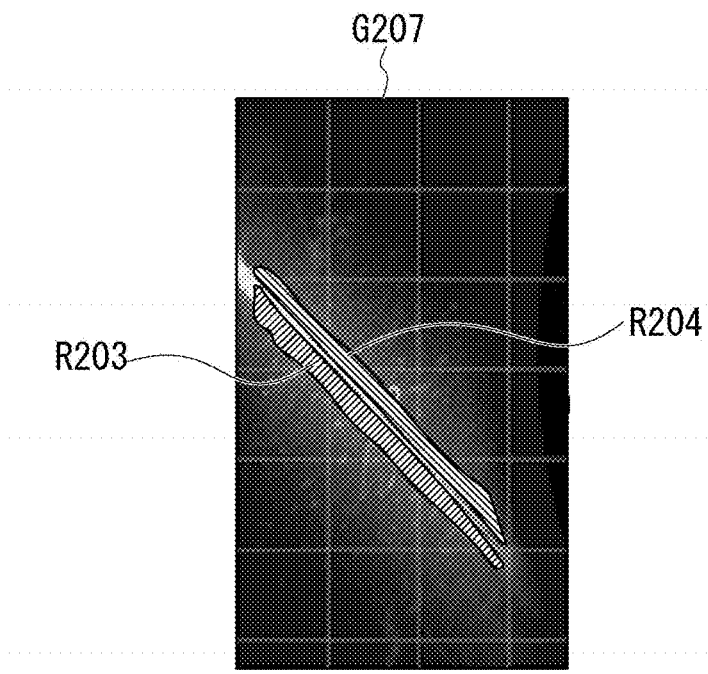
FIG. 65 is a diagram showing an example of an image included in a stereo image in the embodiment of the invention related to the present invention.

FIG. 64 and FIG. 65 show examples of the first image. The region of a first image G206 shown in FIG. 64 includes a region R201 and a region R202. The region R201 includes a pixel at which the positive difference is greater than a predetermined threshold value. The region R202 includes a pixel at which the negative difference is less than a predetermined threshold value. The region of a first image G207 shown in FIG. 65 includes a region R203 and a region R204. The region R203 includes a pixel at which the positive difference is greater than a predetermined threshold value. The region R204 includes a pixel at which the negative difference is less than a predetermined threshold value.

After Step S203, the determination unit 204 executes the pairing determination. In this way, the determination unit 204 determines whether or not there is a pair of two regions having a similar feature among the regions extracted in Step S203 (Step S204).

Details of Step S204 will be described. In the example shown in FIG. 64, the determination unit 204 determines whether or not the feature of the region R201 and the feature of the region R202 are similar to each other. In the example shown in FIG. 65, the determination unit 204 determines whether or not the feature of the region R203 and the feature of the region R204 are similar to each other. The determination unit 204 executes the pairing determination by using the following indices.

The determination unit 204 determines whether or not the signs of the differences in brightness of the two regions are different from each other. When the difference in brightness of one region is positive and the difference in brightness of the other region is negative, the determination unit 204 determines that the features of the two regions are similar to each other.

The determination unit 204 determines the distance between the two regions. When the two regions are close to each other, the determination unit 204 determines that the features of the two regions are similar to each other.

The determination unit 204 compares the shapes of the two regions. When the shapes of the two regions are similar to each other, the determination unit 204 determines that the features of the two regions are similar to each other.

The determination unit 204 compares the directions (angles) of the two regions with each other. For example, the determination unit 204 determines a rectangle, which approximates and circumscribes each of the regions, and compares the angles of the long and short axes of the rectangle with each other. When the directions of the two regions are similar to each other, the determination unit 204 determines that the features of the two regions are similar to each other.

The determination unit 204 compares the areas of the two regions. When the areas of the two regions are similar to each other, the determination unit 204 determines that the features of the two regions are similar to each other.

The determination unit 204 does not need to use all the above-described indices. The determination unit 204 determines whether or not the features of the two regions are similar to each other on the basis of one or more indices. The determination unit 204 detects a region included in the pair as a region in which a factor of interest has occurred.

After Step S204, the determination unit 204 detects, in the first image, a region having brightness exceeding a reference value of brightness that is set in advance (Step S205).

Details of Step S205 will be described. For example, the determination unit 204 determines whether or not a pixel value exceeds the reference value for each pixel. An example of the reference value is 250. The determination unit 204 detects a region including a pixel having a pixel value exceeding the reference value. The detected region has high brightness. The determination unit 204 determines whether or not at least part of the region having high brightness overlaps the two regions detected in the pairing determination. If the region having high brightness overlaps the two regions, the determination unit 204 detects a union of the region having high brightness and the two regions detected in the pairing determination as a region in which a factor of interest has occurred. If the region having high brightness does not overlap the two regions, the determination unit 204 detects only the two regions detected in the pairing determination as a region in which a factor of interest has occurred.

Figure 66:
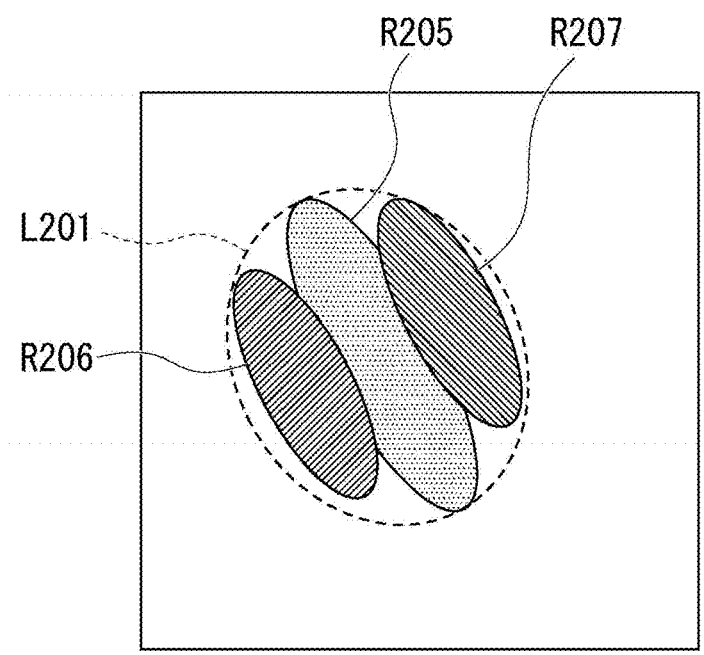
FIG. 66 is a diagram showing an example of a region in which a factor of interest has occurred in the embodiment of the invention related to the present invention.
Figure 67:
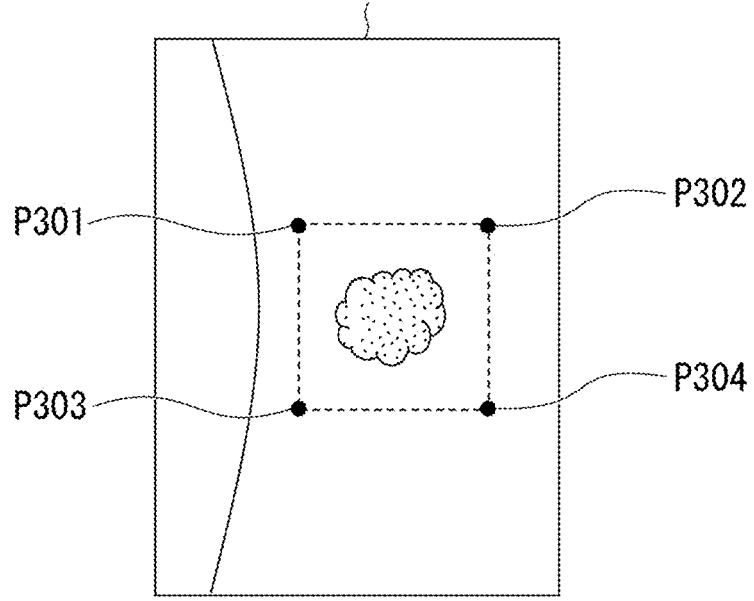
FIG. 67 is a diagram showing an example in which a point used for estimating a reference surface is set in prior art.
Figure 68:
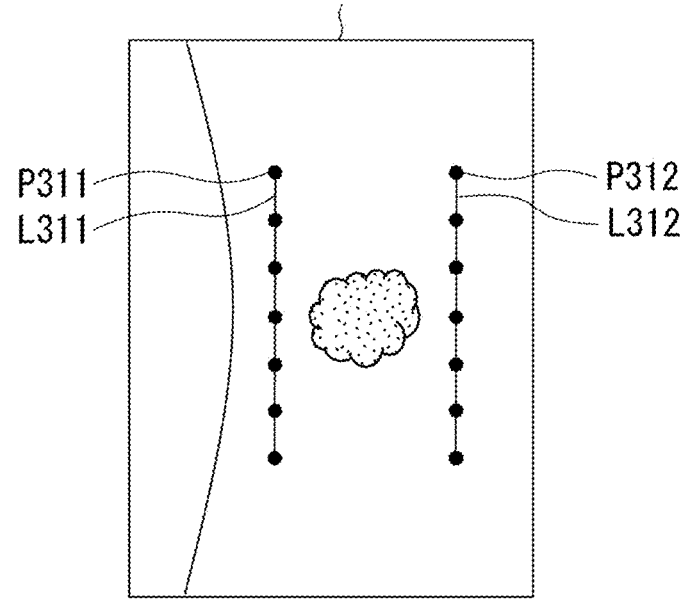
FIG. 68 is a diagram showing an example in which a point used for estimating the reference surface is set in the prior art.

FIG. 66 shows an example of a region in which a factor of interest has occurred. A region R205 includes a pixel having brightness exceeding the reference value. A region R206 and a region R207 constitute the pair detected in the pairing determination. Part of the region R205 overlaps the region R206, and other part of the region R205 overlaps the region R207. Therefore, the determination unit 204 detects the union of the region R205, the region R206, and the region R207 as a region in which a factor of interest has occurred.

After Step S205, the determination unit 204 puts a convex curve (closed convex curve) around the region in which a factor of interest has occurred. The determination unit 204 eventually detects the region surrounded by the convex curve as a region in which a factor of interest has occurred (Step S206).

In the example shown in FIG. 66, the region R205, the region R206, and the region R207 are surrounded by a convex curve L201. The determination unit 204 detects all the regions surrounded by the convex curve L201 as a region in which a factor of interest has occurred. The regions surrounded by the convex curve L201 include the region R205, the region R206, and the region R207. In addition, the regions surrounded by the convex curve L201 include a region other than the region R205, the region R206, or the region R207.

Step S206 may be executed without executing Step S205. In a case in which there is a region having high brightness, a region surrounded by a convex curve includes at least part of the region having high brightness.

After Step S206, the display control unit 206 displays a stereo image on the display unit 5 and displays the region in which a factor of interest has occurred on the stereo image (Step S207). When Step S207 is executed, the processing shown in FIG. 60 is completed.

Specifically, the display control unit 206 generates a graphic image signal for displaying the region in which a factor of interest has occurred. The display control unit 206 outputs the generated graphic image signal to the video-signal-processing circuit 12. The video-signal-processing circuit 12 combines the video signal output from the CCU 9 and the graphic image signal output from the CPU 18g. The video-signal-processing circuit 12 outputs the combined video signal to the display unit 5. The display unit 5 displays a stereo image on which the region in which a factor of interest has occurred is superimposed. For example, the first image included in the stereo image is displayed on the display unit 5, and the region in which a factor of interest has occurred is displayed on the first image.

The region in which a factor of interest has occurred is displayed on the stereo image. Therefore, a user can avoid inputting a point in the region in which a factor of interest has occurred. Since inputting a point in a matching-obstruction region is avoided, the accuracy of stereo measurement is improved.

In many cases, a region having high brightness is not suitable for the matching processing. Even when a region having high brightness does not overlap the two regions detected in the pairing determination, the display control unit 206 may display the region having high brightness on the stereo image in order to draw a user's attention. A user can avoid inputting a point in the region having high brightness.

In the embodiment of the related invention, each of two images included in a stereo image does not need to be set as a reference image, and the matching processing does not need to be executed twice. Therefore, the endoscope device 1 can detect a region in which a factor of interest has occurred in a short processing time. In the embodiment of the related invention, the pairing determination is executed. Therefore, the endoscope device 1 can detect a region in which a factor of interest has occurred with high accuracy.

While preferred embodiments of the invention have been described and shown above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A surface estimation method executed by a processor, the surface estimation method comprising:
    calculating three-dimensional coordinates of three or more points on a subject based on a two-dimensional image of the subject and generating three-dimensional image data including the three-dimensional coordinates of the three or more points;
    setting a reference region that is one of a three-dimensional region and a two-dimensional region,
        wherein the three-dimensional region includes three or more points and is set in a three-dimensional space,
        wherein the three-dimensional space includes the three-dimensional coordinates included in the three-dimensional image data,
        wherein the two-dimensional region includes three or more points on the two-dimensional image with which the three-dimensional coordinates included in the three-dimensional image data are associated and is set in the two-dimensional image,
        wherein the three or more points of the reference region include one or more combinations, each of which is constituted by three points that form a triangle, and
        wherein the reference region is set inside a region having a predetermined diameter around a center that is on a reference point designated through an operation performed by a user or is on a reference figure designated through the operation;
    estimating a reference surface that is different from the reference region and that approximates a surface of the subject, based on three or more points of the three-dimensional image data corresponding to the three or more points included in the reference region; and
    measuring a three-dimensional distance between the reference surface and a measurement point designated on the two-dimensional image of the subject or on the three-dimensional image data.

2. The surface estimation method according to claim 1, further comprising:
    determining continuity of the three or more points corresponding to the three-dimensional coordinates included in the three-dimensional image data,
    wherein the reference region that is set includes only the three or more points determined to be continuous.

3. The surface estimation method according to claim 1, wherein the reference region includes a region that is not a convex set.

4. The surface estimation method according to claim 3, wherein a boundary of the reference region includes a first boundary and a second boundary that is on an inner side of the first boundary.

5. The surface estimation method according to claim 1, wherein the reference region includes two or more regions.

6. The surface estimation method according to claim 1, further comprising:
    controlling a display to display one of an image of the three-dimensional image data and the two-dimensional image;
    accepting position information input through an input device,
        wherein the position information indicates a position on the image of the three-dimensional image data or the two-dimensional image displayed on the display;
    determining a state of the subject; and
    determining a boundary of the reference region based on the basis of both the position indicated by the position information and the state of the subject determined.

7. The surface estimation method according to claim 1, wherein setting the reference region comprises dividing the three or more points corresponding to the three-dimensional coordinates included in the three-dimensional image data into two or more regions,
    wherein a boundary of the reference region includes a boundary of one or more regions included in the two or more regions.

8. The surface estimation method according to claim 1, wherein region information indicating at least one of a size of the reference region and a position of the reference region is recorded on a recording medium in advance, and
    wherein setting the reference region comprises setting at least one of the size of the reference region and the position of the reference region based on the region information.

9. The surface estimation method according to claim 1, further comprising controlling a display to display one of an image of the three-dimensional image data and the two-dimensional image,
    wherein setting the reference region comprises receiving an input of the three or more points of the three-dimensional region or the two-dimensional region on the image of the three-dimensional image data or the two-dimensional image through an input device.

10. The surface estimation method according to claim 9, wherein setting the reference region comprises setting the reference region based on line segments connecting the three or more points together.

11. The surface estimation method according to claim 1, further comprising controlling a display to display one of an image of the three-dimensional image data and the two-dimensional image,
wherein setting the reference region comprises receiving designation of the three or more points of the three-dimensional region or the two-dimensional region on a line in the image of the three-dimensional image data or the two-dimensional image input through an input device.

12. The surface estimation method according to claim 1, wherein in setting the reference region that is the one or of the three-dimensional region and the two-dimensional region, the three-dimensional region and the two-dimensional region includes four or more points, and
wherein estimating the reference surface comprises selecting the three or more points from the four or more points.

13. The surface estimation method according to claim 1, further comprising controlling a display to display one of an image of the three-dimensional image data and the two-dimensional image and to display the reference region on the image of the three-dimensional image data or the two-dimensional image.

14. The surface estimation method according to claim 1, further comprising controlling a display to display an image of the three-dimensional image data and to display, on the image of the three-dimensional image data, the three or more points of the three-dimensional image data used for estimating the reference surface.

15. The surface estimation method according to claim 1, further comprising controlling a display to display the two-dimensional image and to display, on the two-dimensional image, three or more points corresponding to the three or more points of the three-dimensional image data used for estimating the reference surface.

16. The surface estimation method according to claim 1, further comprising:
dividing three or more points corresponding to the three-dimensional coordinates included in the three-dimensional image data into two or more regions; and
controlling a display to display one of an image of the three-dimensional image data and the two-dimensional image, and an image of the two or more regions.

17. The surface estimation method according to claim 1, further comprising:
generating a curvature map indicating distribution of curvatures in a three-dimensional shape of the subject indicated by the three-dimensional image data; and
controlling a display to display one of an image of the three-dimensional image data and the two-dimensional image and to display an image of the curvature map.

18. The surface estimation method according to claim 1, further comprising controlling a display to display one of an image of the three-dimensional image data and the two-dimensional image, and to display a region corresponding to the reference surface on the image of the three-dimensional image data or the two-dimensional image.

19. The surface estimation method according to claim 1, further comprising detecting an abnormal region on the surface of the subject based on one of an image of the three-dimensional image data and the two-dimensional image,
wherein setting the reference region comprises setting the reference region to exclude a region corresponding to the abnormal region.

20. The surface estimation method according to claim 1, wherein estimating the reference surface comprises estimating a geometric feature of the reference surface.

21. A surface estimation device comprising:
a processor configured to:
calculate three-dimensional coordinates of three or more points on a subject based on a two-dimensional image of the subject and generate three-dimensional image data including the three-dimensional coordinates of the three or more points;
set a reference region that is one of a three-dimensional region and a two-dimensional region,
wherein the three-dimensional region includes three or more points and is set in a three-dimensional space,
wherein the three-dimensional space includes the three-dimensional coordinates included in the three-dimensional image data,
wherein the two-dimensional region includes three or more points on the two-dimensional image with which the three-dimensional coordinates included in the three-dimensional image data are associated and is set in the two-dimensional image,
wherein the three or more points of the reference region include one or more combinations, each of which is constituted by three points that form a triangle, and
wherein the reference region is set inside a region having a predetermined diameter around a center that is on a reference point designated through an operation performed by a user or is on a reference figure designated through the operation;
estimate a reference surface that is different from the reference region and that approximates a surface of the subject, based on three or more points of the three-dimensional image data corresponding to the three or more points included in the reference region; and
measure a three-dimensional distance between the reference surface and a measurement point designated on the two-dimensional image of the subject or on the three-dimensional image data.

22. A non-transitory computer-readable recording medium storing a program, that when executed, causes a computer to at least execute:
calculating three-dimensional coordinates of three or more points on a subject based on a two-dimensional image of the subject and generating three-dimensional image data including the three-dimensional coordinates of the three or more points;
setting a reference region that is one of a three-dimensional region and a two-dimensional region,
wherein the three-dimensional region includes three or more points and is set in a three-dimensional space,
wherein the three-dimensional space includes the three-dimensional coordinates included in the three-dimensional image data,
wherein the two-dimensional region includes three or more points on the two-dimensional image with which the three-dimensional coordinates included in the three-dimensional image data are associated and is set in the two-dimensional image, wherein the three or more points of the reference region include one or more combinations, each of which is constituted by three points that form a triangle, and wherein the reference region is set inside a region having a predetermined diameter around a center that is on a reference point designated through an operation performed by a user or is on a reference figure designated through the operation;

estimating a reference surface that is different from the reference region and that approximates a surface of the subject, based on three or more points of the three-dimensional image data corresponding to the three or more points included in the reference region; and measuring a three-dimensional distance between the reference surface and a measurement point designated on the two-dimensional image of the subject or on the three-dimensional image data.

23. A surface estimation method executed by a processor, the surface estimation method comprising:

reading, from a recording medium, three-dimensional image data including three-dimensional coordinates of three or more points on a subject calculated based on a two-dimensional region;

setting a reference region that is one of a three-dimensional region and a two-dimensional region, wherein the three-dimensional region includes three or more points and is set in a three-dimensional space, wherein the three-dimensional space includes the three-dimensional coordinates included in the three-dimensional image data, wherein the two-dimensional region includes three or more points on the two-dimensional image with which the three-dimensional coordinates included in the three-dimensional image data are associated and is set in the two-dimensional image, wherein the three or more points of the reference region include one or more combinations, each of which is constituted by three points that form a triangle, and wherein the reference region is set inside a region having a predetermined diameter around a center that is on a reference point designated through an operation performed by a user or is on a reference figure designated through the operation;

estimating a reference surface that is different from the reference region and that approximates a surface of the subject, based on three or more points of the three-dimensional image data corresponding to the three or more points included in the reference region; and measuring a three-dimensional distance between the reference surface and a measurement point designated on the two-dimensional image of the subject or on the three-dimensional image data.

* * * * *